United States Patent
Ikushima et al.

(10) Patent No.: US 7,309,865 B2
(45) Date of Patent: Dec. 18, 2007

(54) ELECTRONIC DEVICE HAVING INFRARED SENSING ELEMENTS

(75) Inventors: Kimiya Ikushima, Hirakata (JP); Hiroyoshi Komobuchi, Kyoto (JP); Asako Baba, Suginami-ku (JP)

(73) Assignee: Matsushita Electric industrial Co., Ltd., Osaka (JP)

(*) Notice: Subject to any disclaimer, the term of this patent is extended or adjusted under 35 U.S.C. 154(b) by 0 days.

(21) Appl. No.: 11/348,357

(22) Filed: Feb. 7, 2006

(65) Prior Publication Data

US 2006/0131501 A1   Jun. 22, 2006

Related U.S. Application Data

(63) Continuation of application No. PCT/JP2004/011425, filed on Aug. 3, 2004.

(30) Foreign Application Priority Data

Aug. 8, 2003   (JP)   ............... 2003-289887

(51) Int. Cl.
  *G01J 5/00*   (2006.01)
  *H01L 29/74*  (2006.01)
  *H01L 23/20*  (2006.01)
  *H01L 21/322* (2006.01)

(52) U.S. Cl. ............ 250/338.1; 257/682; 257/E23.137; 438/476

(58) Field of Classification Search .......... 257/682, 257/E23.137; 438/476; 250/338.1
See application file for complete search history.

(56) References Cited

U.S. PATENT DOCUMENTS

| | | | | |
|---|---|---|---|---|
| 5,347,869 A | * | 9/1994 | Shie et al. ............ | 73/755 |
| 5,351,551 A | * | 10/1994 | Drubetsky et al. ...... | 73/755 |
| 5,597,957 A | | 1/1997 | Schieferdecker et al. | |
| 6,534,850 B2 | * | 3/2003 | Liebeskind ............. | 257/682 |
| 6,590,280 B2 | | 7/2003 | Satou et al. | |
| 6,636,002 B2 | * | 10/2003 | Kim ..................... | 315/169.3 |
| 6,787,387 B2 | | 9/2004 | Ikushima et al. | |
| 6,897,551 B2 | * | 5/2005 | Amiotti ................ | 257/682 |
| 6,938,493 B2 | * | 9/2005 | Bills et al. ........... | 73/755 |
| 2005/0017276 A1 | | 1/2005 | Ikushima et al. | |
| 2005/0176179 A1 | * | 8/2005 | Ikushima et al. ...... | 438/125 |
| 2005/0211900 A1 | * | 9/2005 | Ouvrier-Buffet ...... | 250/339.11 |

FOREIGN PATENT DOCUMENTS

| | | |
|---|---|---|
| JP | 10-224297 | 8/1998 |
| JP | 11-326037 | 11/1999 |
| JP | 2000-124469 | 4/2000 |
| JP | 2003-017672 | 1/2003 |
| JP | 2003240740 A * | 8/2003 |

OTHER PUBLICATIONS

Machine Assisted Translation of Foreign Reference: JP 2003-017672.*

Hong et al., "Silicon metal-oxide-semiconductor field effect transistor/field emission array fabricated using chemical mechanical polishing", J. Vac. Sci. Technol. B 21(1), Jan./Feb. 2003, pp. 500-505.

Kruse et al., "Uncooled Infrared Imaging Arrays and Systems" Academic Press, Oct. 8, 1997, pp. 114-115.

* cited by examiner

*Primary Examiner*—Dave Porta
*Assistant Examiner*—Mindy Vu
(74) *Attorney, Agent, or Firm*—McDermott Will & Emery LLP

(57) ABSTRACT

An electronic device according to the present invention includes: a cavity, which is surrounded with a cavity wall portion and which has a reduced pressure; a gettering thin film, which is arranged in the cavity and has the function of adsorbing a surrounding substance; and an activating portion, at least a part of which is arranged in the cavity and which has the function of activating the gettering thin film by generating heat.

12 Claims, 34 Drawing Sheets

Micro Vacuum Package

Microheater Portion

ELECTRONIC DEVICE HAVING INFRARED SENSING ELEMENTS

RELATED APPLICATIONS

This application is a continuation of Application PCT/JP2004/011425, filed Aug. 3, 2004, which claims priority of Japanese Application No. 2003-289887, filed Aug. 8, 2003, the contents of which are hereby incorporated by reference.

BACKGROUND OF THE INVENTION

1. Field of the Invention

The present invention relates to an electronic device with a cavity, of which the internal pressure is kept low, and a method for fabricating such an electronic device. More particularly, the present invention relates to an electronic device such as an infrared sensor, of which the sensing element is encapsulated within a reduced pressure atmosphere and which can further reduce the pressure, if necessary, by measuring the pressure of the atmosphere within its cavity, and also relates to a method for fabricating such an electronic device.

2. Description of the Related Art

In the prior art, an electronic device such as an infrared sensor has at least the sensing element thereof arranged in a cavity on a substrate and is encapsulated in a vacuum or inert atmosphere by a cap member so as to increase its responsivity. Examples of electronic devices of this type include not just infrared sensors but also pressure sensors, acceleration sensors, flow velocity sensors, and vacuum transistors.

Among these sensors of various types, the infrared sensors are roughly classifiable into thermo sensors including bolometer sensors, pyroelectric sensors, thermopile sensors and thermocouple sensors and quantum sensors made of PbS, InSb or HgCdTe. Most of the bolometer sensors include a sensing element made of a variable resistance material such as polysilicon, Ti, TiON or $VO_x$. However, some bolometer sensors use the forward current transition characteristic of a PN diode, for example. The thermopile sensors may use the Seebeck effect produced at a PN junction, for example. And the pyroelectric sensors utilize the pyroelectric effect of a material such as PZT, BST, ZnO or $PbTiO_3$. Also, a quantum sensor detects current that flows due to the excitation of electrons. Another infrared sensor uses a Chromel-Alumel Thermocouple that senses infrared radiations by utilizing the Seebeck effect.

To maintain high infrared sensitivity and sensing accuracy, the quantity of heat dissipated from the infrared sensing element thereof is preferably reduced. And it is known that if the sensing element is encapsulated in a vacuum atmosphere or reduced-pressure inert atmosphere, which is created by a micro vacuum package, for example, the sensing performance improves.

The sensitivities of pressure sensors and acceleration sensors also increase as the viscous drag of the air surrounding the sensing element decreases. That is why the sensing element thereof is also preferably encapsulated in a vacuum atmosphere or reduced-pressure inert atmosphere created by a cap member, for example. Also, if a vacuum has been created inside of a cap member, the degree of the vacuum inside the cap member is preferably checkable while the electronic device is being manufactured or being operated.

Hereinafter, a method for fabricating a conventional electronic device will be described with reference to FIGS. 1A through 1F.

First, in the process step shown in FIG. 1A, a silicon substrate 101, on which the sensing element 102 of an infrared sensor, for example, has been provided, is prepared. Next, a silicon dioxide film 103 is deposited on the substrate by a CVD process, for example, and then patterned so as to cover the sensing element 102 and its surrounding portion. This silicon dioxide film 103 will function as a sacrificial layer and will be etched away later to define the shape of a cavity in a subsequent process step.

Next, in the process step shown in FIG. 1B, a polysilicon film 104 is deposited by a CVD process so as to cover the silicon dioxide film 103. This polysilicon film 104 will be the sidewall and ceiling wall of a cap member for an electronic device.

Subsequently, in the process step shown in FIG. 1C, a lot of etch holes 111 are cut through the polysilicon film 104 so as to reach the silicon dioxide film 103.

Thereafter, in the process step shown in FIG. 1D, hydrofluoric acid is injected through the etch holes 111 to dissolve the silicon dioxide film 103 and then the solution is drained through the etch holes 111. As a result, a cavity 112 surrounded with the polysilicon film 104 is defined and the sensing element 102 of the sensor is exposed inside the cavity 112.

Next, in the process step shown in FIG. 1E, another polysilicon film 106 is deposited by a CVD process on the polysilicon film 104. In this process step, the polysilicon film 106 is also deposited on the inner walls of the etch holes 111, and the etch holes 111 are closed as a result. The polysilicon film 106 is further deposited on the inner walls of the cavity 112 after the CVD process has started and before the etch holes 111 are fully closed.

This CVD process is ordinarily carried out using a reaction gas such as $SiH_4$ at a pressure of about 500 mTorr (=approximately 67 Pa). Thus, the cavity 112 is closed airtight so as to have an internal pressure of about 500 mTorr (=approximately 67 Pa) as in the CVD process. Also, as a result of this CVD process, non-reacted $SiH_4$ gas and $H_2$ gas, produced by the reaction, still remain in the cavity 112. In addition, the polysilicon film 106 that has been deposited on the inner walls of the cavity 112 adsorbs the non-reacted $SiH_4$ gas and the $H_2$ gas produced by the reaction.

Then, in the process step shown in FIG. 1F, the entire substrate 101 is heated to an elevated temperature of 500° C. or more within a high vacuum. As a result, the $SiH_4$ gas decomposes to a certain degree inside the cavity 112 and the $H_2$ gas is emitted through the polysilicon films 104 and 106. Consequently, the pressure inside the cavity 112 becomes somewhat lower than the internal pressure of the cavity 112 during the CVD process and the degree of vacuum of the cavity 112 increases slightly.

Such a manufacturing process is described in Japanese Patent Application Laid-Open Publication No. 2000-124469, for example.

Next, a conventional technique of increasing the degree of vacuum inside a vacuum package (i.e., cap member) and a conventional technique of measuring the degree of vacuum (i.e., pressure) will be described.

FIG. 39 schematically illustrates a cross-sectional structure of a conventional electronic device with a vacuum package (see Japanese Patent Application Laid-Open Publication No. 11-326037). The electronic device shown in FIG. 39 includes a silicon substrate 391 and a transmissive window 394 fixed on the silicon substrate 391 with solder 399. A gap 393 with a height of about 1 mm to 10 mm is provided between the transmissive window 394 and the silicon substrate 391. And a getter 395 with a size of several mm is disposed in this gap 393.

The transmissive window 394 has a number of through holes 397, through which the getter 395 has been introduced into the gap 393. When the silicon substrate 391 is placed in a vacuum, the gap 393 is evacuated through the through holes 397 to have a reduced pressure. By melting the vacuum creating solder 399, the through holes 397 are sealed up to maintain a vacuum in the gap 393. Thereafter, when the getter 393 is activated, the pressure in the gap 393 can be further reduced and a high vacuum is produced.

The degree of vacuum in the cap member may be measured with a Pirani gage, for example. A Pirani gage is an instrument for calculating the degree of vacuum based on the electrical resistance of a resistor that is placed in a vacuum. The thermal conductivity of a gas depends on the pressure (i.e., the degree of vacuum) of the gas. That is why if the thermal conductivity from a heated resistor into a gas is obtained, the degree of vacuum of the gas can be figured out by making an appropriate calibration.

Recently, as electronic devices have become smaller and smaller, there has been increasing demand for making the vacuum package (or cap member) in a very small size. For example, an image sensor, including a huge number of infrared sensing elements and visible light detecting elements that are arranged in matrix on the same substrate, was proposed. In such an image sensor, each of those infrared sensing elements with dimensions of about 50 μm square is encapsulated within a micro vacuum package with dimensions of about 100 μm square (see Japanese Patent Application Laid-Open Publication No. 2003-17672).

Meanwhile, an electronic device, including an FEA element that performs a high-speed switching operation in a vacuum and a transistor on the same substrate, is disclosed by. C. Y. Hong and A. I. Akinwande in Silicon Metal-Oxide-Semiconductor Field Effect Transistor/Field Emission Array Fabricated Using Chemical Mechanical Polishing, J. Vac. Sci. Technol. B, Vol. 21, No. 1, pp. 500 to 505, January/February 2003. To reduce the size of such an electronic device, a structure in which only the FEA element is encapsulated within a very small vacuum package is preferably adopted.

Next, another conventional electronic device, of which the infrared sensors are also encapsulated within a vacuum and which can sense a vacuum leakage, will be described with reference to FIG. 40 (see Japanese Patent Application Laid-Open Publication No. 10-224297).

The electronic device shown in. FIG. 40 includes a semiconductor substrate 411 provided on a metallic supporting member 410, and an infrared sensor 412 arranged on the surface of the semiconductor substrate 411. Another supporting member 419, which has a cavity 413 that houses the infrared sensor 412, is provided on the semiconductor substrate 411. The supporting member 419 and the semiconductor substrate 411 are fixed on the metallic supporting member 410 with epoxy resin 500.

The supporting member 419 includes an infrared input portion 418 and a diffused resistor 417. The degree of vacuum in the cavity 413 can be detected by the deformation of the diffused resistor 417.

If there is a vacuum leakage in the cavity 413 to cause a variation in internal pressure, then the infrared input portion 418 is deformed due to the pressure variation and the resistance value of the diffused resistor 417 changes as a result. Thus, by detecting a variation in current value corresponding to this variation in resistance, the vacuum leakage can be sensed.

In the electronic device manufacturing process described above, in the heat treatment process step shown in FIG. 1F, the $SiH_4$ gas is decomposed in the cavity 112 and $H_2$ gas is emitted out of the cavity 112. Thus, the degree of vacuum in the cavity increases slightly compared to the pressure of 500 mTorr (=approximately 67 Pa) during the CVD process. However, the degree of vacuum is preferably further increased to heighten the sensitivity of the sensor. Nevertheless, it is difficult to completely exhaust the $SiH_4$ and $H_2$ gases that remain inside the cavity or on the walls. That is why the increase in sensitivity is still insufficient, which is a problem.

In the manufacturing process described above, no cavity is provided between the sensing element 102 and the substrate 101. However, if sacrificial layers are provided both over and under the sensing element 102, a structure that can sense the in-cavity atmospheric gas both over and under the sensing element 102 can be obtained.

FIG. 2 is a perspective view illustrating the sensing element of a bolometer infrared sensor with such a structure and its surrounding portions. In FIG. 2, a resistor 151 called a "bolometer" and functioning as an infrared sensing element and a supporting member 152 that supports the resistor 151 thereon are provided on a substrate 101. The resistor 151 may be a patterned polysilicon film, for example, and the supporting member 152 is often a stack of a polysilicon film, a nitride film, an oxide film and other films. The supporting member 152 includes a body portion, on which the resistor 151 is provided, and arm portions extending from the body portion, and is fixed on the substrate 101 with these arm portions.

No cavity wall members are shown in FIG. 2. In an actual infrared sensor, however, the supporting member 152 is arranged within a cavity similar to the cavity 112 shown in FIG. 1F.

Hereinafter, it will be described in more detail what problems would arise if the etch holes were closed during a CVD process.

Although not shown in FIG. 2, when an infrared ray enters the resistor 151 through the polysilicon films (i.e., the films identified by the reference numerals 104 and 106 in FIG. 1F) surrounding the cavity, the temperature of the resistor 151 rises and the resistance value thereof changes with this rise in temperature. By measuring this variation in resistance value, the infrared sensor having the structure shown in FIG. 2 can detect the intensity of the infrared ray that has entered the resistor 151.

To increase the responsivity of the infrared sensor, the rise in the temperature of the resistor 151 upon the incidence of an infrared ray onto the resistor 151 needs to be increased. For that purpose, the resistor 151 functioning as an infrared sensing element is preferably thermally insulated from its external environment as fully as possible.

The conduction of heat between the resistor 151 and its external environment may be classified into conduction of heat between the resistor 151 and the substrate 101 by way of the supporting member 152 connecting them and conduction of heat from the resistor 151 through its surrounding gas.

The conduction of heat by way of the supporting member 152 decreases as the cross-sectional area of the thinnest portions of the supporting member 152 decreases and as the distance from those portions to the substrate 101 increases. According to the micro-electro-mechanical systems (MEMS) technologies, for example, portions of the supporting member 152 that are connected to the substrate 101 (i.e., the connecting portions) may be two columns of $Si_3N_4$ with a cross-sectional area of 3 μm² and a length of 50 μm as shown in FIG. 2. In that case, the thermal conductance will be 3×10⁻⁷ W/K.

Meanwhile, the thermal conductance through the gas that surrounds the resistor 151 decreases as the pressure of the gas decreases. That is why to increase the sensitivity of the infrared sensor, the pressure of the gas surrounding the sensing element needs to be reduced.

In the conventional manufacturing process that has already been described with reference to FIGS. 1A through 1F, however, the pressure inside the cavity 112 is maintained at about 500 mTorr (=approximately 67 Pa) by the remaining gas after the process step shown in FIG. 1E has been performed. By performing a vacuum high-temperature process after the cavity 112 has been created, the internal hydrogen diffuses and leaves the cavity 112, thus decreasing the pressure inside the cavity 112 to a certain degree. However, even after having been heated to that high temperature, $SiH_4$ gas or $H_2$ gas still cannot be exhausted out of the cavity 112 but remains there.

In an infrared image sensor of the bolometer type, for example, its sensitivity changes with the pressure of the air surrounding the sensing element as shown by the curve in FIG. 3. Such a relationship is described in "Uncooled Infrared Imaging Arrays and Systems", Academic Press, p. 115, for example.

In the graph of FIG. 3, the ordinate represents the sensitivity and the abscissa represents the pressure of the atmosphere in the sensing element 12. As can be seen from this graph, the lower the pressure, the higher the sensitivity. For example, the sensitivity at a pressure of 50 mTorr is about three times as high as that at a pressure of 500 mTorr. That is why the pressure inside the cavity is preferably 50 mTorr or less.

Also, the supporting member 152 of the sensing element 151 of the infrared sensor has a fine structure such as that shown in FIG. 2. For that reason, if the substrate were heated to an excessively high temperature in the process step shown in FIG. 1F, then thermal stress would be caused in, and might do some damage on, the supporting member 152.

Furthermore, if the substrate were heated to a high temperature of 660° C. or more, then Al used in the wiring of the sensor would melt. To avoid this problem, the substrate needs to be heated to less than this temperature. Meanwhile, since the outward diffusion rate of $H_2$ is very small at this temperature, it is not possible to expect the effect of increasing the degree of vacuum significantly from this heating process.

Consequently, according to the conventional manufacturing process in which the etch holes are closed by a CVD process, it is difficult to further increase the degree of vacuum of the cavity 112 and thereby increase the responsivity.

Even if the method that has already been described with reference to FIG. 39 is adopted to increase the degree of vacuum, it is extremely difficult to arrange the getter shown in FIG. 39 in a very small cavity with good yield. As a typical conventional getter, St 171 produced by SAES Getters S. p. A., of which the headquarters are located in Italy, is known in the art. Such a getter is formed by making a getter material by sintering a powder consisting essentially of Zr and depositing the getter material on the surface of a heater. The heater usually has a wire shape and the overall thickness of the getter exceeds 1 mm.

Also, if the size of the vacuum package (cap member) is reduced to 1 mm or less, it becomes even more difficult to arrange the gettering agent in the vacuum package by the conventional method. For example, if each of a lot of infrared sensing elements is encapsulated within a micro vacuum package with dimensions of about 100 μm×100 μm, then it is very difficult and troublesome to arrange the gettering agent in one of those vacuum packages after another. In particular, in the conventional process in which a high vacuum is created inside a cap member by a getter as disclosed in Japanese Patent Application Laid-Open Publication No. 2003-17672, the getter with a size of several mm or more is fixed with solder, for example. It is not easy to carry out such a process step by a normal semiconductor silicon process, thus increasing the cost and making it impossible to apply the technique to an ultra small vacuum package.

In most of conventional degree-of-vacuum sensing techniques, the Pirani gage thereof is designed in order to measure the degree of vacuum in the vacuum chamber of a big apparatus. That is why even a relatively small Pirani gage has a sensing element with a length of about 0.2 inch. Consequently, the conventional Pirani gage is not qualified to measure the internal pressure of the ultra small vacuum package mentioned above.

Also, the method of determining the degree of vacuum as disclosed in Japanese Patent Application Laid-Open Publication No. 10-224297 is designed for a small vacuum package but uses the deformation of the infrared input portion 418 of the supporting portion 419 that defines the cavity 413. Thus, according to this technique, it is possible to determine whether or not a vacuum has been created in the cavity 413 and sense how much the degree of vacuum has increased or decreased but it is not possible to figure out the absolute value of the degree of vacuum.

To calculate the absolute value of a degree of vacuum, a method of evaluating the relationship between the degree of vacuum and the output signal in advance may be adopted. That is to say, the variation in the magnitude of deformation of the infrared input portion 418 or the variation in the resistance value of the diffused resistor 417 needs to be calculated and calibrated with respect to the degree of vacuum of the cavity 413.

If such a method were adopted for the electronic device described above, then the supporting member 417 should be subjected to a machining process of cutting a hole through it such that the cavity 413 of the electronic device shown in FIG. 40 is connected to, and evacuated by a vacuum system, and resistance value of the diffused resistor 417 should be measured while monitoring the degree of vacuum with the vacuum system.

However, it should be very difficult, and would take a lot of cost, to connect a very small cavity to a vacuum system by making such a device by machining. Thus, it is not a practical choice.

Furthermore, even if a small hole is cut through the vacuum package and then the whole device is just put into a vacuum system in order to evaluate the relationship between the degree of vacuum and the output signal in advance, a vacuum will be created not only inside the package but also outside of it. Thus, no deformation will be caused due to a pressure difference and the object described above is not achievable.

Meanwhile, it is possible to predict the magnitude of deformation of the infrared input portion 418 with respect to the absolute value of the degree of vacuum and estimate the variation in the resistance value of the diffused resistor 417 by computer simulations. In that case, however, the degree of vacuum can be calculated roughly but the absolute value thereof cannot be figured out accurately. Besides, to sense the change of the degree of vacuum accurately, the infrared input portion 418 must be further thinned and must have a greater magnitude of deformation. For that purpose, the strength of the infrared input portion 418 should be sacrificed. That is why the accuracy cannot be increased beyond a certain limit.

On top of that, to achieve an even higher degree of vacuum, the supporting member 419 and infrared input portion 418 need to have increased mechanical strengths to withstand a high vacuum. However, if the mechanical strengths are increased, then deformation is less likely to be caused and it will be more difficult to measure the degree of vacuum based on the deformation. That is why the method described above cannot cope with a high vacuum situation.

As described above, the conventional technique disclosed in Japanese Patent Application Laid-Open Publication No. 10-224297 can be used to sense an increase or decrease in the degree of vacuum in a cavity but cannot be used to figure out the absolute value of the degree of vacuum, which is a serious problem.

In order to overcome the problems described above, an object of the present invention is to provide an electronic device, which is arranged in a cavity at least partially and which can measure the pressure in the cavity, and a method for fabricating such an electronic device.

Another object of the present invention is to provide an electronic device, which can easily maintain or increase the degree of vacuum in an ultra small vacuum package, and a method for fabricating such an electronic device.

SUMMARY OF THE INVENTION

An electronic device according to the present invention includes: a cavity, which is surrounded with a cavity wall portion and which has a reduced pressure; a gettering thin film, which is arranged within the cavity and has the function of adsorbing a surrounding substance; and an activating portion, at least a part of which is arranged within the cavity and which has the function of activating the gettering thin film by generating heat.

In one preferred embodiment, the activating portion includes: a heat generating portion that generates heat responsive to current; and a conductive line for supplying the current to the heat generating portion. A part of the activating portion that is in contact with either the heat generating portion or the conductive line is made of a material, of which the melting point is higher than an activating temperature.

In another preferred embodiment, the activating temperature is equal to or higher than 300° C.

In another preferred embodiment, the gettering thin film is a film of a patterned deposit.

In another preferred embodiment, the gettering thin film has a thickness of 100 µm or less.

In another preferred embodiment, the electronic device further includes a pressure measuring element, at least a part of which is arranged within the cavity. The pressure measuring element includes a thin-film pattern with the function of generating and/or absorbing heat and the function of sensing the temperature of a portion of the cavity.

In another preferred embodiment, the thin-film pattern has such planar dimensions as falling within a 1 mm square rectangular area.

In another preferred embodiment, the gettering thin film has such planar dimensions as falling within a 1 mm square rectangular area.

In another preferred embodiment, the electronic device further includes a heat insulating portion with the function of increasing heat insulation between the cavity wall portion and the heat generating portion.

In another preferred embodiment, the heat generating portion generates the heat as Joule heat by utilizing its electrical resistance.

In another preferred embodiment, the heat generating portion is a Peltier element.

In another preferred embodiment, the electronic device includes at least one infrared sensing element and at least one visible light detecting element, which are arranged on the substrate, and the cavity is shaped so as to surround at least a portion of the infrared sensing element and not surround a portion of the visible light detecting element.

In another preferred embodiment, a plurality of visible light detecting elements, including the visible light detecting element, are arranged on the substrate.

In another preferred embodiment, a plurality of infrared sensing elements, including the infrared sensing element, and a plurality of the visible light detecting elements, including the visible light detecting element, are arranged on the substrate.

An electronic device fabricating method according to the present invention includes the steps of: defining a thin-film pattern, including a heat generating portion with the function of generating or absorbing heat and a temperature sensing portion with the function of sensing a temperature, on a substrate by a thin film deposition technique; and making a cavity wall portion that covers at least a portion of the substrate and at least parts of the heat generating portion and the temperature sensing portion.

Another electronic device fabricating method according to the present invention includes the steps of: forming a sacrificial layer on a selected area of a substrate so as to cover a portion of the substrate; making a heat generating portion with the function of generating or absorbing heat over the sacrificial layer by a thin film deposition technique; removing at least a portion of the sacrificial layer; making a temperature sensing portion with the function of sensing a temperature by a thin film deposition technique; and shaping a cavity wall portion so as to cover the substrate, the heat generating portion and the temperature sensing portion at least partially.

Still another electronic device fabricating method according to the present invention includes the steps of: forming an etch stop layer with etch resistivity on the surface of a substrate, on which an electronic device is going to be fabricated and which also functions as a sacrificial layer; cutting an opening through the etch stop layer; making a heat generating portion with the function of generating or absorbing heat over the etch stop layer; removing a portion of the substrate through the opening; making a temperature sensing portion with the function of sensing a temperature; and shaping a cavity wall portion so as to cover the substrate, the heat generating portion and the temperature sensing portion at least partially.

Yet another electronic device fabricating method according to the present invention includes the steps of: preparing a substrate, on which an electronic device is going to be fabricated, which includes an etch stop layer with etch resistivity either on or under its surface, and which also functions as a sacrificial layer; cutting an opening through the etch stop layer; making a heat generating portion with the function of generating or absorbing heat over the substrate; removing a portion of the substrate through the opening; making a temperature sensing portion with the function of sensing a temperature; and shaping a cavity wall portion so as to cover the substrate, the heat generating portion and the temperature sensing portion at least partially.

In one preferred embodiment, the method further includes the steps of: forming another sacrificial layer that covers the heat generating portion and the temperature sensing portion at least partially; forming a cavity wall prototype film that covers the two sacrificial layers; cutting an opening through a portion of the cavity wall prototype film so as to partially expose the surface of at least one of the two sacrificial layers; removing the two sacrificial layers at least partially through the opening; and making a seal member by a thin film deposition technique to close the opening with the seal member.

In another preferred embodiment, the heat generating portion has a size of 1 mm or less.

In another preferred embodiment, the step of making a seal member includes performing the thin film deposition process at a pressure of 10 Torr or less.

Yet another electronic device fabricating method according to the present invention includes the steps of: making an activating portion with the function of activating a surrounding material when generating heat by a thin film deposition technique; forming a gettering thin film with the function of adsorbing a surrounding substance by a thin film deposition technique such that the gettering thin film contacts with the activating portion; and making a cavity wall portion that has a space covering the substrate and the activating portion at least partially.

Yet another electronic device fabricating method according to the present invention includes the steps of: forming a sacrificial layer on a selected area of a substrate so as to cover a portion of the substrate on which an electronic device is going to be fabricated; making an activating portion with the function of activating a surrounding material when generating heat over the sacrificial layer; depositing a gettering material with the function of adsorbing a surrounding substance in contact with the activating portion; removing the sacrificial layer at least partially; and making a cavity wall portion that has a space covering the substrate and the activating portion at least partially.

Yet another electronic device fabricating method according to the present invention includes the steps of: forming an etch stop layer with etch resistivity on the surface of a substrate, on which an electronic device is going to be fabricated and which also functions as a sacrificial layer; cutting an opening through the etch stop layer; making an activating portion with the function of activating a surrounding material when generating heat over the etch stop layer; depositing a gettering material with the function of adsorbing a surrounding substance in contact with the activating portion; removing a portion of the substrate through the opening; and shaping a cavity wall portion so as to cover the substrate and the activating portion at least partially.

Yet another electronic device fabricating method according to the present invention includes the steps of: preparing a substrate, on which an electronic device is going to be fabricated, which includes an etch stop layer with etch resistivity either on or under its surface, and which also functions as a sacrificial layer; cutting an opening through the etch stop layer; making an activating portion with the function of activating a surrounding material when generating heat on the substrate; removing a portion of the substrate through the opening; and shaping a cavity wall portion so as to cover the substrate and the activating portion at least partially.

In one preferred embodiment, the method further includes the steps of: forming another sacrificial layer that covers the activating portion at least partially; shaping a cavity wall prototype film so as to cover the two sacrificial layers; cutting an opening through a portion of the cavity wall prototype film so as to partially expose the surface of at least one of the two sacrificial layers; removing the two sacrificial layers at least partially through the opening; and making a seal member by a thin film deposition technique to close the opening with the seal member.

In another preferred embodiment, the activating portion has a size of 1 mm or less.

In another preferred embodiment, the step of making a seal member includes performing the thin film deposition process at a pressure of 10 Torr or less.

DETAILED DESCRIPTION OF PREFERRED EMBODIMENTS

Embodiment 1

Hereinafter, a first preferred embodiment of the present invention will be described with reference to the accompanying drawings.

An electronic device according to this preferred embodiment is an image sensor including an infrared sensing element and a visible light detecting element that are integrated together on the same substrate. An exemplary configuration for such an image sensor including an infrared sensing element and a visible light detecting element is disclosed in Japanese Patent Application Laid-Open Publication No. 2003-17672, for example.

By arranging both the infrared sensing element and visible light detecting element on the same substrate by a semiconductor process, the manufacturing cost and the device size can be both reduced. If an infrared image sensor and a visible light image sensor are separately provided on two different substrates, then optical alignment needs to be carried out accurately after that and the misalignment between the infrared image and visible light image needs to be corrected. According to this preferred embodiment, however, both of them are integrated together on the same substrate (or chip), and therefore, such a problem can be avoided.

Figure 1A:
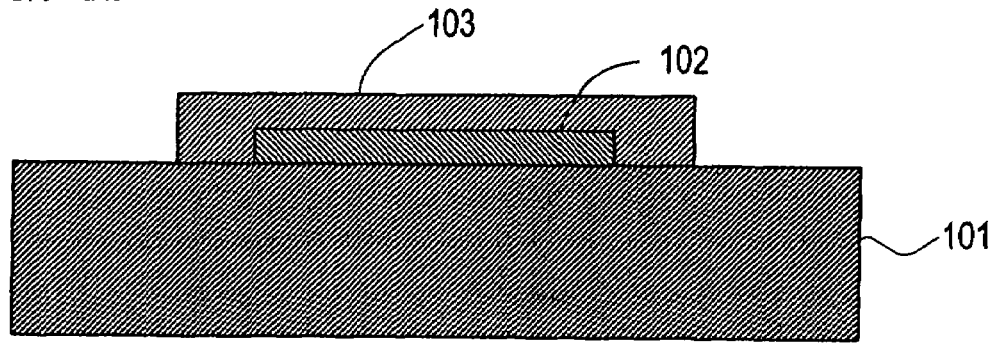
FIG. 1A is a cross-sectional view illustrating a process step of a conventional method for fabricating an electronic device.
Figure 1B:
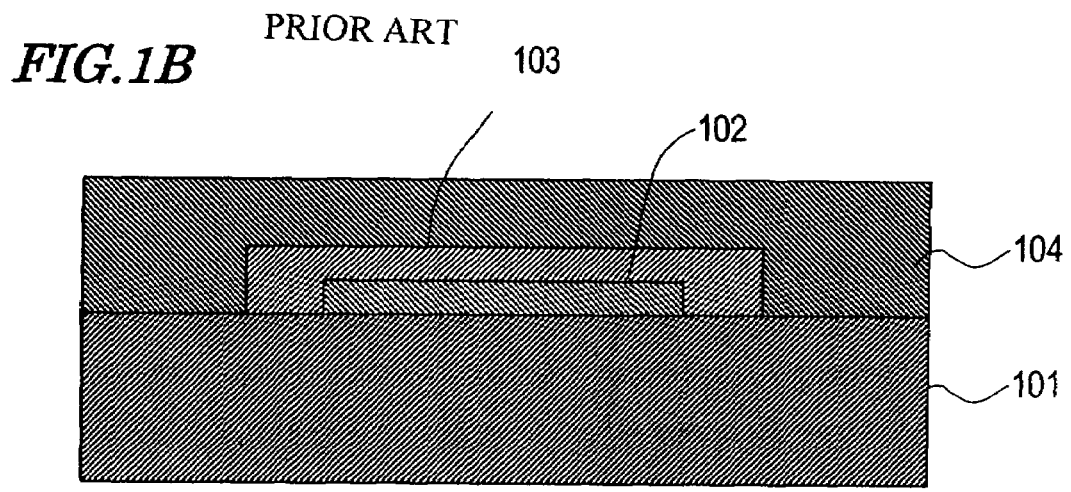
FIG. 1B is a cross-sectional view illustrating another process step of the conventional method for fabricating an electronic device.
Figure 1C:
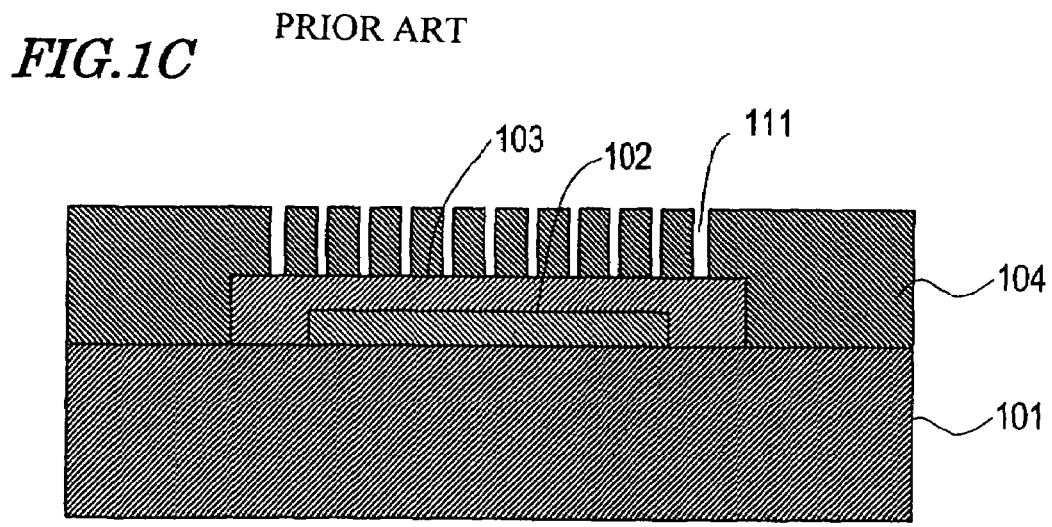
FIG. 1C is a cross-sectional view illustrating another process step of the conventional method for fabricating an electronic device.
Figure 1D:
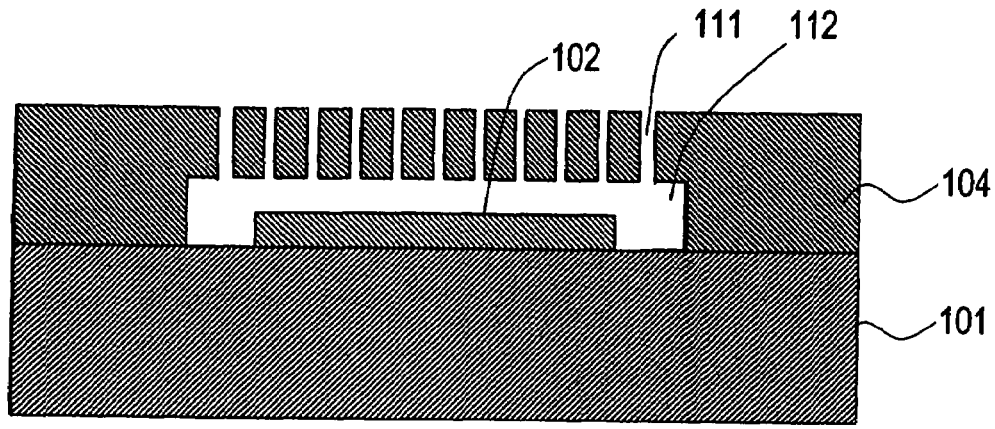
FIG. 1D is a cross-sectional view illustrating another process step of the conventional method for fabricating an electronic device.
Figure 1E:
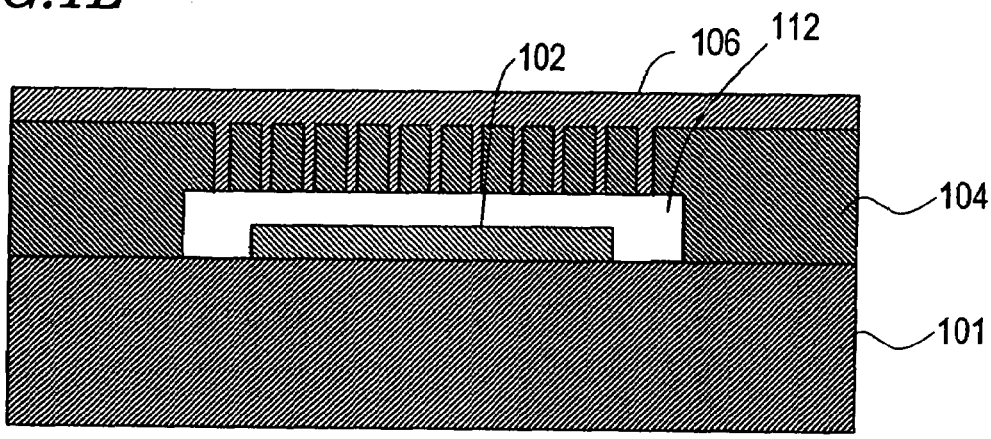
FIG. 1E is a cross-sectional view illustrating another process step of the conventional method for fabricating an electronic device.
Figure 1F:
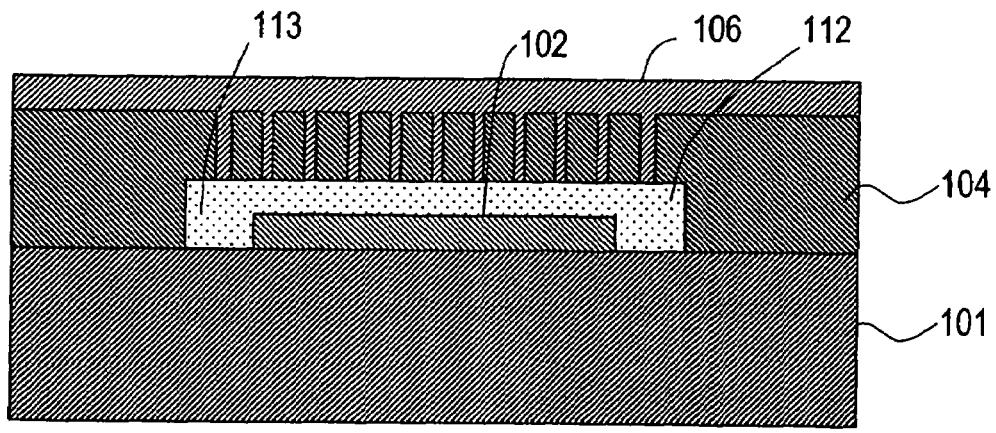
FIG. 1F is a cross-sectional view illustrating another process step of the conventional method for fabricating an electronic device.
Figure 2:
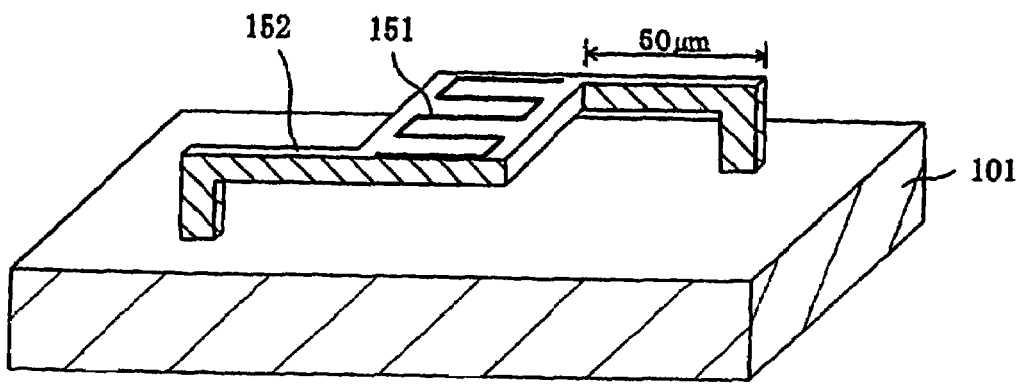
FIG. 2 is a perspective view illustrating the structure of a bolometer type infrared sensor around its sensing element.
Figure 3:
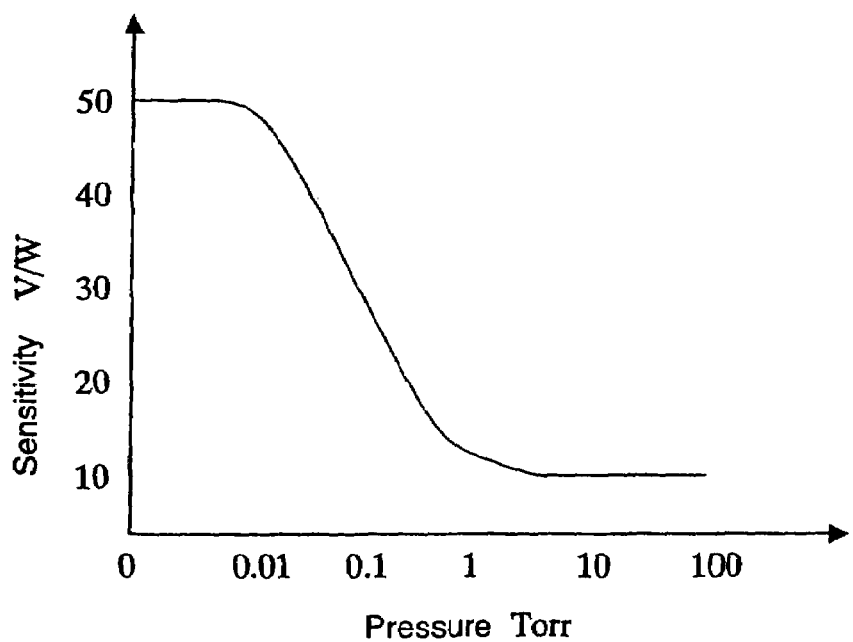
FIG. 3 is a graph showing how the sensitivity changes with the pressure of an atmosphere in the sensing element of an infrared image sensor.
Figure 4A:
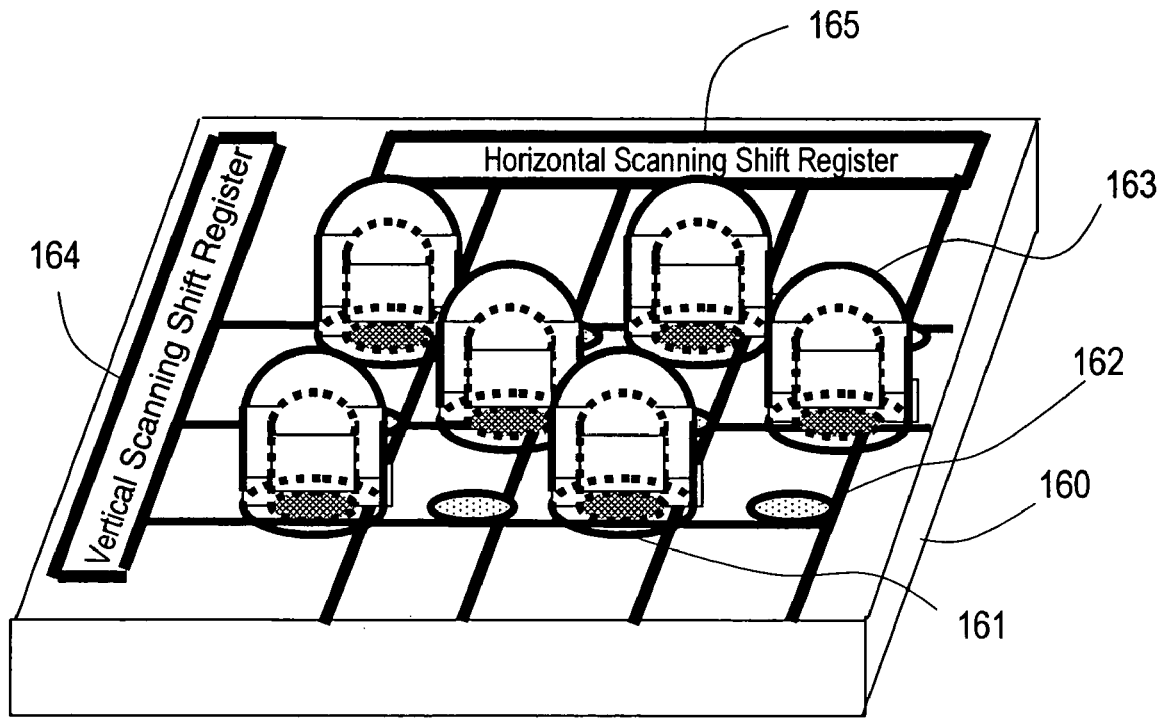
FIG. 4A is a perspective view illustrating a first preferred embodiment of the present invention and FIG. 4B is an equivalent circuit diagram thereof.
Figure 4B:
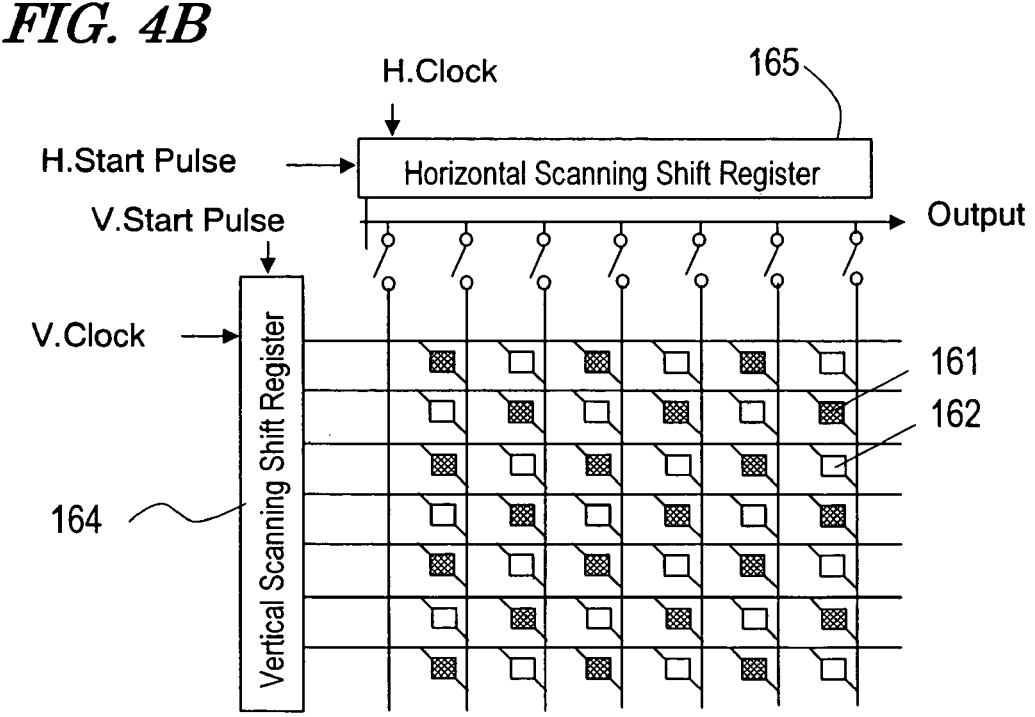

As shown in FIGS. 4A and 4B, the electronic device of this preferred embodiment includes a silicon substrate 160, a plurality of infrared sensing elements 161 and visible light detecting elements 162, which are arranged in columns and rows to define a matrix pattern (or an array) on the silicon substrate 160, and a readout circuit section, which consists of a vertical scanning register 164 and a horizontal scanning register 165.

Each of the infrared sensing elements 161 that are arranged on the silicon substrate 160 is individually covered with a micro vacuum package 163.

It should be noted that FIGS. 4A and 4B show the arrangement of the respective sections just schematically and does not illustrate the specific shapes and actual scales of the real electronic device. Actually, the infrared sensing elements 161 are preferably designed bigger than the visible light detecting elements 162 (e.g., to have a size of about 50 μm and) to exhibit a predetermined sensitivity. If the size of the infrared sensing elements 161 is much bigger than that of the visible light detecting elements 162, then a preferred layout of the infrared sensing elements 161 and visible light detecting elements 162 does not match that shown in FIG. 1.

Figure 5:
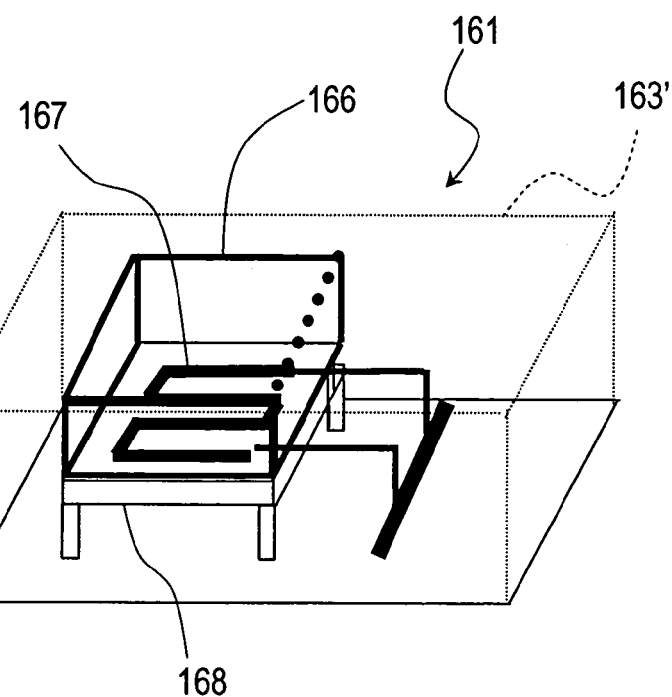
FIG. 5 is a perspective view schematically illustrating the configuration of an infrared sensing element according to the first preferred embodiment of the present invention.

FIG. 5 is a perspective view schematically illustrating the configuration of a typical one of the infrared sensing elements 161 shown in FIGS. 4A and 4B. This infrared sensing element 161 includes an infrared absorbing portion 166, a microheater portion 167 and a microheater supporting portion 168, all of which are provided within the cavity 163' of a micro vacuum package.

The microheater portion 167 is a resistor made of a variable resistance material and has two functions in this preferred embodiment. One of the two functions is to sense the temperature by a variation in resistance and the other function is to generate heat as Joule heat. As will be described later, the intensity of an incoming infrared ray is detected by utilizing the temperature sensing function of the microheater portion 167 and the degree of vacuum (i.e., the pressure) in the cavity can be detected by utilizing the heat generating function and the temperature sensing function of the microheater portion 167 in combination.

The microheater portion 167 may be made of a semiconductor such as silicon, a metal oxide such as TiO (titania) or $VO_x$ (vanadium oxide), a metal such as Ti (titanium) or Pt (platinum) or a silicide thereof. These materials are known as having big resistance variation coefficients and can exhibit excellent temperature sensing functions. Optionally, B, As, Sr, Cu or any other dopant may be introduced into any of these materials. For example, B-doped polysilicon or Sr-doped TiO can control the electrical resistance value appropriately by adjusting the doping level of any of these dopants.

Figure 6:
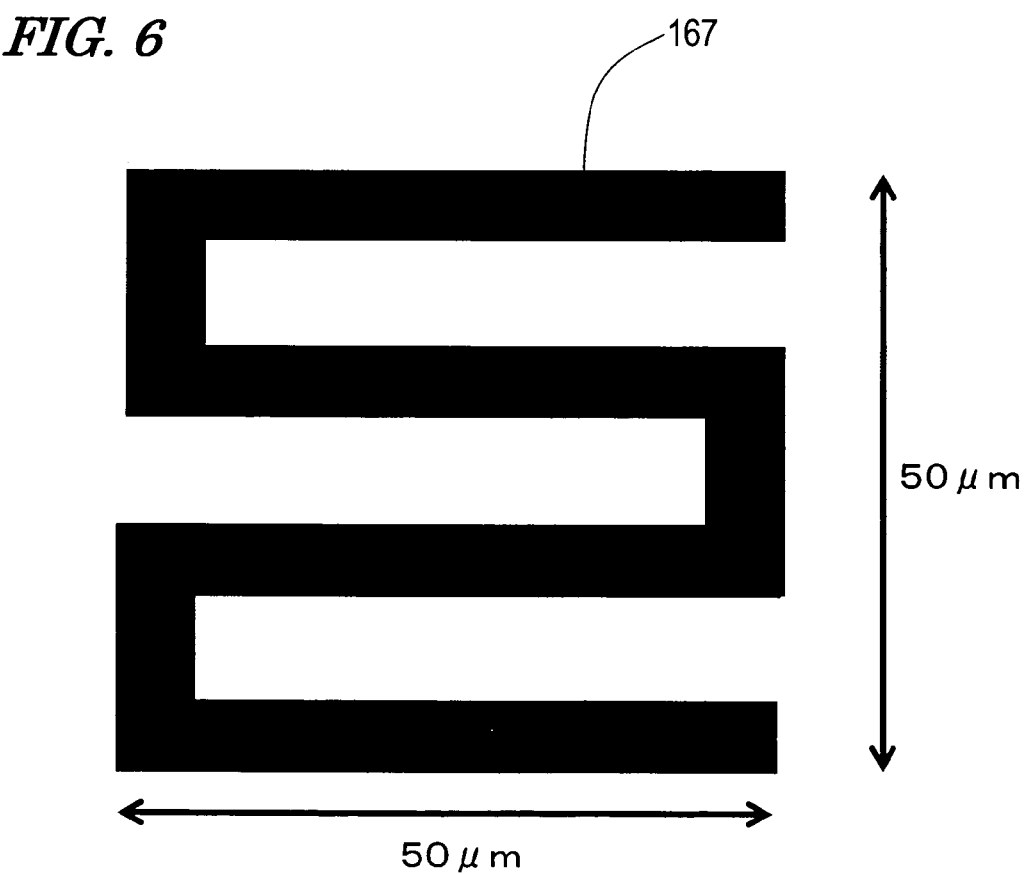
FIG. 6 is a plan view illustrating an exemplary layout for a microheater portion 167.

In a preferred embodiment, the planar sizes of the microheater portion 167 are no greater than a rectangular area of 1 mm square. As shown in FIG. 6, a preferred planar layout of the microheater portion 167 has a winding pattern falling within a rectangular area of 50 μm square. This layout is preferably adopted to make a relatively long resistor pattern in a relatively narrow area.

As shown in FIG. 5, the microheater portion 167 of this preferred embodiment is held by the microheater supporting portion 168 so as to be spaced apart from (e.g., 1 μm higher than) the surface of the silicon substrate 160 (see FIG. 4A).

If one side of the rectangular area that defines the planar sizes of the microheater portion 167 exceeded 1 mm, then the deformation of the microheater portion 167 would be significant. In that case, the microheater portion 167 should be further spaced apart from the substrate 160. That is why it is against the downsizing trend of electronic devices and is not preferred to design the microheater portion 167 in such a big size. Consequently, the microheater portion 167 is preferably designed so as to fall within the rectangular area of 1 mm square. Such a small microheater portion 167 is obtained by depositing a thin film of a material, achieving the functions described above, by a thin film deposition technique and then patterning this thin film into a desired shape by photolithography and etching techniques. The thin film may have a thickness of 50 nm to 1 μm, for example.

The infrared absorbing portion 166 may be made of a material that can absorb infrared radiations (e.g., $SiO_2$). When exposed to an infrared ray, the infrared absorbing portion 166, made of such a material, absorbs the infrared ray and generates heat. As a result, the temperature of the infrared absorbing portion 166 rises and the temperature of the microheater portion 167 also rises accordingly. Since the microheater portion 167 is made of a variable resistance material, the electrical resistance thereof changes as its temperature rises. By getting this variation in electrical resistance read and sensed by the readout circuit shown in FIGS. 4A and 4B (including the vertical scanning register 164 and horizontal scanning register 165), the intensity of the incident infrared ray can be known.

As shown in FIG. 5, the microheater supporting portion 168 spaces the microheater portion 167 from the surface of the substrate by an insulator that has been patterned into a column shape with a relatively small cross-sectional area compared to its length. The microheater supporting portion 168 has low thermal conductivity and the thermal conductance between the microheater portion 167 and the substrate 160 is low. As a result, the rise in the temperature of the microheater portion 167 upon the exposure to an infrared ray and the responsivity to the infrared ray can be increased.

Figure 7:
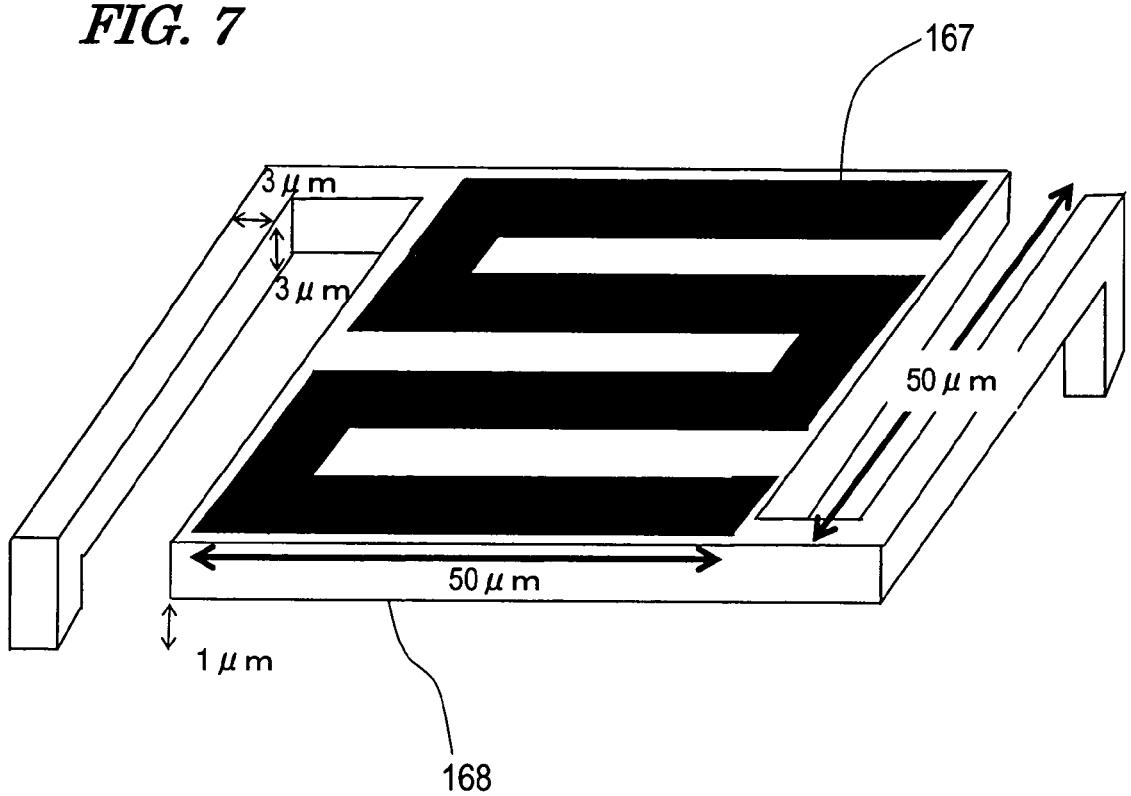
FIG. 7 is a perspective view illustrating an exemplary configuration for a microheater supporting portion 168.

The thermal conductance between the microheater supporting portion 168 and the substrate 160 can be calculated in advance once the shape and material of the microheater supporting portion 168 are determined. For example, if the microheater supporting portion 168 has a square plate shape of about 50 μm square, which is supported by two bars with a cross-sectional area of 3×3 μm² and a length of about 50 μm, and made of $Si_3N_4$ as shown in FIG. 7, then the thermal conductance calculates $3 \times 10^{-7}$ W/K. As shown in FIG. 7, such a small microheater supporting portion can be made by the MEMS (microelectromechanical system) technologies.

The visible light detecting elements 162 shown in FIGS. 4A and 4B may be photodiodes, for example, and can detect the intensity of incoming visible light by measuring the current or voltage that has been produced upon the exposure to the visible light. The visible light detecting elements 162 of this preferred embodiment are preferably formed by doping selected areas of the surface of the silicon substrate 160 with a dopant. The visible light detecting elements 162 may be formed before, during or after the process step of forming the readout circuit on the silicon substrate. In one preferred embodiment, the visible light detecting elements 162 are formed before the process step of making the infrared sensing elements 161 is carried out.

In this preferred embodiment, the infrared sensing elements 161 and visible light detecting elements 162 are formed on the same silicon substrate by a semiconductor process, thus providing infrared and visible light image sensors as a single chip at a reduced cost.

The intensities of the infrared ray and visible light, which have entered the infrared sensing element 161 and the visible light detecting element 162, respectively, are converted by these sensing and detecting elements into electrical signals, which are then read by the readout circuit 164 and 165 sequentially. Since the infrared sensing elements 161 and visible light detecting elements 162 are arranged in matrix on the same substrate, electrical signals representing the infrared ray and visible light can be obtained. An imaging method using a photodetector section with a matrix pattern is disclosed in detail in Japanese Patent Application Laid-Open Publication No. 11-326037, for example.

The micro vacuum package of this preferred embodiment covers each of the infrared sensing elements 161 and maintains a reduced-pressure state (e.g., at a pressure of about 50 mTorr) inside. By setting the pressure of the atmospheric gas in the infrared sensing elements 161 low, the thermal conductance between the microheater portion 167 and the substrate 160 and the thermal conductance between the microheater portion 167 and the external atmosphere can be both reduced and the responsivity to the infrared ray can be increased.

Each of the vacuum packages may have any of various shapes. For example, each vacuum package may have an internal space that is big enough to store the microheater supporting portion 168 shown in FIG. 7 and that may have a height of about 3 μm to about 1,000 μm.

The micro vacuum package may be formed by the method disclosed in Japanese Patent Application Laid-Open Publication No. 11-326037, for example. Specifically, ringlike bonding faces of a metal, for example, are defined on the opposed faces of a cap member and a substrate, which have been prepared in advance, and then press-fitted with each other in a vacuum. Alternatively, a cavity may be defined by a semiconductor process (including thin film deposition, photolithography and etching process steps). In that case, the manufacturing cost can be further reduced and the device can be further downsized.

Method of Detecting Degree of Vacuum

Next, an exemplary method for detecting the internal pressure (i.e., the degree of vacuum) of a micro vacuum package according to this preferred embodiment will be described.

The microheater portion 167 of this preferred embodiment is made of a variable resistance material as described above, and therefore, has electrical resistance that changes with its temperature. That is why if the microheater portion 167 has its electrical resistance measured while being supplied with current externally, the temperature of the microheater portion 167 can be figured out.

Meanwhile, the microheater portion 167 also has its electrical resistance (i.e., a value at a predetermined temperature) and current measured while being irradiated with no infrared rays. By using these electrical resistance and current values measured, the quantity Q of heat generated by the microheater portion per unit time can be calculated according to the Joule's law. Specifically, if the electrical resistance measured on the microheater portion 167 is identified by R (ohms) and the current flowing through the microheater portion 167 is identified by I (ampere), Q is given by $$Q = I^2 R \text{ (watts)}$$

Therefore, by measuring the current and electrical resistance of the microheater portion 167, the quantity Q of heat generated by the microheater portion 167 can be known. If the temperature of the microheater portion 167 being supplied with the current is identified by T, the temperature of the substrate 160 is identified by T0, and the thermal conductance between the microheater portion 167 and the external environment is identified by g, then the following equation $$(T-T0) \times g = Q$$

is satisfied.

The thermal conductance g between the microheater portion 167 and the external environment is the sum of the thermal conductance $g_S$ about the heat propagating through the microheater supporting portion 168 and the thermal conductance $g_A$ about the heat propagating through the atmospheric gas inside the vacuum package as given by the following equation:

$$g = g_S + g_A$$

These two equations can be combined into the following equation:

$$(T-T0) \times (g_S + g_A) = Q$$

And this equation may be modified into:

$$g_A = Q/(T-T0) - g_S$$

Among the parameters on the right side of this equation, Q can be calculated based on the values of the current I and electrical resistance of the microheater portion 167, $g_S$ is a predefined constant, and the substrate temperature T0 may be treated as a constant that is approximately equal to room temperature. Consequently, by measuring the temperature T, $g_A$ can be figured out.

On the other hand, the relationship between the thermal conductance $g_A$ through the atmospheric gas and the pressure of the atmospheric gas can be traced by either simulations or experiments. Thus, once the thermal conductance $g_A$ through the atmospheric gas is known, the internal pressure of the micro vacuum package can be obtained.

Figure 8:
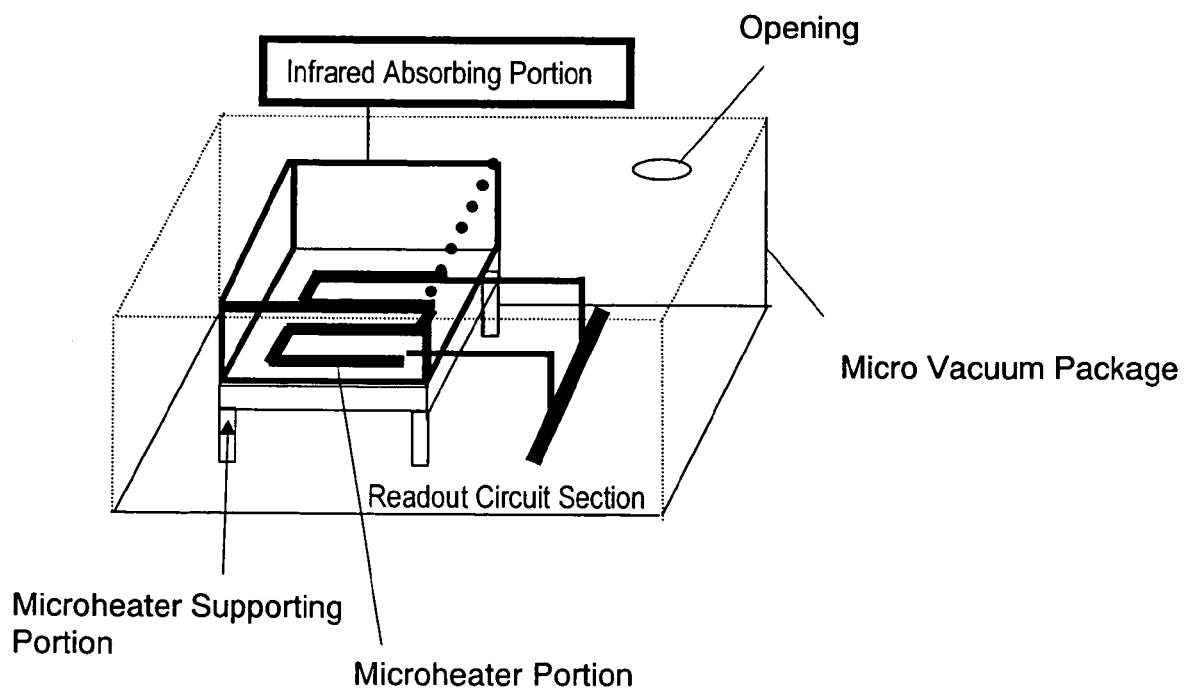
FIG. 8 is a perspective view illustrating a testing infrared sensing element.

In order to trace the relationship between the thermal conductance $g_A$ through the atmospheric gas and the pressure of the atmospheric gas by experiments, a test device may be prepared by cutting a small opening through the micro vacuum package as shown in FIG. 8 and may be arranged in a vacuum chamber. Through the opening of the micro vacuum package, the difference in pressure between the inside and outside of the micro vacuum package is ironed out. Thus, the pressure dependence of $g_A$ may be determined by calculating $g_A$ according to the equation described above while changing the internal pressure of the vacuum chamber.

Next, an exemplary specific configuration for the microheater portion 167 to be preferably used in this preferred embodiment will be described with reference to FIGS. 9A through 9D.

Figure 9A:
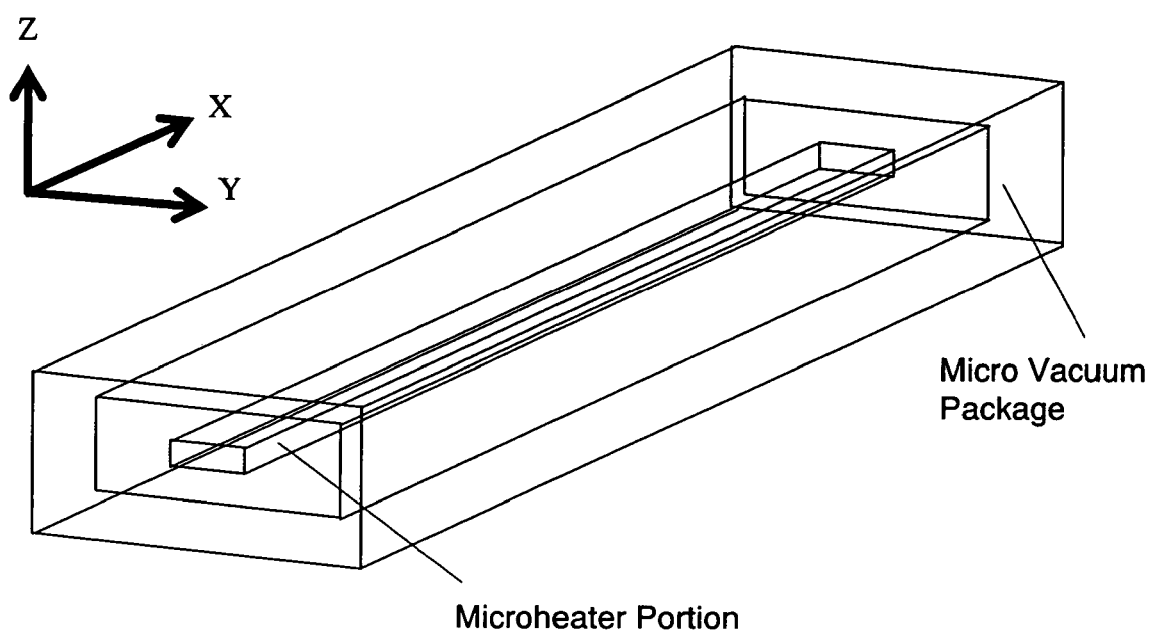
FIG. 9A is a perspective view illustrating the configuration of a microheater portion.
Figure 9B:
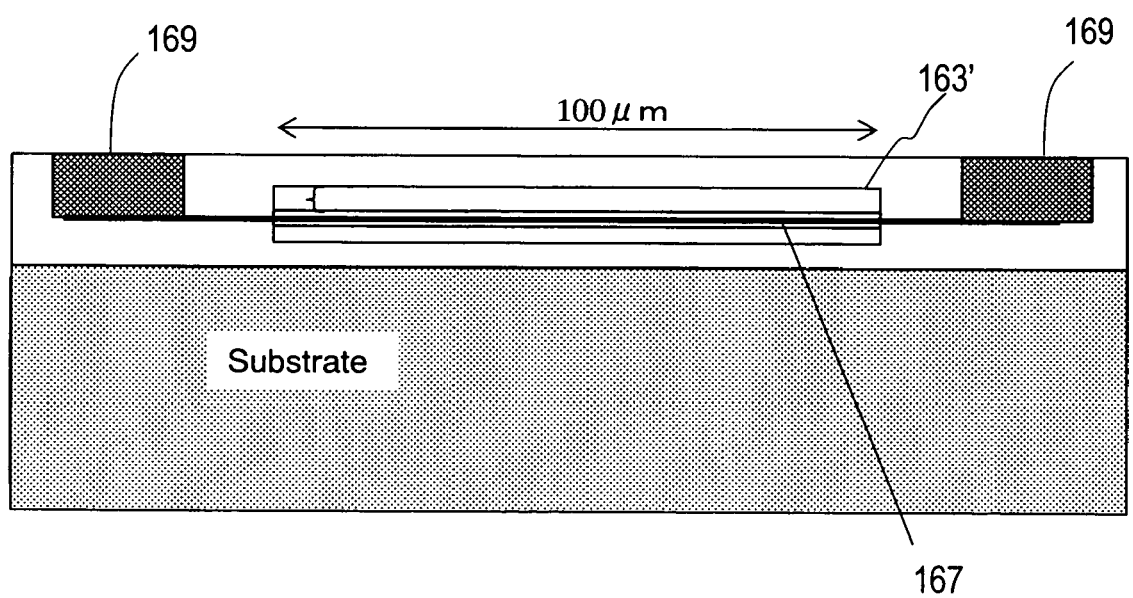
FIG. 9B is a cross-sectional view illustrating the configuration of the microheater portion as viewed perpendicularly to its bridge.
Figure 9C:
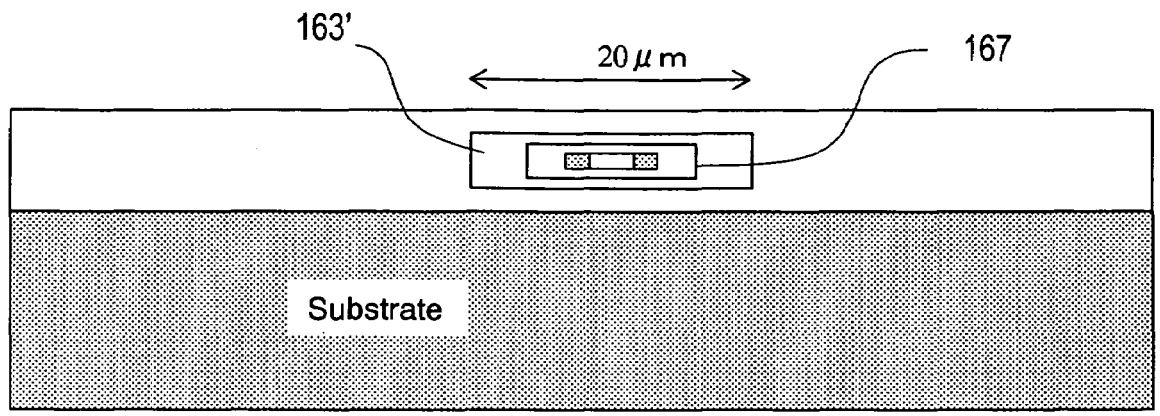
FIG. 9C is a cross-sectional view illustrating the configuration of the microheater portion as viewed parallel to the direction in which its bridge extends.

FIG. 9A is a perspective view illustrating the microheater portion 167 that is housed in a rectangular cavity (i.e., a micro vacuum package). FIG. 9B is a cross-sectional view thereof as viewed on a plane that is parallel to the XZ plane, while FIG. 9C is a cross-sectional view thereof as viewed on a plane that is parallel to the YZ plane. And FIG. 9D illustrates its layout on a plane that is parallel to the XY plane.

Figure 9D:
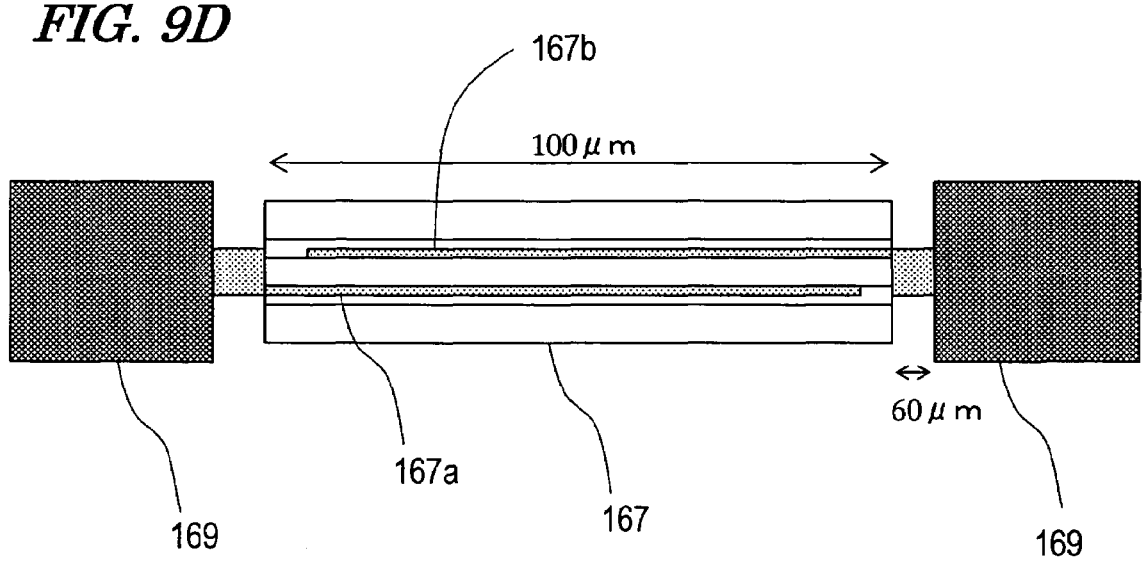
FIG. 9D is a plan view illustrating the configuration of the microheater portion.

As shown in FIGS. 9B through 9D, a bridge (i.e., a member functioning both as the microheater portion and as the microheater supporting portion) is arranged in a rectangular parallelepiped cavity with a width of about 20 μm, a height of about 3 μm and a longer-side length of about 100 μm. The bridge has a thickness of about 1 μm and a width of about 8 μm and extends through approximately the centerline of the cavity 163' in the longer side direction (having a length of about 100 μm).

The bridge of this preferred embodiment is made of silicon doped with some dopant (such as boron). Selected regions of the bridge (i.e., two linear regions extending parallel to each other) are doped more heavily than the other regions thereof and have reduced resistance. One end of the linearly extending, reduced-resistance heavily doped regions is electrically connected to one of two aluminum electrode pads so as to perform the same function as a conductor line. When a predetermined voltage is applied between the two aluminum electrode pads, current flows through the portion of the bridge with the lower dopant concentration along the shorter side of the bridge.

Figure 10:
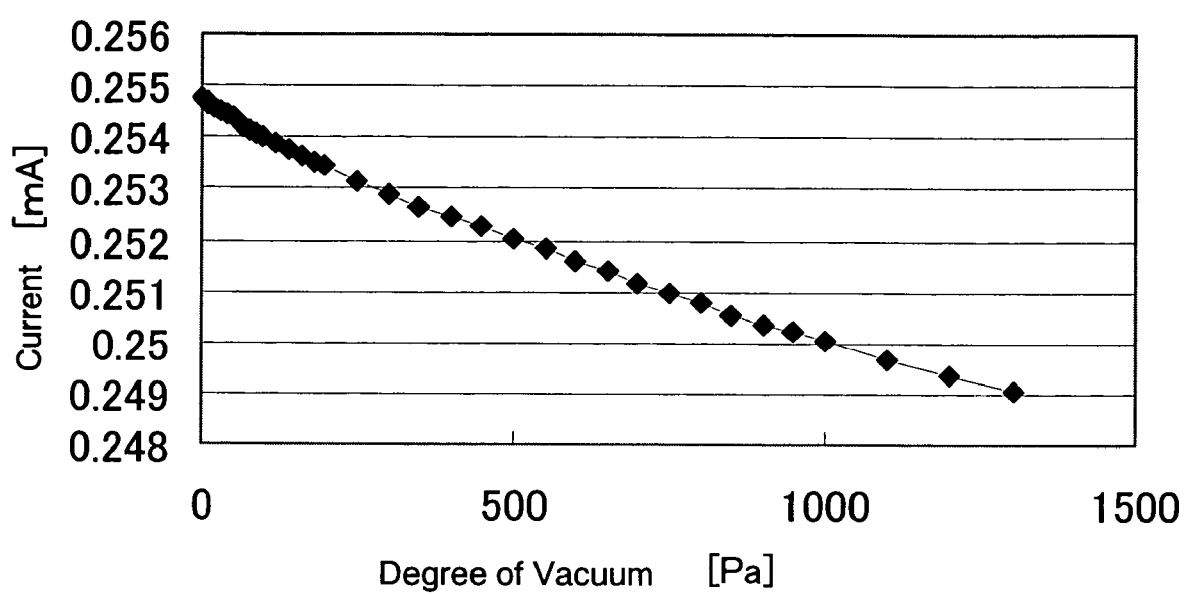
FIG. 10 is a graph showing how the electrical resistance changes with the degree of vacuum (or pressure) in the microheater portion.

FIG. 10 is a graph showing an exemplary relationship between the electrical resistance and the degree of vacuum (pressure) in the microheater portion shown in FIGS. 9A through 9D. As can be seen from this graph, as the pressure increases, the amount of current flowing through the microheater portion decreases. This means that as the higher the pressure, the smaller the rise in the temperature of the microheater portion and the decrease in the electrical resistance of the microheater portion.

It should be noted that the length and width of the resistor in the microheater portion 167 shown in FIGS. 9A through 9D are just examples. Thus, the configuration of the microheater portion is actually not limited to that illustrated in these drawings.

The microheater portion 167 of this preferred embodiment is used to measure not only the degree of vacuum but also the intensity of the infrared radiation. If the microheater portion needs to sense the infrared radiation in this manner, then the microheater portion preferably has a meandering pattern to increase its photosensitive area.

According to the relationship between the current (or electrical resistance) and the degree of vacuum shown in FIG. 10, the degree of vacuum (or pressure) inside the micro vacuum package (i.e., within the cavity) can be monitored in real time by measuring the current (or electrical resistance) of the microheater portion.

Hereinafter, a method for fabricating the microheater portion and micro vacuum package will be described with reference to FIGS. 11 through 23. In each of FIGS. 11 through 23, portion (c) is a plan view illustrating a main portion of the substrate, portion (a) is a cross-sectional view thereof as viewed on the plane A-A' and portion (b) is a cross-sectional view thereof as viewed on the plane B-B'.

Figure 11:
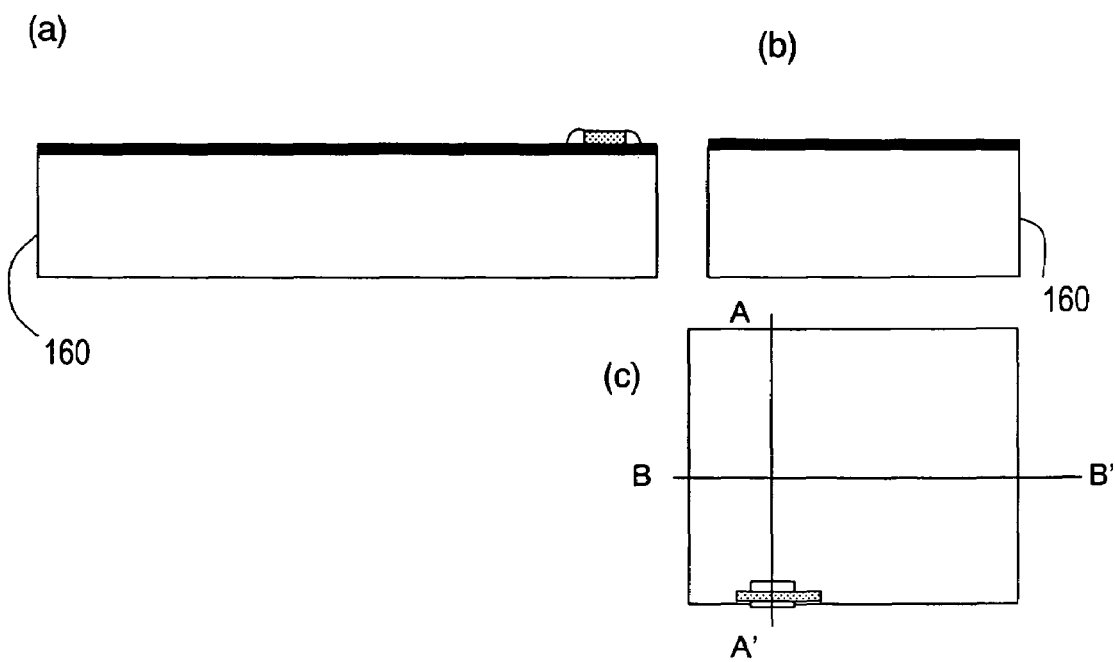
FIGS. 11(a), 11(b) and 11(c) are respectively a cross-sectional view as viewed on the A-A' plane, a cross-sectional view as viewed on the B-B' plane, and a plan view illustrating a process step for fabricating an electronic device according to the first preferred embodiment of the present invention.

First, as shown in FIG. 11, a readout circuit section (including transistors) is fabricated on the silicon substrate 160. The readout circuit section is preferably made up of CMOS circuits that have been integrated together on the silicon substrate and may be fabricated by known semiconductor integrated circuit fabrication technologies. Thereafter, although not shown, a visible light detecting element is fabricated on the silicon substrate 160.

Figure 12:
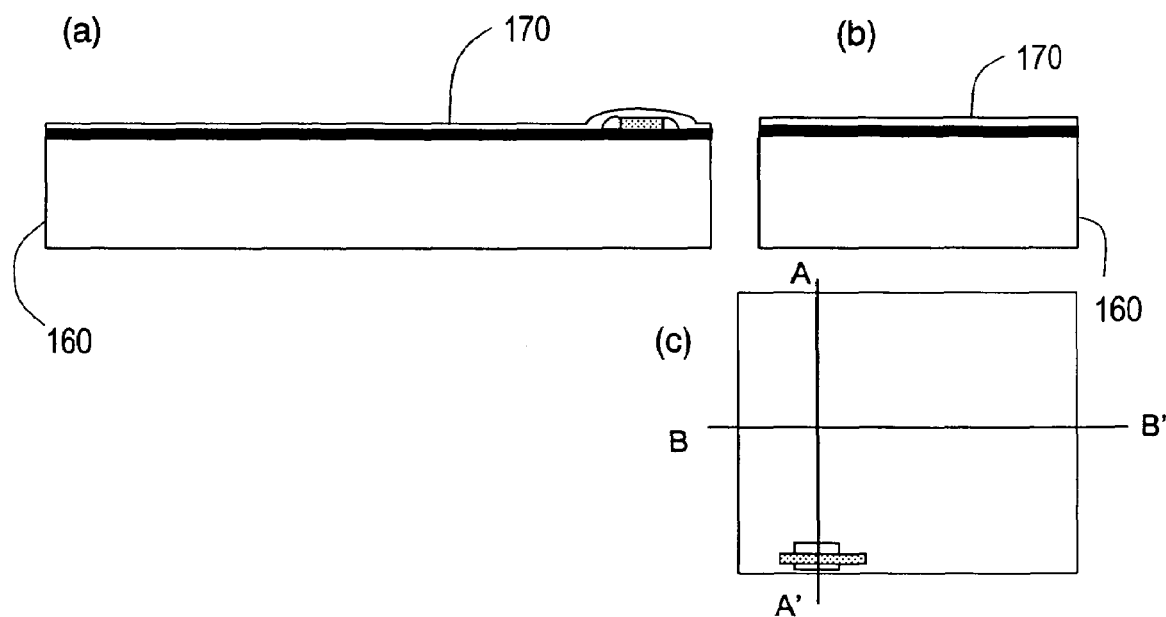
FIGS. 12(a), 12(b) and 12(c) are respectively a cross-sectional view as viewed on the A-A' plane, a cross-sectional view as viewed on the B-B' plane, and a plan view illustrating another process step for fabricating the electronic device of the first preferred embodiment of the present invention.

Next, as shown in FIG. 12, a silicon dioxide film 170 is deposited to a thickness of 100 nm, for example, over the entire upper surface of the silicon substrate 160 by a thin film deposition technique such as a CVD process.

Figure 13:
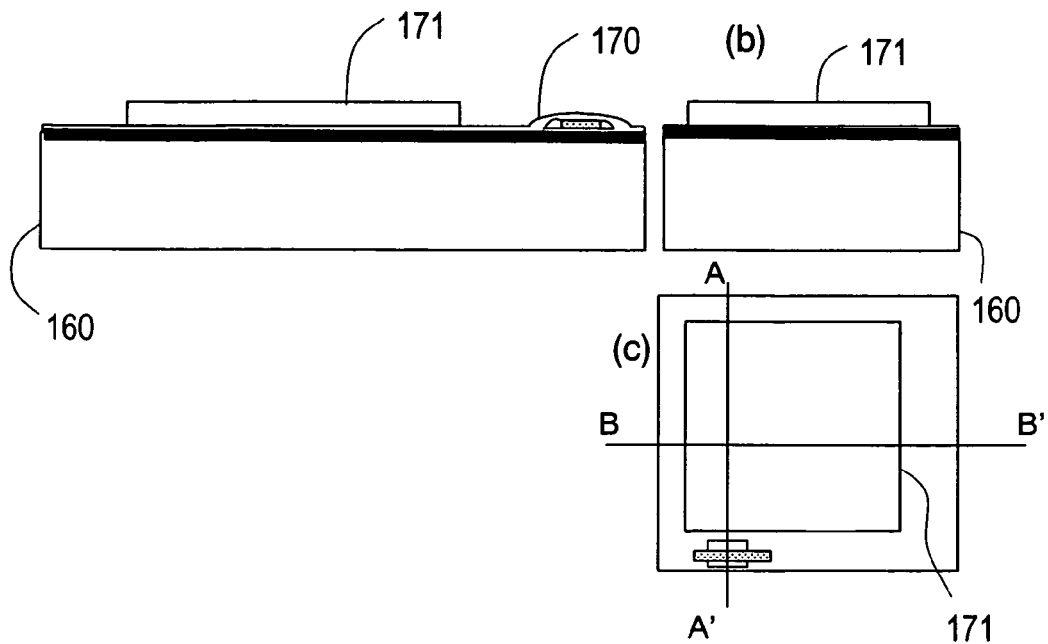
FIGS. 13(a), 13(b) and 13(c) are respectively a cross-sectional view as viewed on the A-A' plane, a cross-sectional view as viewed on the B-B' plane, and a plan view illustrating another process step for fabricating the electronic device of the first preferred embodiment of the present invention.

Thereafter, as shown in FIG. 13, a polysilicon layer 171 with a thickness of about 1 μm is provided on an area where an infrared sensing element will be formed. This polysilicon layer 171 may be obtained by depositing a polysilicon film on the silicon dioxide film 170 by a CVD process, for example, and then patterning this polysilicon film by photolithographic and etching techniques. This polysilicon layer 171 functions as a "first sacrificial layer" that will be etched away eventually. In the example illustrated in FIG. 13, the polysilicon layer 171 has a rectangular planar shape. A microheater portion will be provided on this polysilicon layer 171.

Figure 14:
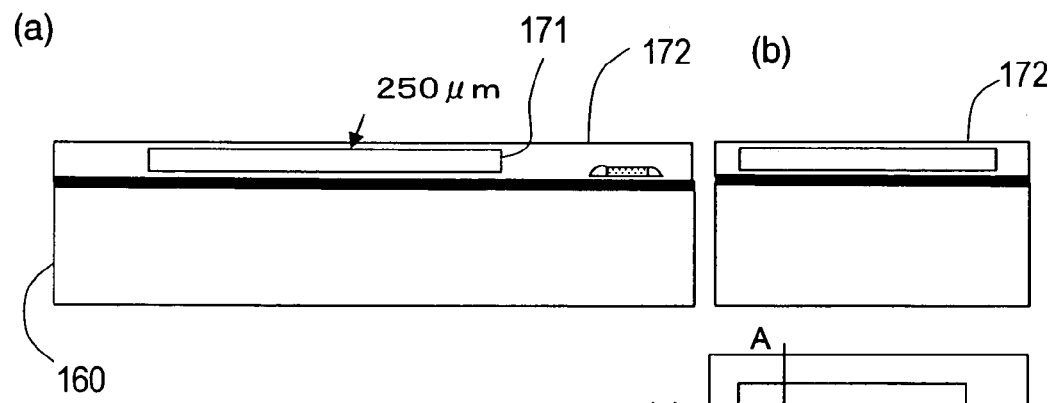
FIGS. 14(a), 14(b) and 14(c) are respectively a cross-sectional view as viewed on the A-A' plane, a cross-sectional view as viewed on the B-B' plane, and a plan view illustrating another process step for fabricating the electronic device of the first preferred embodiment of the present invention.

Subsequently, as shown in FIG. 14, a second silicon dioxide film 172 is deposited so as to cover the polysilicon layer 171 and then has its upper surface planarized. This planarization is carried out such that a portion of the silicon dioxide film 172 with a thickness of about 250 nm will be left on the polysilicon layer (i.e., first sacrificial layer) 171. That portion of the silicon dioxide film 172 remaining on the polysilicon layer (first sacrificial layer) 171 will function as an etch stop layer under the microheater in the process step of etching the polysilicon layer (first sacrificial layer) away.

Figure 15:
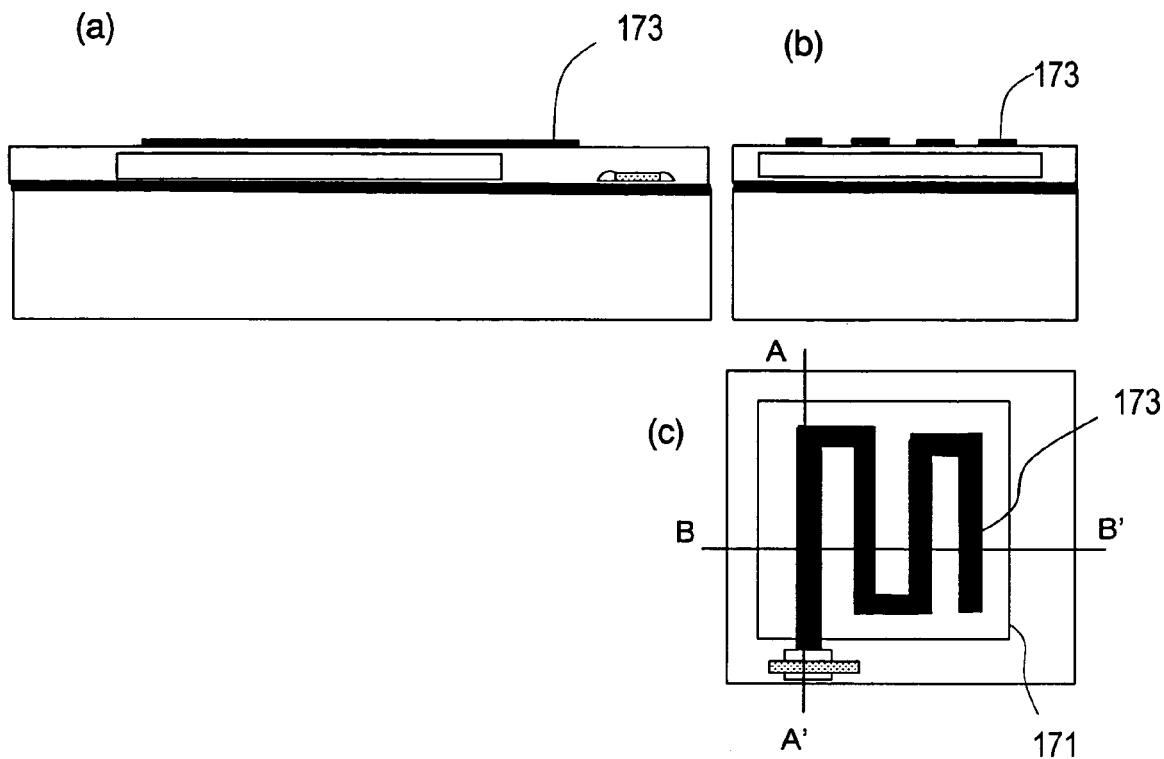
FIGS. 15(a), 15(b) and 15(c) are respectively a cross-sectional view as viewed on the A-A' plane, a cross-sectional view as viewed on the B-B' plane, and a plan view illustrating another process step for fabricating the electronic device of the first preferred embodiment of the present invention.

Next, as shown in FIG. 15, a microheater portion 173 made of B (boron) doped polysilicon is formed on the area where the infrared sensing element will be fabricated. This microheater portion 173 may be defined by depositing a second polysilicon film on the second silicon dioxide film 172, implanting B ions into this second polysilicon film and then patterning the second polysilicon film by photolithographic and etching techniques, for example. Instead of depositing the second polysilicon film and implanting B ions thereto separately, a dopant gas may be added to silane gas, which is a material of polysilicon, while the second polysilicon film is being deposited. Besides, the dopant to be introduced into the second polysilicon film is not limited to B, either.

Thereafter, $BF_2$ or any other ions are implanted into a selected area of the second polysilicon film, thereby increasing the doping level of that implanted area and decreasing the electrical resistivity (specific resistance) thereof. In this manner, a region functioning as a resistor and a region functioning as a line portion such as those shown in FIG. 9D can be defined in the polysilicon.

Figure 16:
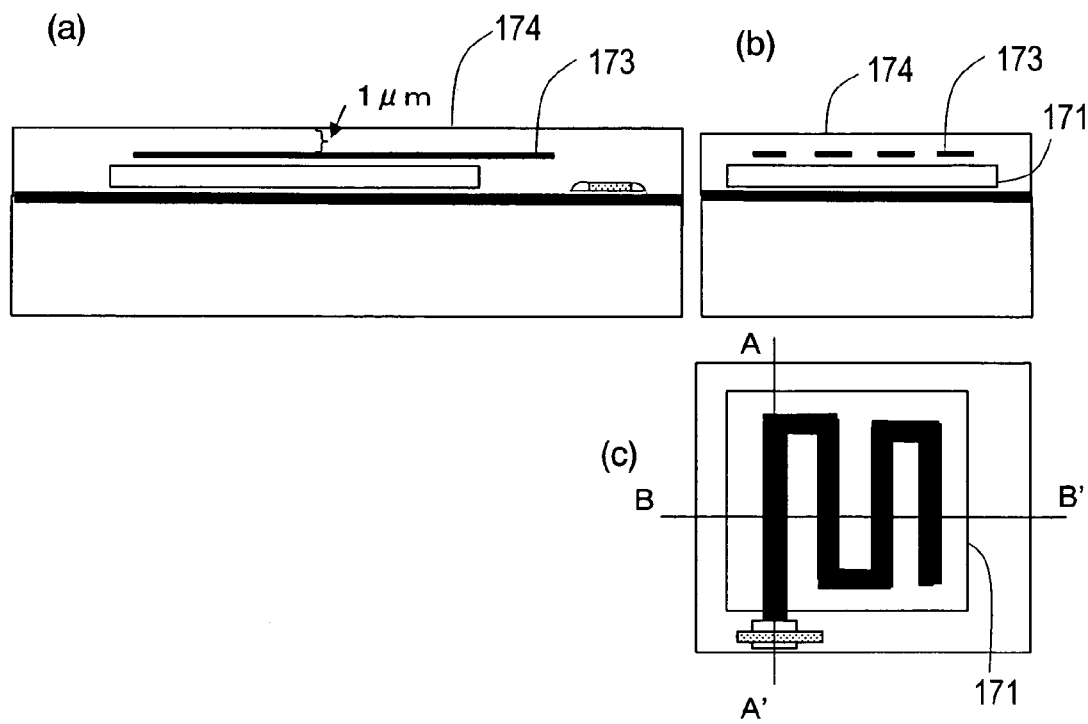
FIGS. 16(a), 16(b) and 16(c) are respectively a cross-sectional view as viewed on the A-A' plane, a cross-sectional view as viewed on the B-B' plane, and a plan view illustrating another process step for fabricating the electronic device of the first preferred embodiment of the present invention.

Subsequently, as shown in FIG. 16, a third silicon dioxide film 174 is deposited to a thickness exceeding 1 μm and then planarized. This planarization is carried out such that a portion of the third silicon dioxide film 174 that has a thickness of about 1 μm will be left on the microheater portion 173. This third silicon dioxide film 174 functions as an interlevel dielectric film between upper- and lower-level interconnects, as an etch stop layer over the microheater in the process step of etching the sacrificial layer, and as an infrared absorbing portion.

Figure 17:
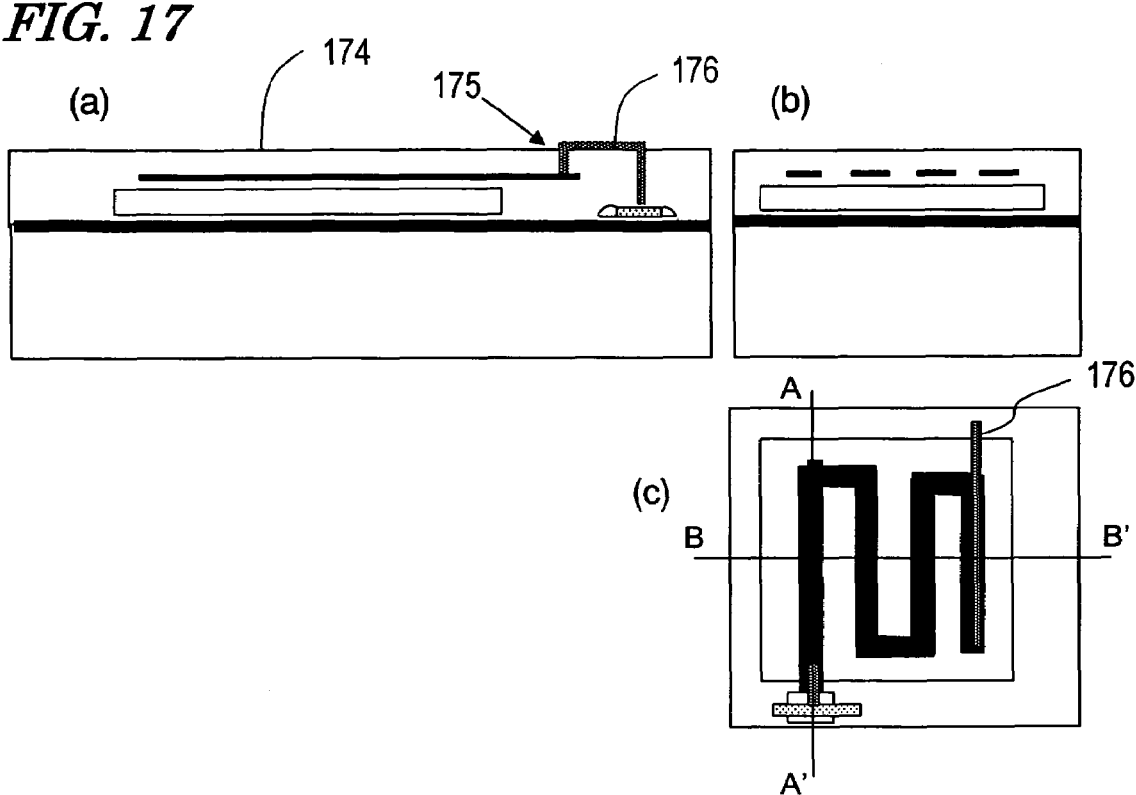
FIGS. 17(a), 17(b) and 17(c) are respectively a cross-sectional view as viewed on the A-A' plane, a cross-sectional view as viewed on the B-B' plane, and a plan view illustrating another process step for fabricating the electronic device of the first preferred embodiment of the present invention.

Next, as shown in FIG. 17, to electrically connect the microheater portion 173 to the readout circuit section, a contact hole 175 is cut through the silicon dioxide film and then an interconnect portion 176 is provided. The contact hole 175 is opened by removing a predetermined portion of the silicon dioxide film by photolithographic and etching techniques. The interconnect portion 176 is formed by depositing a film of an interconnect material such as aluminum on the third silicon dioxide film 174 and then patterning the film by photolithographic and etching techniques. The interconnect portion 176 has been patterned so as to connect the microheater portion 173 to the readout circuit section by way of the contact hole 175.

Figure 18:
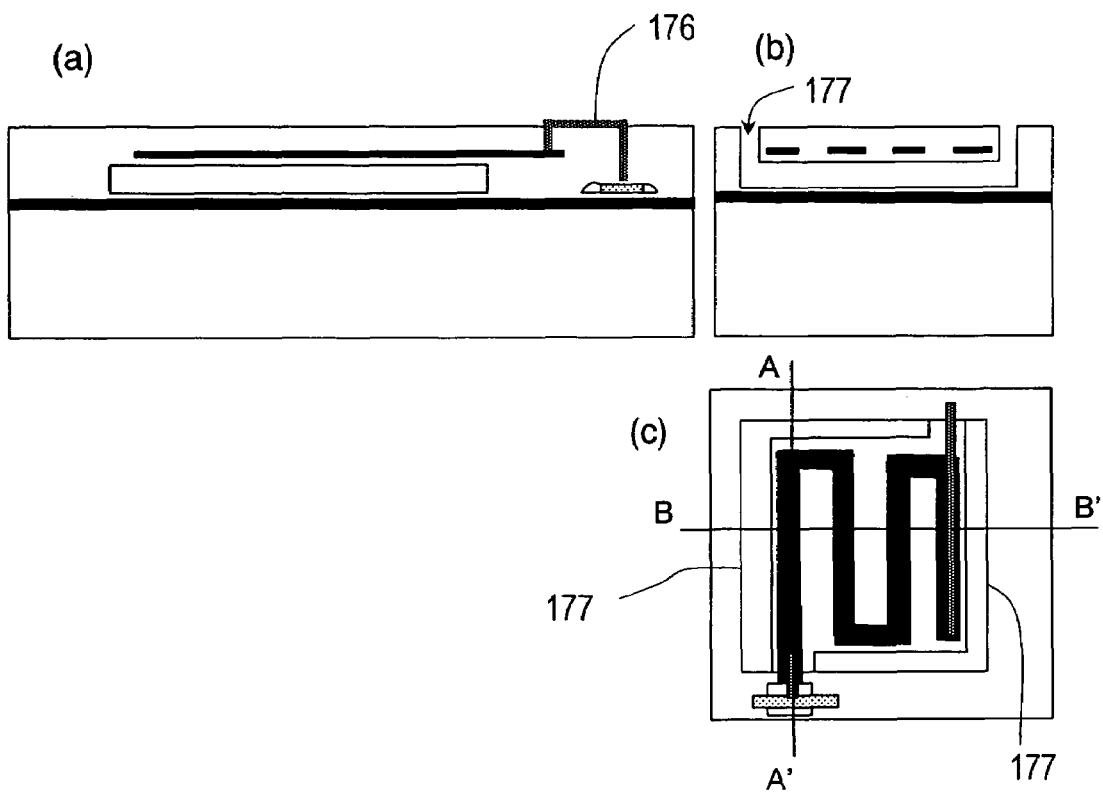
FIGS. 18(a), 18(b) and 18(c) are respectively a cross-sectional view as viewed on the A-A' plane, a cross-sectional view as viewed on the B-B' plane, and a plan view illustrating another process step for fabricating the electronic device of the first preferred embodiment of the present invention.

Then, as shown in FIG. 18, an opening (i.e., an etch hole) 177 is cut through the third silicon dioxide film (i.e., the etch stop layer over the microheater) 174 and the second silicon dioxide film (i.e., the etch stop layer under the microheater) 172, thereby exposing a portion of the polysilicon layer (i.e., the first sacrificial layer) 171. This opening functions as a space that provides heat insulation between the infrared sensing element and the side surface of the vacuum package.

Figure 19:
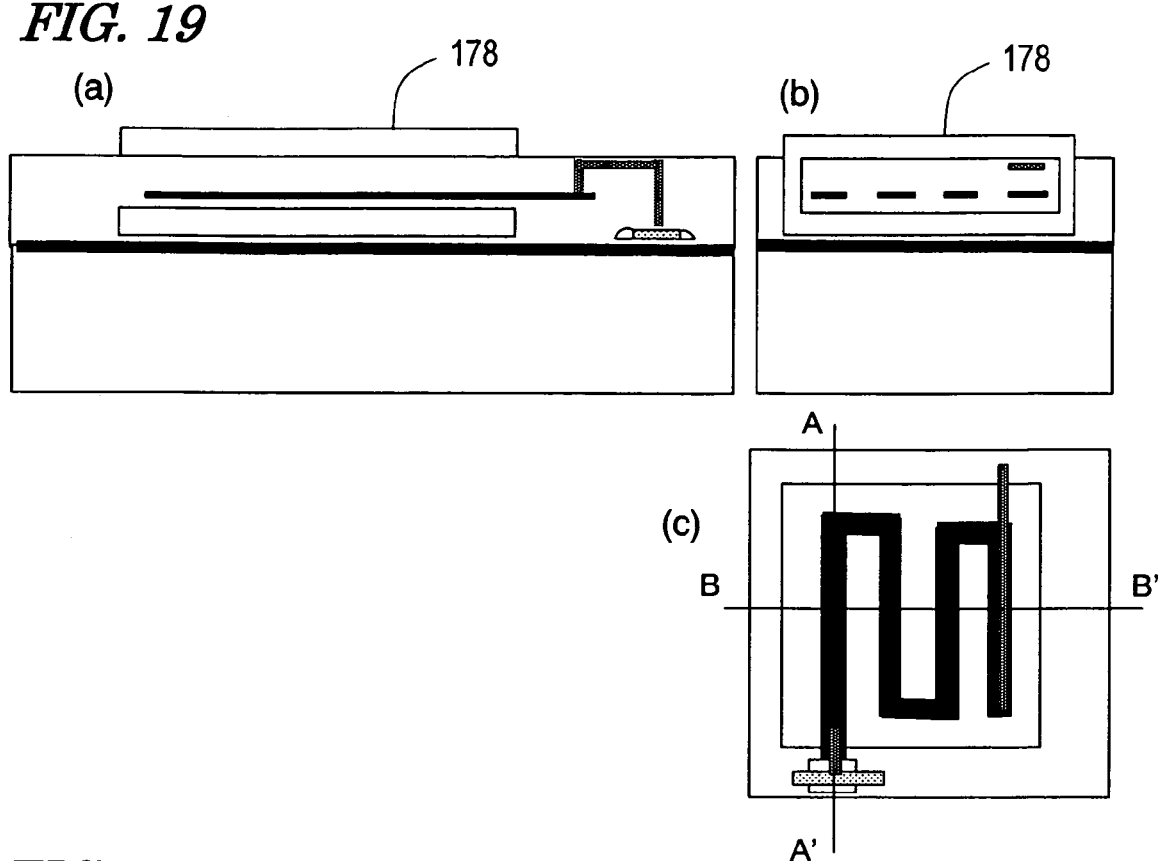
FIGS. 19(a), 19(b) and 19(c) are respectively a cross-sectional view as viewed on the A-A' plane, a cross-sectional view as viewed on the B-B' plane, and a plan view illustrating another process step for fabricating the electronic device of the first preferred embodiment of the present invention.

Subsequently, as shown in FIG. 19, a fourth silicon dioxide film is deposited to a predetermined thickness and then a polysilicon layer 178, functioning as a second sacrificial layer, is provided thereon to a thickness of about 1 μm. This polysilicon layer is also obtained by depositing a polysilicon film and then patterning it by photolithographic and etching techniques.

Figure 20:
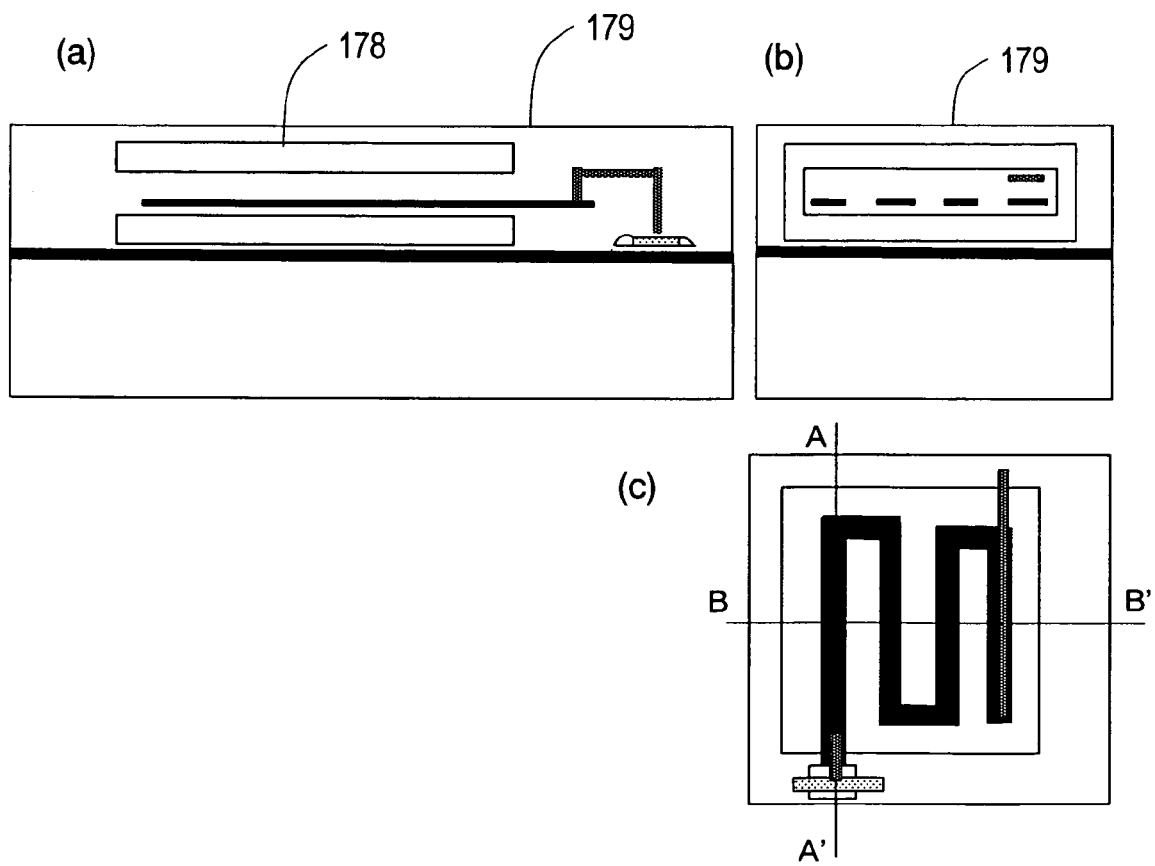
FIGS. 20(a), 20(b) and 20(c) are respectively a cross-sectional view as viewed on the A-A' plane, a cross-sectional view as viewed on the B-B' plane, and a plan view illustrating another process step for fabricating the electronic device of the first preferred embodiment of the present invention.

Thereafter, as shown in FIG. 20, a fifth silicon dioxide film 179 is deposited and then planarized. This planarization is carried out such that a portion of the fifth silicon dioxide film 179, located over the polysilicon film functioning as the second sacrificial layer, has a thickness of about 500 nm. This fifth silicon dioxide film 179 will eventually function as a wall of the vacuum package.

Figure 21:
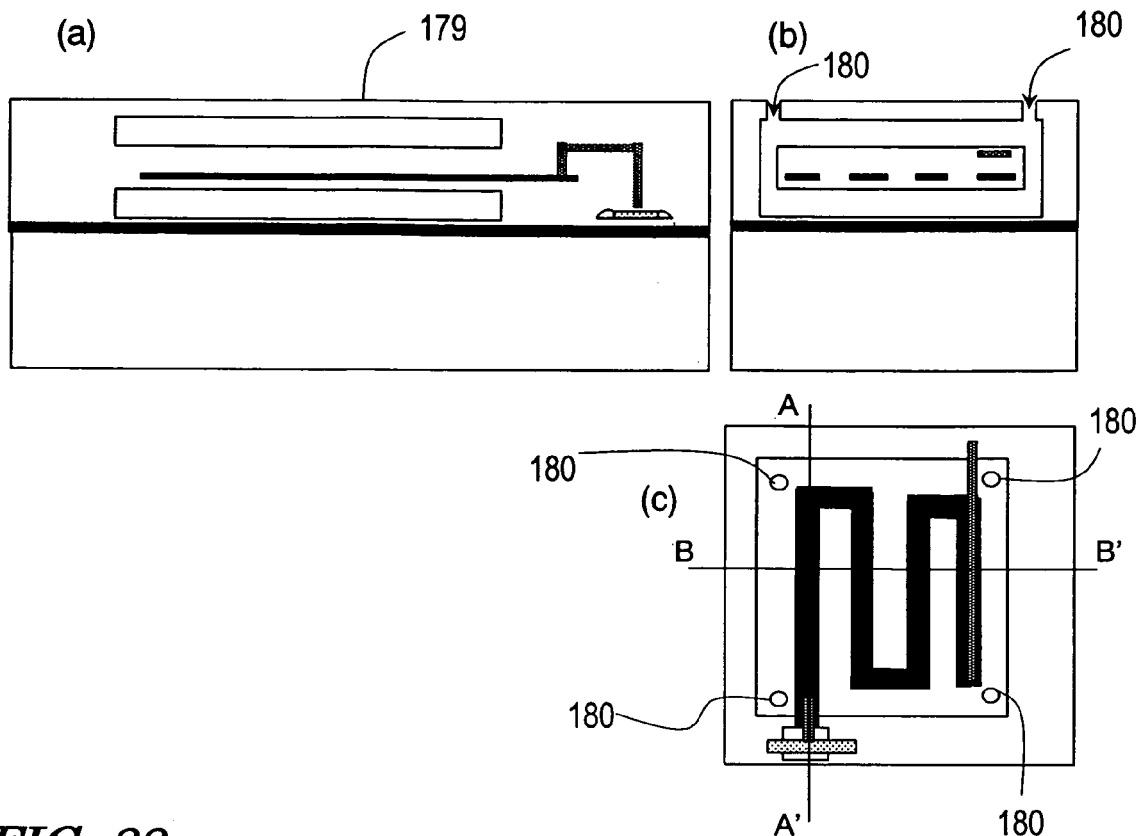
FIGS. 21(a), 21(b) and 21(c) are respectively a cross-sectional view as viewed on the A-A' plane, a cross-sectional view as viewed on the B-B' plane, and a plan view illustrating another process step for fabricating the electronic device of the first preferred embodiment of the present invention.
Figure 22:
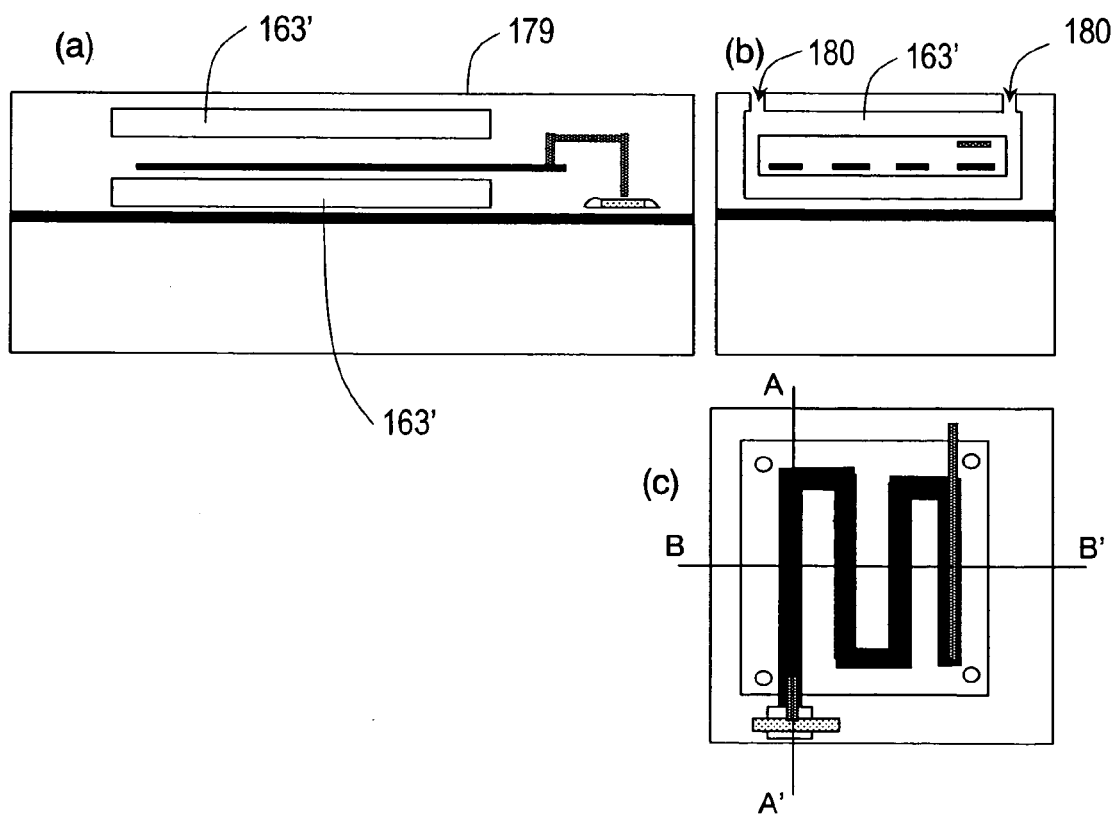
FIGS. 22(a), 22(b) and 22(c) are respectively a cross-sectional view as viewed on the A-A' plane, a cross-sectional view as viewed on the B-B' plane, and a plan view illustrating another process step for fabricating the electronic device of the first preferred embodiment of the present invention.

Next, as shown in FIG. 21, etch holes 180 with a diameter of about 0.3 μm are cut through the fifth silicon dioxide film 179. After that, as shown in FIG. 22, $XeF_2$ gas is introduced through the etch holes 180, thereby etching away the polysilicon layers functioning as the sacrificial layers. As a result of this etching process, a cavity 163' is defined so as to surround the microheater portion.

Figure 23:
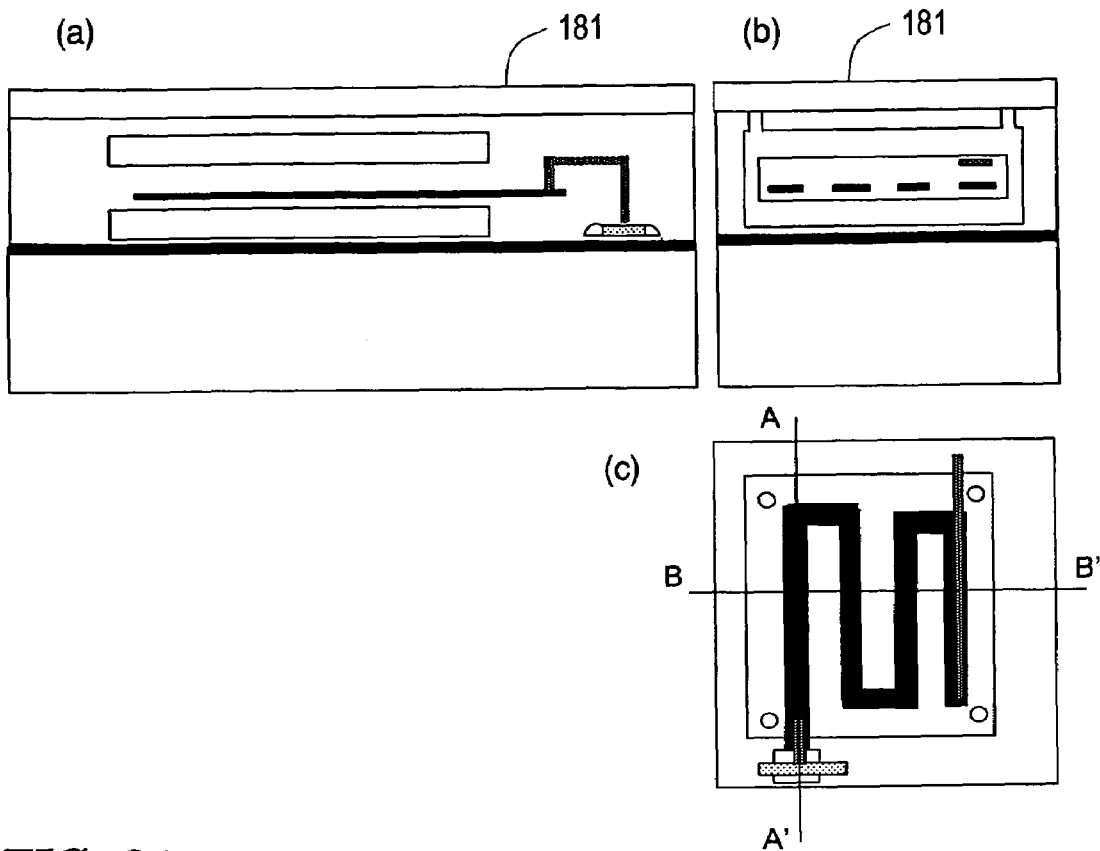
FIGS. 23(a), 23(b) and 23(c) are respectively a cross-sectional view as viewed on the A-A' plane, a cross-sectional view as viewed on the B-B' plane, and a plan view illustrating another process step for fabricating the electronic device of the first preferred embodiment of the present invention.

Subsequently, as shown in FIG. 23, a silicon film 181 is deposited to a thickness of about 2 μm on the fifth silicon dioxide film by a sputtering process. By depositing this silicon film 181, the etch holes 180 are closed and the cavity 163' is sealed up. As a result of this sealing, the internal pressure of the cavity 163' is kept equal to the pressure of the atmospheric gas during the sputtering process (i.e., the internal pressure of a sputtering chamber). Finally, the silicon film (i.e., sputter sealing film) 181 is partially removed and then electrode pad portions (not shown) are formed.

By performing this series of process steps, the microheater portion can be arranged inside a small vacuum package (i.e., within a cavity with a reduced pressure). In the drawings that have been referred to in the foregoing description, just a single microheater is illustrated for the sake of simplicity. In a preferred embodiment, however, a great many microheater portions are formed simultaneously on the same substrate by adopting the MEMS technologies mentioned above. The respective microheater portions are made of a patterned thin film and can be obtained at a low cost by the MEMS technologies.

According to this preferred embodiment, not only the intensity of the infrared radiation but also the internal pressure of the cavity 163' can be measured by using the microheater portion 173. That is why even if any abnormality occurred in the internal pressure of the cavity 163' due to some problem of the manufacturing process, the abnormal pressure could be sensed before the product is shipped. Also, the sensor just produced may have an appropriate internal pressure in the cavity 163' but the pressure may increase with time while the sensor is being operated. However, according to this preferred embodiment, the internal pressure of the cavity 163' can be measured at arbitrary or regular intervals and the abnormal pressure can be sensed.

In this preferred embodiment, the microheater portion 173 is preferably designed so as to have a specific resistance of $1\times10^{-1}$ Ωcm to $1\times10^5$ Ωcm. If the specific resistance of the microheater portion 173 exceeded the upper limit of this range, then the electrical resistance of the microheater portion 173 would be as high as 100 kΩ or more and it would be hard to sense the temperature. Meanwhile, if the specific resistance were less than the lower limit of this range, then the variation in the resistance of the microheater portion 173 would be as small as $1\times10^{-3}$ or less, thus making it hard to sense the temperature, too.

If the microheater portion 173 is made of a thin film of a material that has a specific resistance of $5\times10^2$ Ωcm to 5 Ωcm, then the thin film preferably has a thickness of 500 nm or less and the resistor of the microheater portion 173 is preferably designed so as to have a resistance of 100 kΩ or less and a resistance variation rate of 0.01 or more.

To prevent the microheater portion 173 from warping upward or downward while the first sacrificial layer, located under the microheater portion 173, is being etched, a film of a material with high tensile stress is preferably arranged over and/or under the microheater portion 173. Such a film of a high tensile stress material may be made of SiN, for example.

In etching the sacrificial layer, $XeF_2$ may be replaced with an etching gas such as $SF_6$ or $CF_4$ or with a chemical such as TMAH or hydrazine. Furthermore, the material of the film that is deposited to close the etch holes is not limited to silicon but may be any other material (e.g., a metal such as Al). Also, such a film does not have to be deposited by a sputtering process but may also be deposited by a PVD process such as a vacuum evaporation process. If the etch holes are closed and the cavity is sealed by a PVD process, the film is preferably deposited at a pressure of 10 Pa or less to increase the degree of vacuum in the cavity. Particularly when the microheater portion 173 also functions as an infrared sensing element as in this preferred embodiment, the member that serves as the ceiling of the cavity (i.e., cavity wall portion) is preferably made of a material that hardly absorbs infrared radiation to increase the intensity of the incident infrared ray. For example, the cavity wall portion is preferably made of silicon, of which the surface is coated with a thin silicon dioxide film, because the infrared ray will be absorbed a little and the silicon dioxide film will function as an etch stopper.

Embodiment 2

Hereinafter, a second preferred embodiment of the present invention will be described.

Figure 24:
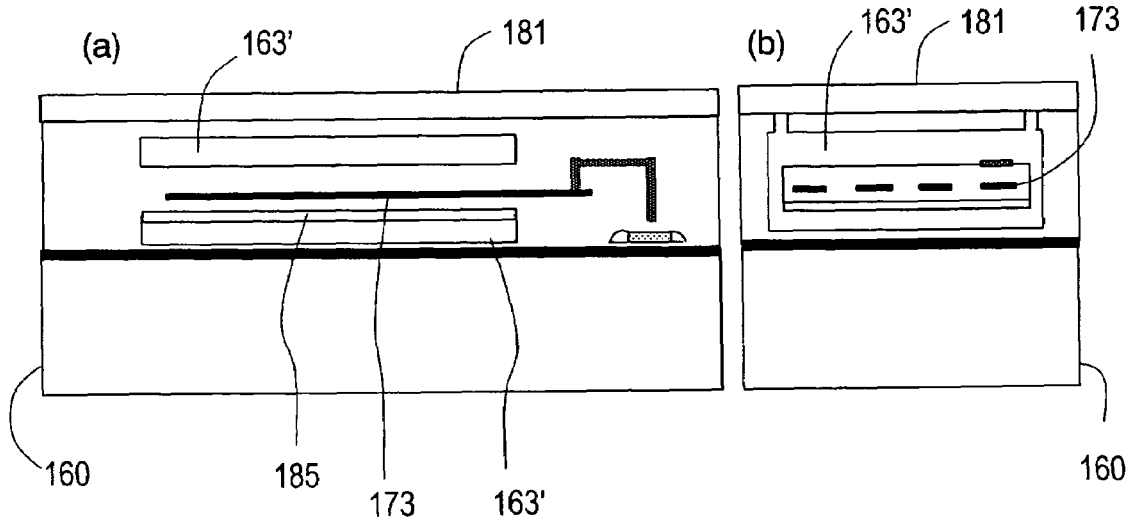
FIGS. 24(a) and 24(b) are cross-sectional views illustrating an electronic device according to a second preferred embodiment of the present invention.

FIG. 24 illustrates a preferred embodiment in which a gettering thin film is provided inside the micro vacuum package (i.e., within the cavity 163'). The gettering thin film is activated under the heat generated by the microheater portion 173 and can adsorb the gas that is present inside the micro vacuum package (i.e., within the cavity 163') and decrease its pressure.

In this preferred embodiment, a gettering thin film 185 is provided under the microheater portion 173 and under the silicon dioxide film that functions as an etch stop layer. This gettering thin film 185 may have a thickness of 500 nm, for example. To keep the degree of vacuum inside the micro vacuum package high by utilizing the gettering thin film 185, the gettering thin film 185 needs to have a sufficient thickness. And its preferred thickness depends on the internal volume of the micro vacuum package.

The microheater portion 173 may have an electrical resistance of 1 MΩ or less, for example. In a preferred example, when a voltage of 10 V is applied to the microheater portion, a heat of $10^{-4}$ W or more is generated. If the thermal conductance between the microheater portion 173 and the external environment is set equal to $1 \times 10^{-7}$ W/K, then the microheater portion 173 will have a temperature of 1,000 K or more. In that case, the gettering thin film can be activated sufficiently.

The material of the gettering thin film 185 is preferably selected from the group consisting of Zr, Ti, Zr—Al alloys and non-vaporizing gettering materials such as V (vanadium). As the gettering thin film absorbs the gases in the micro vacuum package, its gettering ability will soon deteriorate. Then, the microheater portion 173 is preferably heated to a temperature (e.g., 900° C.) at which the gettering thin film 185 can be reactivated. By conducting such heating, the gas molecules that have been deposited on the surface can be diffused into the gettering thin film 185 and the gettering material can be exposed on the surface of the gettering thin film 185 again (i.e., can be activated).

To activate the gettering thin film 185 in this manner, the temperature of the microheater portion 173 needs to be raised to a much higher level than that during the operation of the electronic device. To prevent such heating from affecting the electronic circuit components that have been integrated on the same substrate 160, heat insulation is preferably established between the microheater portion 173 and the substrate 160. In this preferred embodiment, the thermal conductance between the substrate and the microheater portion is set to be as small as about $10^{-7}$ W/K, and therefore, hardly affects the electronic circuit. If this thermal conductance had a large value (i.e., if the heat insulation were insufficient), then the electronic circuit should be arranged far away from the area where the microheater portion 173 is located and it might be troublesome to reduce the size of the electronic device as intended.

The electronic device of this preferred embodiment can be fabricated by performing the additional process step shown in FIG. 25, not just all the process steps of the manufacturing process of the first preferred embodiment that has already been described with reference to FIGS. 11 through 23. Specifically, after the polysilicon layer (i.e., first sacrificial layer) 171 has been formed, a thin film of a gettering material is deposited by a sputtering process or any other thin film deposition technique and then patterned into a desired shape by photolithographic and etching techniques. As a result, the gettering thin film 185 is formed on the polysilicon layer 171 as shown in FIG. 25.

Figure 25:
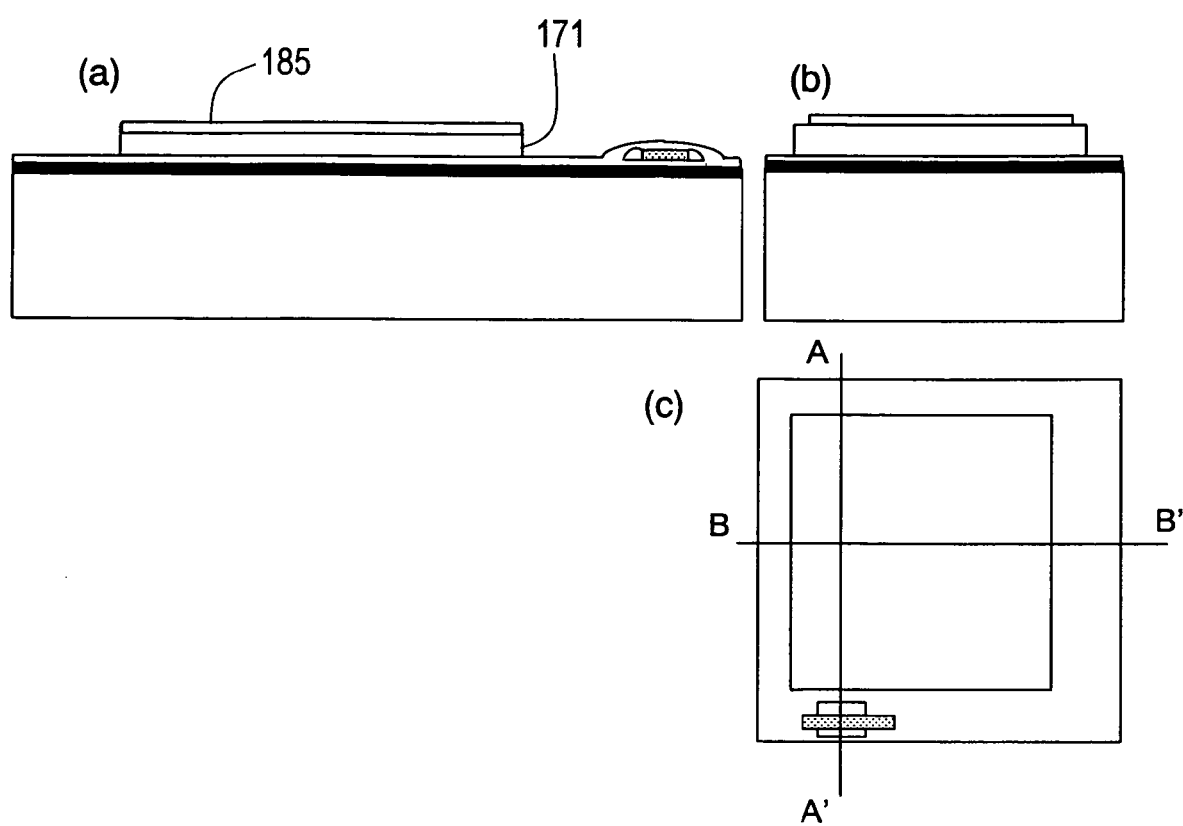
FIGS. 25(a), 25(b) and 25(c) are respectively a cross-sectional view as viewed on the A-A' plane, a cross-sectional view as viewed on the B-B' plane, and a plan view illustrating a process step for fabricating the electronic device of the second preferred embodiment of the present invention.

The process step shown in FIG. 25 should be performed between the process steps shown in FIGS. 13 and 14, respectively. After this process step is finished, the same process steps as those shown in FIGS. 14 through 23 will be carried out.

In the electronic device of this preferred embodiment, the gettering thin film 185 is provided under the microheater portion 173, and therefore, never interferes with the incidence of an infrared ray onto the microheater portion 173.

As described above, according to this preferred embodiment, a heat generating portion for heating the inside of a micro vacuum package to detect the degree of vacuum in the cavity 163', a temperature sensing portion for sensing the temperature, and an activating portion for heating a gettering thin film to increase the degree of vacuum are all realized by a single microheater. As a result, the manufacturing cost can be reduced and elements can be integrated together much more densely.

Alternatively, the heat generating portion, temperature sensing portion and activating portion may be implemented as mutually different elements. In particular, since the pressure can be measured even by using a heat absorbing element, the heat generating portion may be replaced with a heat absorbing/generating portion, which may be a Peltier element, for example. By sensing the temperature inside the micro vacuum package that changes with the heat generation or absorption of the Peltier element, the thermal conductance $g_4$ can be obtained, from which the degree of vacuum can be figured out.

In the preferred embodiment described above, one heat absorbing/generating portion, one temperature sensing portion and/or one activating portion are provided per vacuum package. Optionally, a single vacuum package may include a plurality of heat absorbing/generating portions, a plurality of temperature sensing portions and/or a plurality of activating portions.

Also, the cavity may be made in the substrate. In that case, the cavity may be created by etching away a portion of the substrate to establish heat insulation between the heat absorbing/generating portion, temperature sensing portion and/or activating portion and the substrate. Such a structure may be obtained as follows. Specifically, first, an etch stop layer may be formed on the surface of the substrate, and then an etch hole is cut through the etch stop layer. Next, a portion of the substrate is etched away through this etch hole, thereby making a cavity in the substrate.

The substrate does not have to be a silicon substrate but may also be an SOI substrate. If an SOI substrate is used, a cavity may be defined by cutting an etch hole through an oxide layer in the substrate and then removing a portion of the substrate, which is located under the oxide layer, through that etch hole.

Optionally, heat insulation may also be established by arranging a porous material such as porous silicon instead of making the cavity.

The heat absorbing/generating portion, temperature sensing portion and/or activating portion may be provided on the substrate. In that case, the temperature range and layout need to be set so as not to affect the electronic circuit on the substrate as described above. Alternatively, the heat absorbing/generating portion, temperature sensing portion and/or activating portion may be arranged on an arbitrary plane as long as the plane is located inside the micro vacuum package.

Also, the heat absorbing/generating portion, temperature sensing portion and/or activating portion may be made of a material other than silicon (e.g., a metal such as Ti or Pt, a metal oxide such as TiO or $VO_x$ or a semiconductor such as SiGe). When a semiconductor is used, a pn junction may be formed in the semiconductor and the temperature may be sensed by detecting a variation in forward current or voltage.

Instead of sensing the temperature based on a variation in resistance, the temperature sensing portion may sense the temperature by utilizing a pyroelectric effect, by detecting a variation in dielectric constant due to a change in temperature (i.e., using a dielectric bolometer), or by utilizing a phenomenon that a thermal electromotive force (or the Seebeck effect) is produced due to a difference in temperature between a hot junction and a cold junction in a thermocouple or in a thermopile in which a plurality of thermocouples are connected in series together.

In the preferred embodiments described above, the degree of vacuum is detected based on the steady state temperature of the microheater portion. However, if the thermal conductance of the microheater portion is so big that it takes too long a time for the microheater portion to change into the steady state, then the degree of vacuum may be detected based on a transition state temperature thereof.

As described above, according to this preferred embodiment, a thin film of a gettering material is deposited by a thin film deposition technique and then patterned into a desired shape with dimensions of 1 mm square or less by photolithographic and etching techniques. If a gettering thin film is formed in this manner, the gettering material may be arranged in an ultra small vacuum package. In addition, since a plurality of gettering thin films can be deposited simultaneously on the same substrate, the productivity is also high.

Besides, according to this preferred embodiment, an ultra small vacuum package can be arranged on the substrate and the degree of vacuum inside the package can be maintained or even increased. Thus, the size of an electronic device including such a vacuum package can be reduced.

What is more, according to this preferred embodiment, a heat insulating structure is provided between the gettering thin film and the substrate. Accordingly, even if the electronic circuit on the substrate is closely located to the gettering thin film, the heat generated by activating the gettering thin film does not affect the electronic circuit on the substrate. That is why the gettering thin film and the electronic circuit can be arranged close to each other and the size of an electronic device, including the vacuum package and the electronic circuit, can be reduced.

Embodiment 3

Hereinafter, a third preferred embodiment of the present invention will be described with reference to FIG. 26, which illustrates the cross-sectional structure of a micro vacuum package in an electronic device according to this preferred embodiment. A great number of cavities are actually made on a single substrate but just one of them is illustrated as a typical one in FIG. 26 for the sake of simplicity.

The micro vacuum package illustrated includes a cap member 20 to close a recess on a silicon substrate 160. In this preferred embodiment, the cap member 20 is made of silicon (with a thickness of 1 µm to 1,000 µm).

If the thickness of a gettering thin film 185 exceeded 100 µm, then it would take more than 10 hours to form the thin film, which would cause a significant decline in productivity. In addition, the film would have increased stress and the chances of film peeling would be stronger. If the thickness of the gettering thin film 185 is limited to 10 µm or less, its thermal conductance can be reduced so much that the activating temperature can be reached more easily. Meanwhile, if the thickness of the gettering thin film 185 were less than 1 nm, then the required gettering property would not be exhibited sufficiently.

In view of these considerations, the gettering thin film 185 preferably has a thickness of 1 nm to 100 µm and more preferably has a thickness of 1 nm to 10 µm.

In the cavity of the micro vacuum package illustrated, the gettering thin film 185 is provided with its both ends supported. However, the surface of the gettering thin film 185 is exposed to a reduced-pressure atmosphere as in the microheater portion 167 shown in FIGS. 9A through 9C. Thus the gettering thin film 185 is substantially thermally insulated from the silicon substrate 160 and the cap member 20.

Both ends of the gettering thin film 185 are supported by a cavity wall portion 26 made of $SiO_2$ or any other suitable insulating material. A conductive line 22 for supplying current to the gettering thin film 185 is provided in the cavity wall portion 26. This conductive line 22 is electrically in contact with a pair of electrodes 24 to connect this electronic device to another circuit. When a potential difference is created between the pair of electrodes 24, current will flow inside the gettering thin film 185 through the conductive line 22 in the cavity wall portion 26. Due to this current, the gettering thin film 185 generates heat by itself in this preferred embodiment and its temperature rises to the activating temperature or more.

Figure 26:
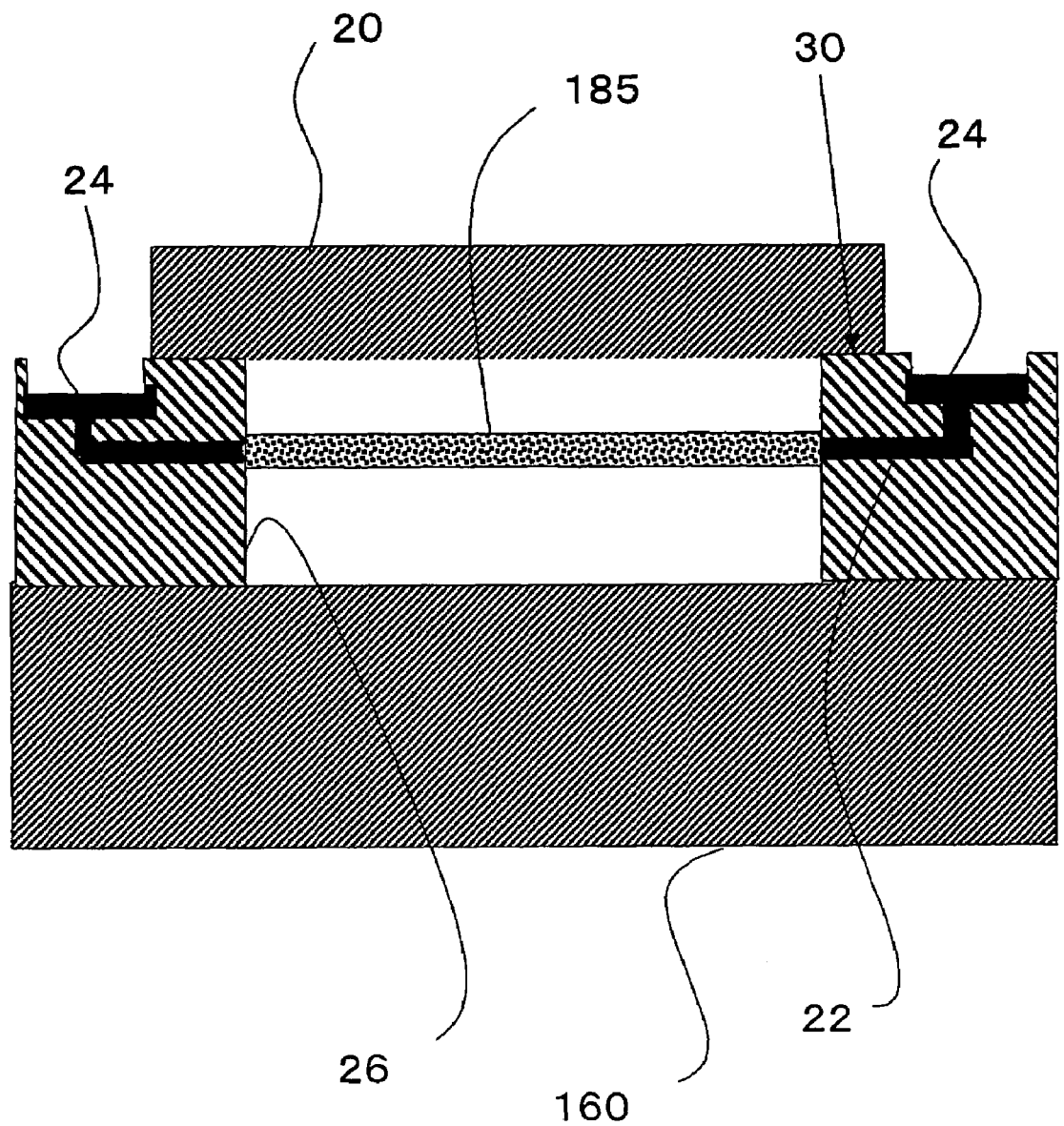
FIG. 26 is a cross-sectional view illustrating a third preferred embodiment of the present invention.

In the example illustrated in FIG. 26, the gettering thin film 185 and conductive line 22 are separate members. However, if the gettering thin film 185 has conductivity, a portion of the patterned gettering thin film 185 may form a part or all of the conductive line 22.

In the cavity, not only the gettering thin film 185 but also an infrared sensor and other functional elements are provided.

Hereinafter, an exemplary method for fabricating an electronic device according to this preferred embodiment will be described with reference to FIGS. 27A through 27D.

Figure 27A:
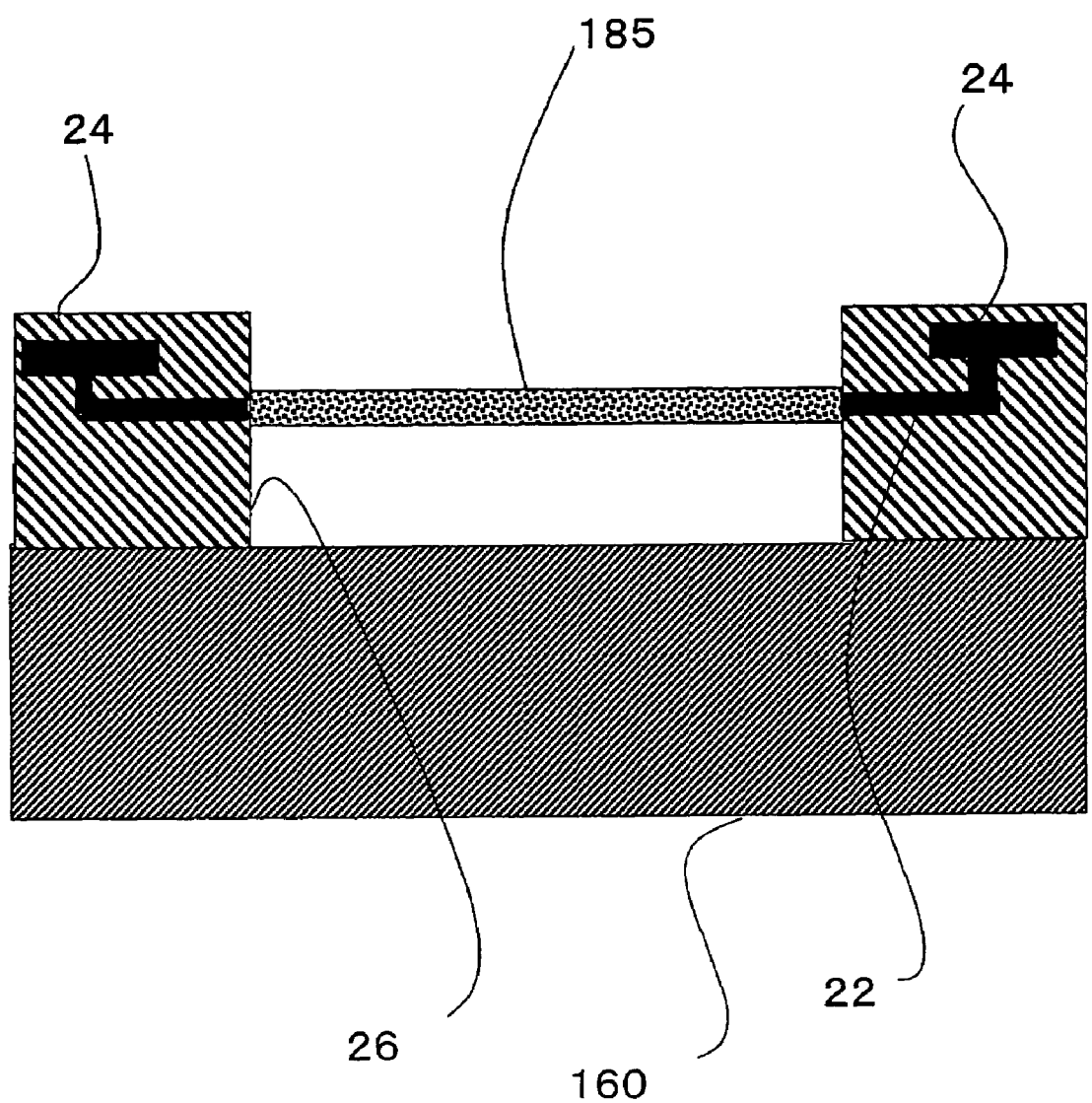
FIGS. 27A through 27D are cross-sectional views illustrating respective process steps for fabricating an electronic device according to the third preferred embodiment of the present invention.

First, the structure shown in FIG. 27A is fabricated by known MEMS technologies. Specifically, a structure in which a patterned gettering thin film 185 is sandwiched between two sacrificial layers (not shown) is formed and then the sacrificial layers are etched away, thereby obtaining the structure shown in FIG. 27A.

If the cavity wall portion 26 is made of $SiO_2$, then the sacrificial layers may be made of polysilicon, for example. In that case, the sacrificial layers are preferably etched using an etchant that etches polysilicon preferentially.

Figure 27B:
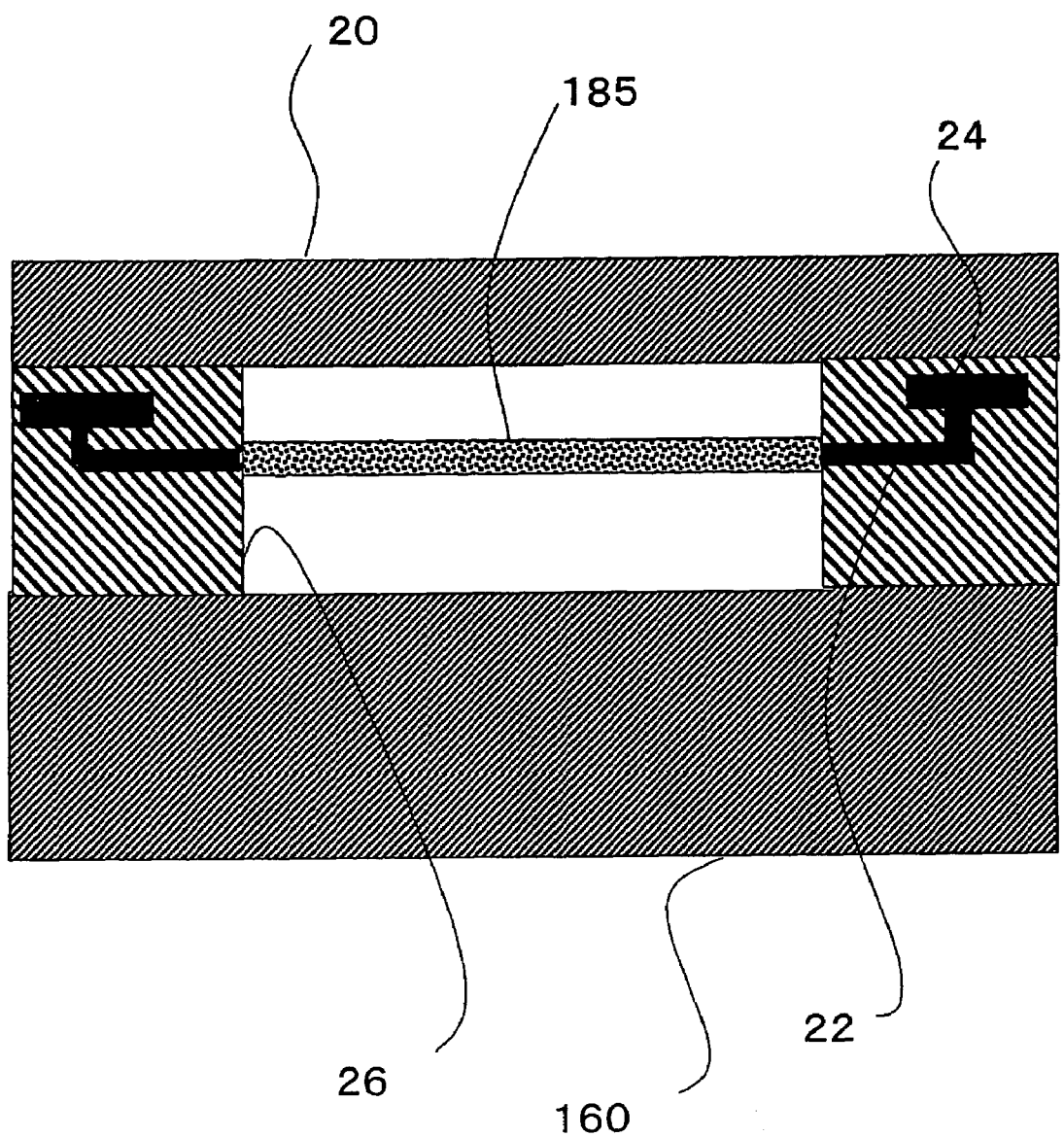

Next, as shown in FIG. 27B, a plate cap member 20 is bonded onto the upper surface of the cavity wall portion 26, thereby sealing the cavity up. This bonding process step for the purpose of sealing is preferably carried out within a reduced pressure atmosphere. Alternatively, after the cap member 20 has been bonded and sealed in the air, the gettering thin film 185 may be activated as will be described later to reduce the pressure in the cavity.

The cap member 20 and cavity wall portion 26 are preferably bonded together by an anode bonding process, a room temperature bonding process or any other suitable method. The room temperature bonding process is carried out by bombarding and activating the surfaces of the members to be bonded together with argon ions, for example, and then bringing the activated surfaces into contact with each other. The room temperature bonding is disclosed by Suga and K. Otsuka of Tokyo University in "Bumpless Interconnect for Next Generation System Packaging", IEEE 51$^{st}$ ECTC, Orland, June 2001, pp. 1003-1008, for example. Optionally, the bonding process may be carried out with solder or frit glass, for example. If the bonding process is carried out using a material that melts at a relatively low temperature, then the conductive line is preferably designed so as not to contact with, or be located close to, the bonding portions. The conductive line is preferably made of a metallic material with low electrical resistance, which generally has high thermal conductivity. That is why the heat generated by the gettering thin film easily flows through the conductive line toward the cavity wall portion. In this preferred embodiment, the cavity wall portion is made of a material with excellent heat resistance. Thus, the cavity wall portion neither gets damaged by the heat that has been generated for the purpose of activating the gettering thin film nor raises the pressure in the cavity to the contrary.

Figure 27C:
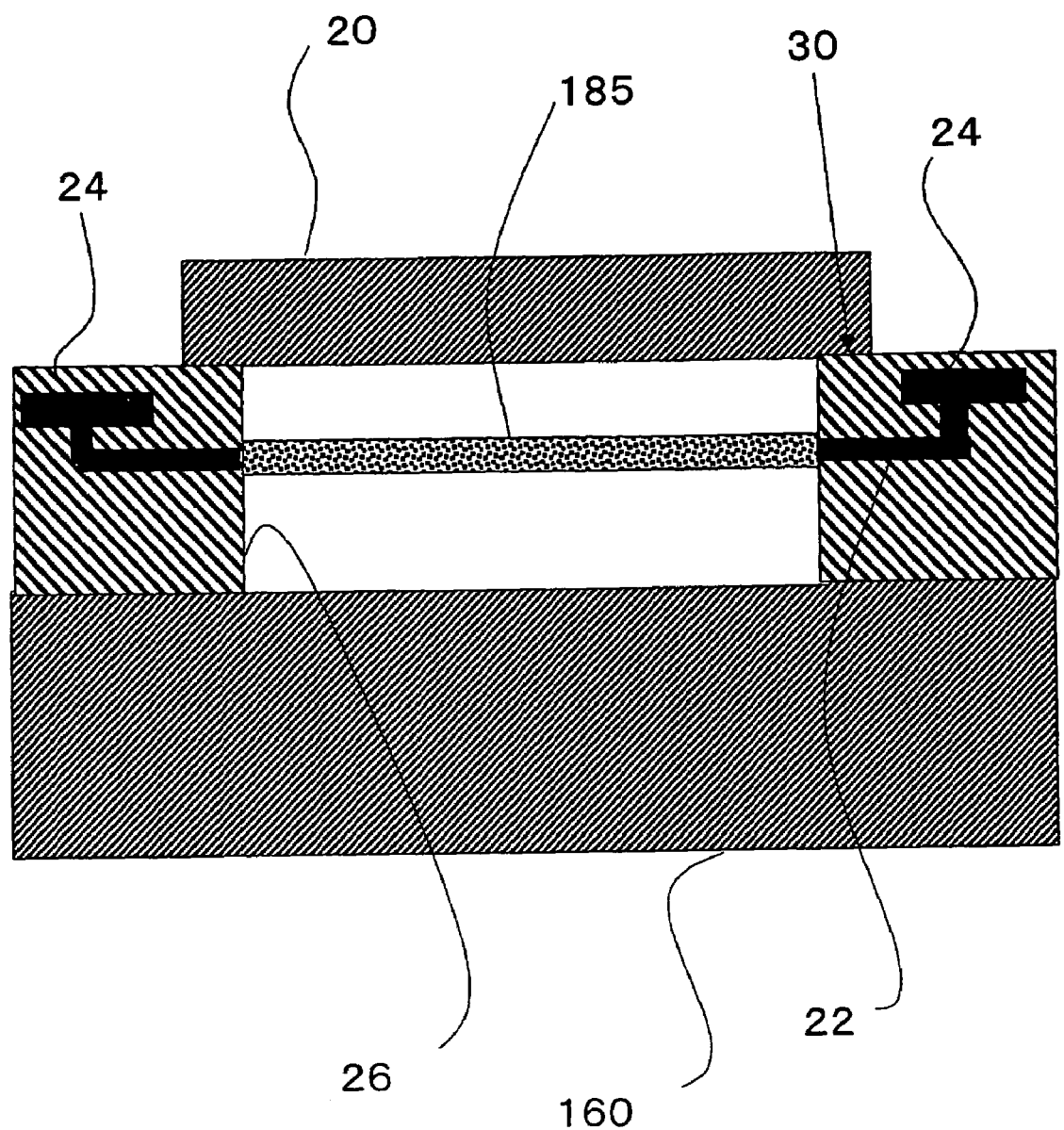
Figure 27D:
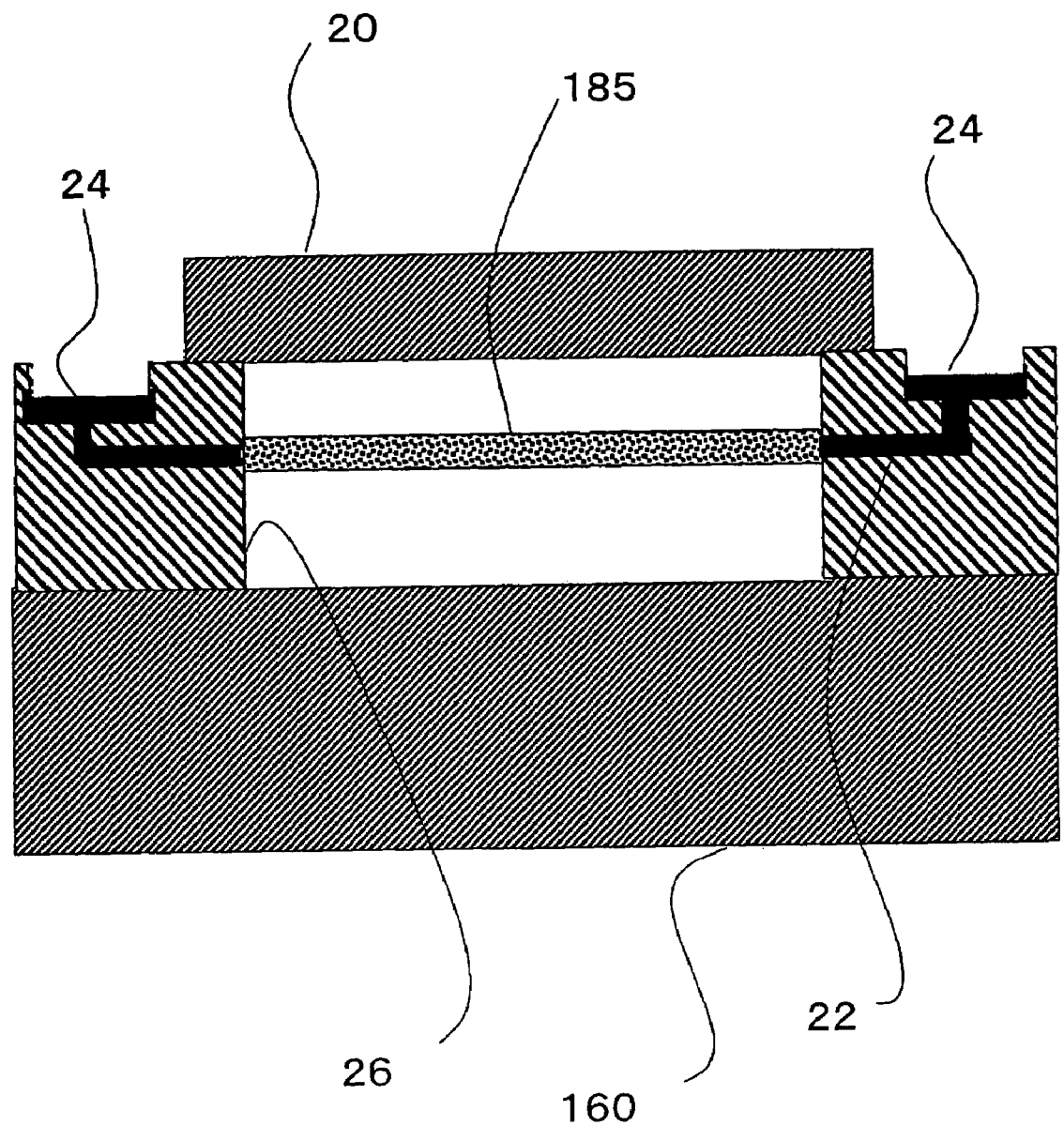

Subsequently, a portion of the cap member 20, located over the electrodes 24, is removed as shown in FIG. 27C and then the electrodes 24 are exposed as shown in FIG. 27D. In this manner, the structure shown in FIG. 26 can be obtained. The electrodes 24 are exposed to be connected to other lines (not shown).

In this preferred embodiment, a pressure measuring element (not shown) is formed by the MEMS technologies on the silicon substrate 160. This pressure measuring element has the same configuration as that already described for the first preferred embodiment and the description thereof will be omitted herein.

In this preferred embodiment, the contact portions between the gettering thin film 185 and the conductive line 22 (i.e., the cavity wall portion 26 in this preferred embodiment) are made of a material, of which the melting point is higher than the activating temperature of the gettering thin film 185 (such as $SiO_2$). For that reason, even when the temperature of the gettering thin film 185 reaches its activating temperature due to the supply of current, the cavity wall portion 26 is stabilized both physically and chemically.

In a conventional infrared sensing vacuum package as disclosed in Japanese Patent Application Laid-Open Publication No. 11-326037, a line for supplying current to a gettering member is in contact with vacuum creating solder. In this infrared sensing vacuum package, the respective members thereof have relatively big sizes. Therefore, even if the gettering member generates heat, the heat is dissipated before reaching the vacuum creating solder through the line. Thus, it seems that the temperature of the vacuum creating solder rises very little.

However, if the dimensions of the gettering thin film 185 are less than 1 mm square and if the gettering thin film 185 is located close to the cavity wall portion 26 as in this preferred embodiment, the heat generated by the gettering thin film 185 may raise the temperatures of the cavity wall portion 26 and other members to rather high temperatures. That is why in this preferred embodiment, the members that contact with either the gettering thin film 185 or the conductive line 22 are made of a thermally stabilized material (preferably a material with a high melting point), thereby preventing the cavity wall portion from getting damaged when the gettering thin film is heated and activated. Consequently, according to a preferred embodiment of the present invention, the degree of vacuum can be increased or maintained by using a gettering thin film in a very small vacuum package structure unlike the prior art.

In this preferred embodiment, 100 to 10,000 cavities may be made on the single silicon substrate 160 and a very small gettering thin film 185 with dimensions of 1 mm square or less is typically arranged in each of those cavities.

The activating temperature of the gettering thin film 185 changes with the material of the gettering thin film 185. Specifically, if the gettering thin film 185 is made of a zirconium alloy, the activating temperature will be about 300° C. to about 1,000° C. On the other hand, if the gettering thin film 185 is made of element Zr or element Ti, its activating temperature will be about 600° C. to about 700° C.

Among the materials, of which the melting points are higher than theses activating temperatures, the member that contacts with either the gettering thin film 185 or the conductive line 22 preferably has a melting point of at least 1,000° C., for example. Si has a melting point of about 1,400° C. and $SiO_2$ has a melting point of 1,000° C. or more. Accordingly, these materials can be used effectively to make the member that contacts with either the gettering thin film 185 or the conductive line 22.

As used herein, "to activate" the gettering thin film 185 means to heat the gettering thin film 185, diffuse the surface dopant inward and expose a newly activated surface, and the "activating temperature" refers to a temperature at which the activation is produced effectively in practice.

Figure 28:
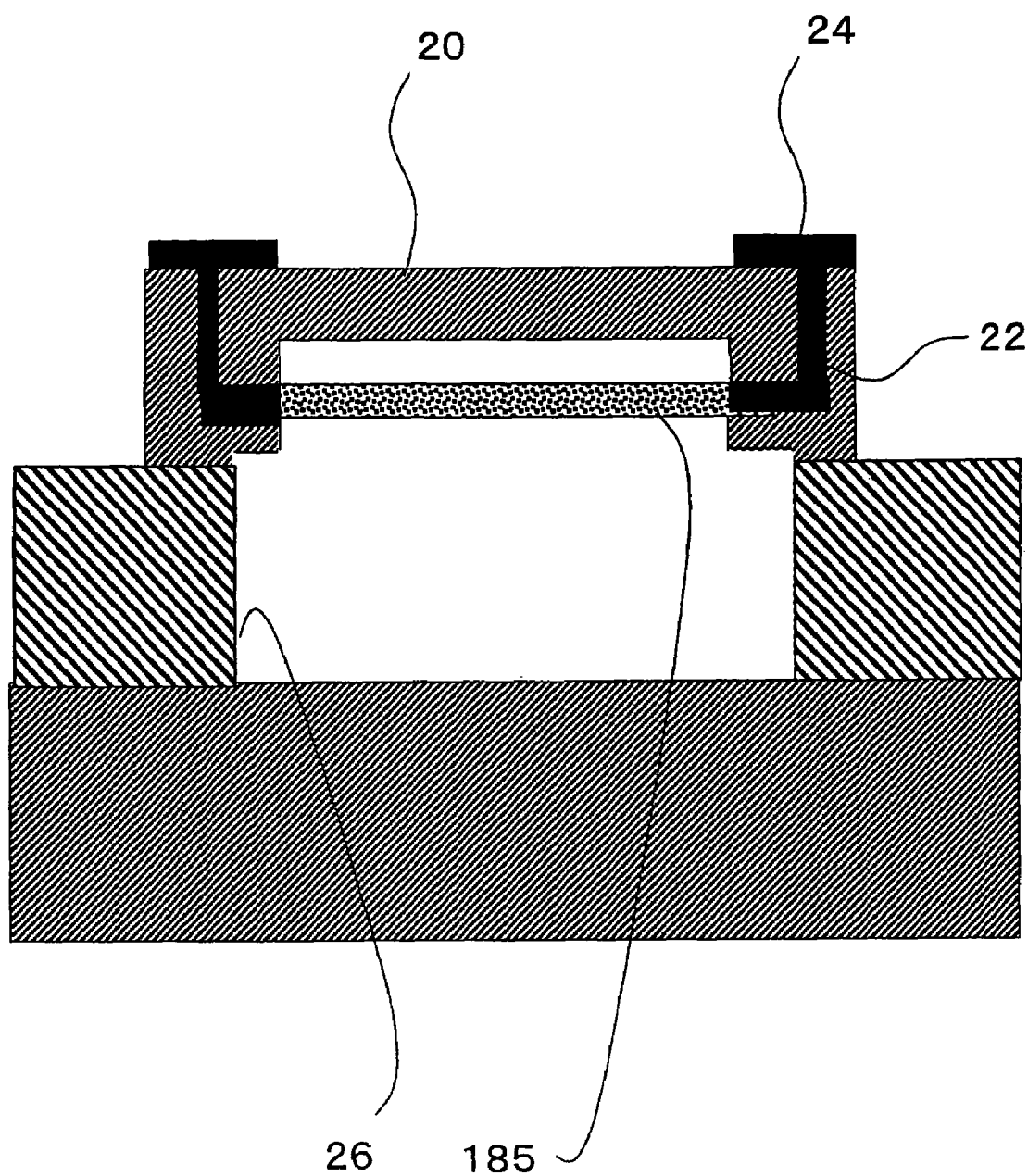
FIG. 28 is a cross-sectional view illustrating another example of the third preferred embodiment of the present invention.
Figure 29:
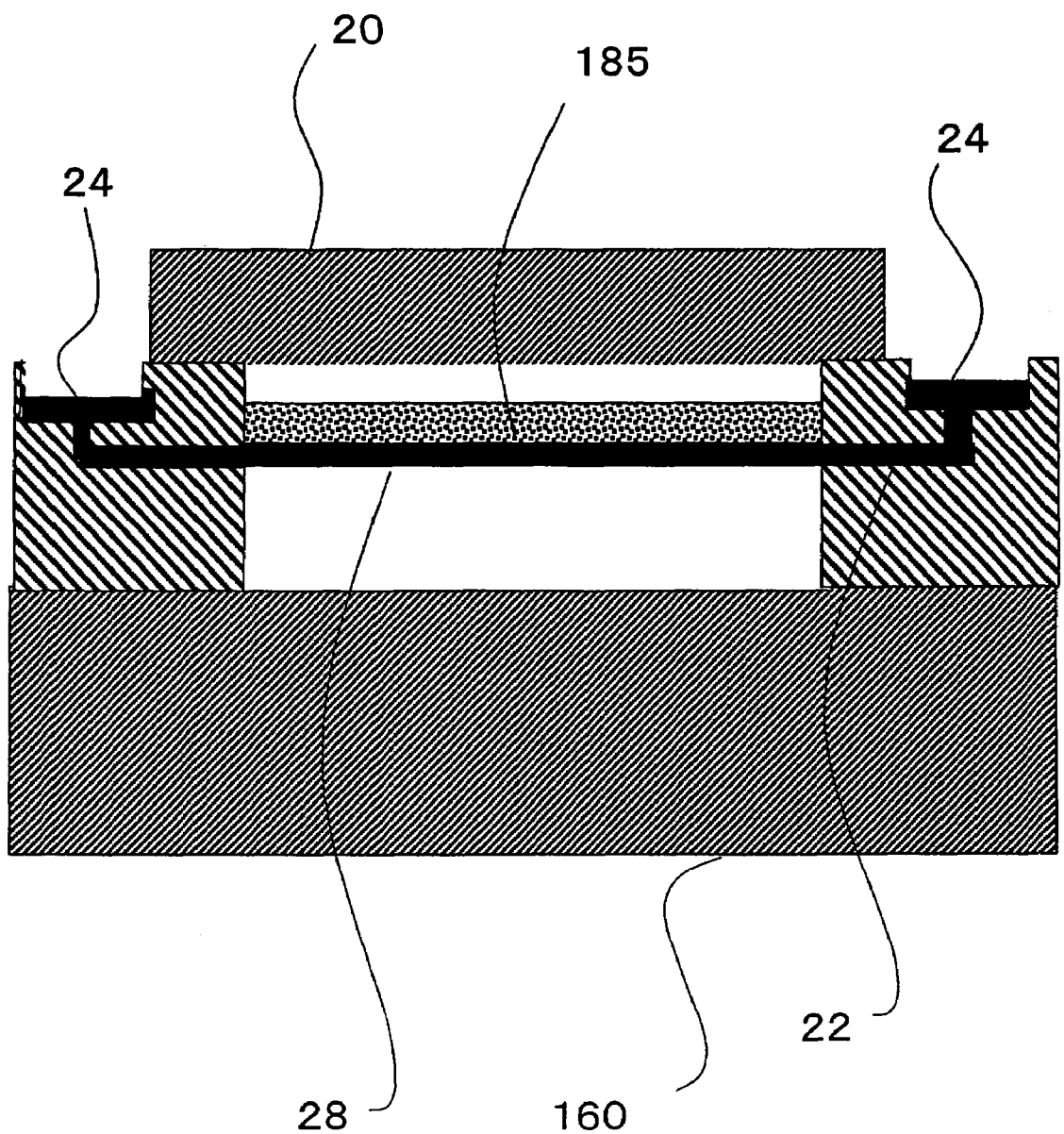
FIG. 29 is a cross-sectional view illustrating still another example of the third preferred embodiment of the present invention.

The electronic device of this preferred embodiment does not have to have the structure shown in FIG. 26 but may also have the structure shown in FIG. 28 or 29. In the electronic device shown in FIG. 28, after the gettering thin film 185, conductive line 22 and electrodes 24 have been assembled on the cap member 20, the cap member 20 with these members is bonded onto the silicon substrate 160. In this manner, not only the activating mechanism but also a vacuum measuring element and an infrared sensor may be provided for the cap member 20.

The electronic device shown in FIG. 29 adopts a structure in which the gettering thin film 185 is heated and activated by additionally providing a heat generating portion 28, which generates heat for the purpose of activation, instead of supplying the gettering thin film 185 with current. As the heat generating portion 28, a Peltier element or a resistor that generates Joule heat may be used. The heat generating portion may be either electrically isolated from, or electrically in contact with, the gettering thin film. If the heat generating portion is electrically in contact with the gettering thin film, part of the current flows through the gettering thin film and Joule heat is generated by the gettering thin film. As a result, not only the heat generated by the heat generating portion but also the Joule heat generated by the gettering thin film can be used effectively to activate the gettering thin film.

Figure 30:
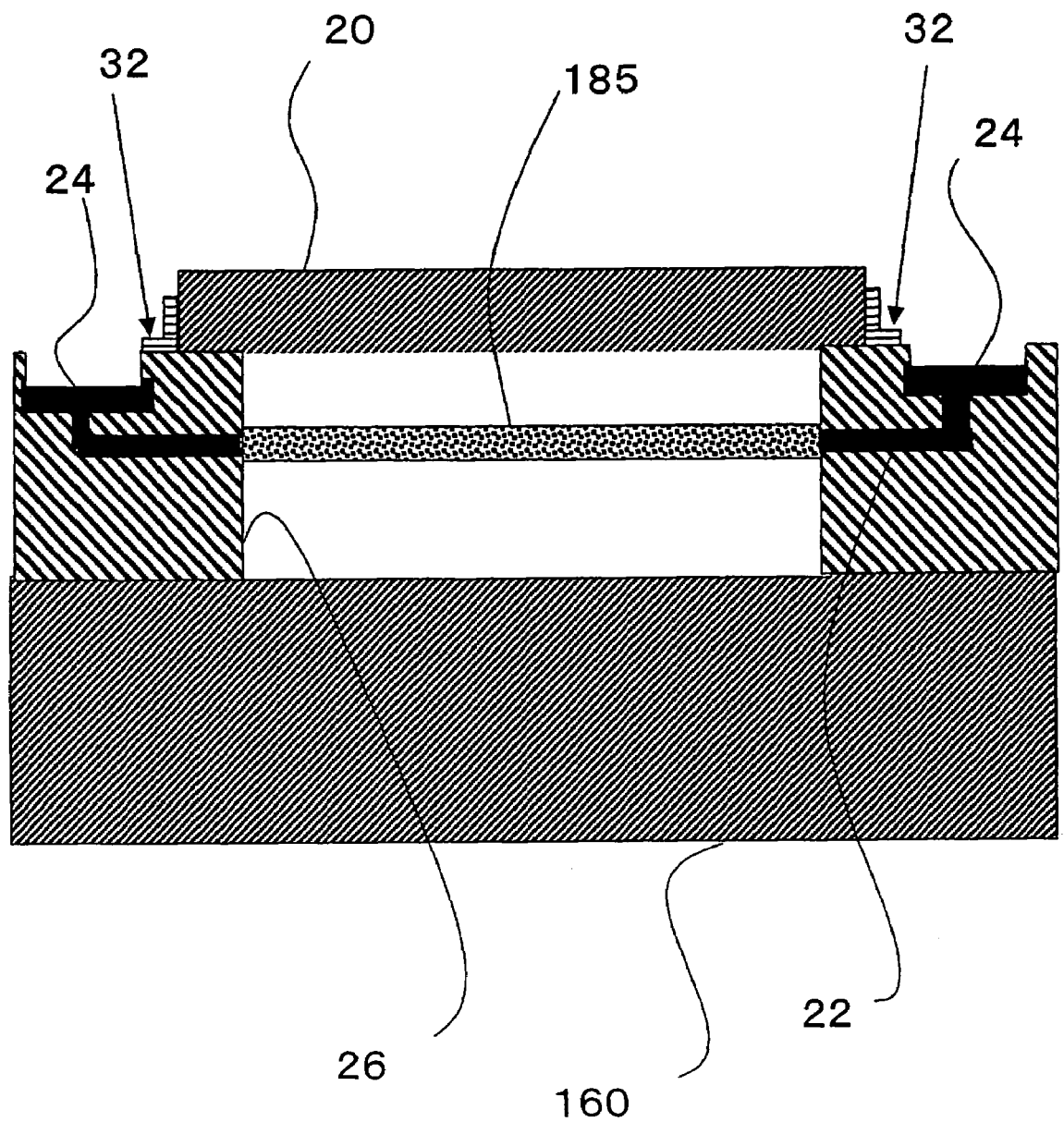
FIG. 30 is a cross-sectional view illustrating yet another example of the third preferred embodiment of the present invention.

The electronic device shown in FIG. 30 is characterized in that the cap member 20 and the cavity wall portion 26 are bonded together by a sealing thin film 32. The sealing thin film 32 is selectively grown where the cap member 20 and the cavity wall portion 26 contact with each other. To realize such selective growth, the region where the sealing thin film 32 should be deposited locally is preferably heated to an elevated temperature during the process step of growing the sealing thin film 32. In the example illustrated in FIG. 30, a sealing-thin-film-growing heat generating portion 34 is arranged near the bonding portions. This sealing-thin-film-growing heat generating portion 34 is a resistor line, which extends in the direction coming out of the paper and which generates heat when supplied with current in the process step of growing the sealing thin film 32.

Among the various bonding methods mentioned above, the processes that do not use solder or frit glass (e.g., anode bonding process or room temperature bonding process) are stabilized even at high temperatures, and therefore, are particularly preferred when the gettering thin film is heated to a high temperature in a micro vacuum package as is done in this preferred embodiment.

Embodiment 4

Hereinafter, a fourth preferred embodiment of the present invention will be described with reference to FIG. 31. The electronic device of this preferred embodiment is a camera (or imager) with an infrared area sensor.

Figure 31:
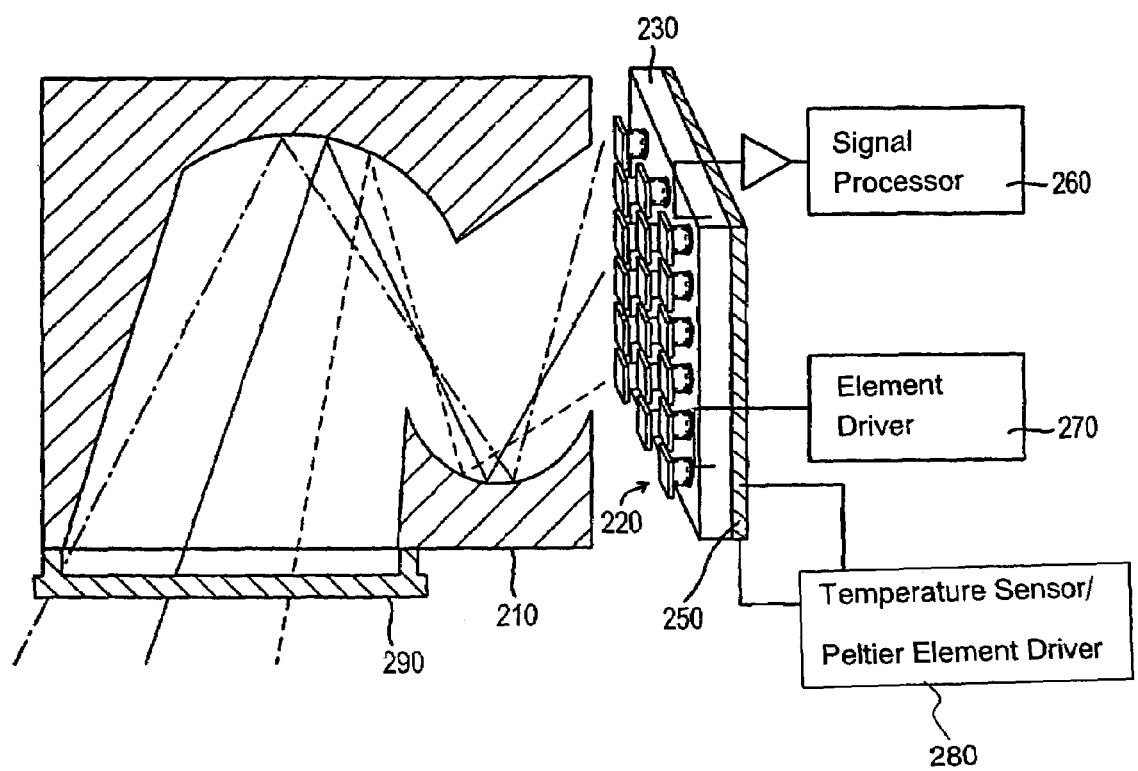
FIG. 31 illustrates a fourth preferred embodiment of the present invention.

As shown in FIG. 31, the camera of this preferred embodiment includes: an optical system 210 (which is a reflective optical system in FIG. 31 but may be a refracting optical system, too) for guiding an infrared ray, emitted from the object, toward an infrared sensing element; a substrate 230 including a plurality of infrared sensor elements 220, each or a number of which are encapsulated in a micro vacuum package that has been sealed with a cap member, for example; a Peltier element 250 arranged on the back surface of the substrate 230 so as to be opposed to the infrared sensor elements; a signal processor 260 for processing the output signals of the infrared sensor elements; an element driver 270 for driving the infrared sensor elements with pulses applied; a temperature sensor/Peltier element driver 280 for sensing the surface temperature of the substrate 230 and controlling the substrate temperature by driving the Peltier element 250; and a testing shielding plate 290 for cutting off an infrared ray that is going to enter the optical system while the temperature is being measured.

Next, the configuration of the infrared sensing elements will be described with reference to FIG. 32.

Figure 32:
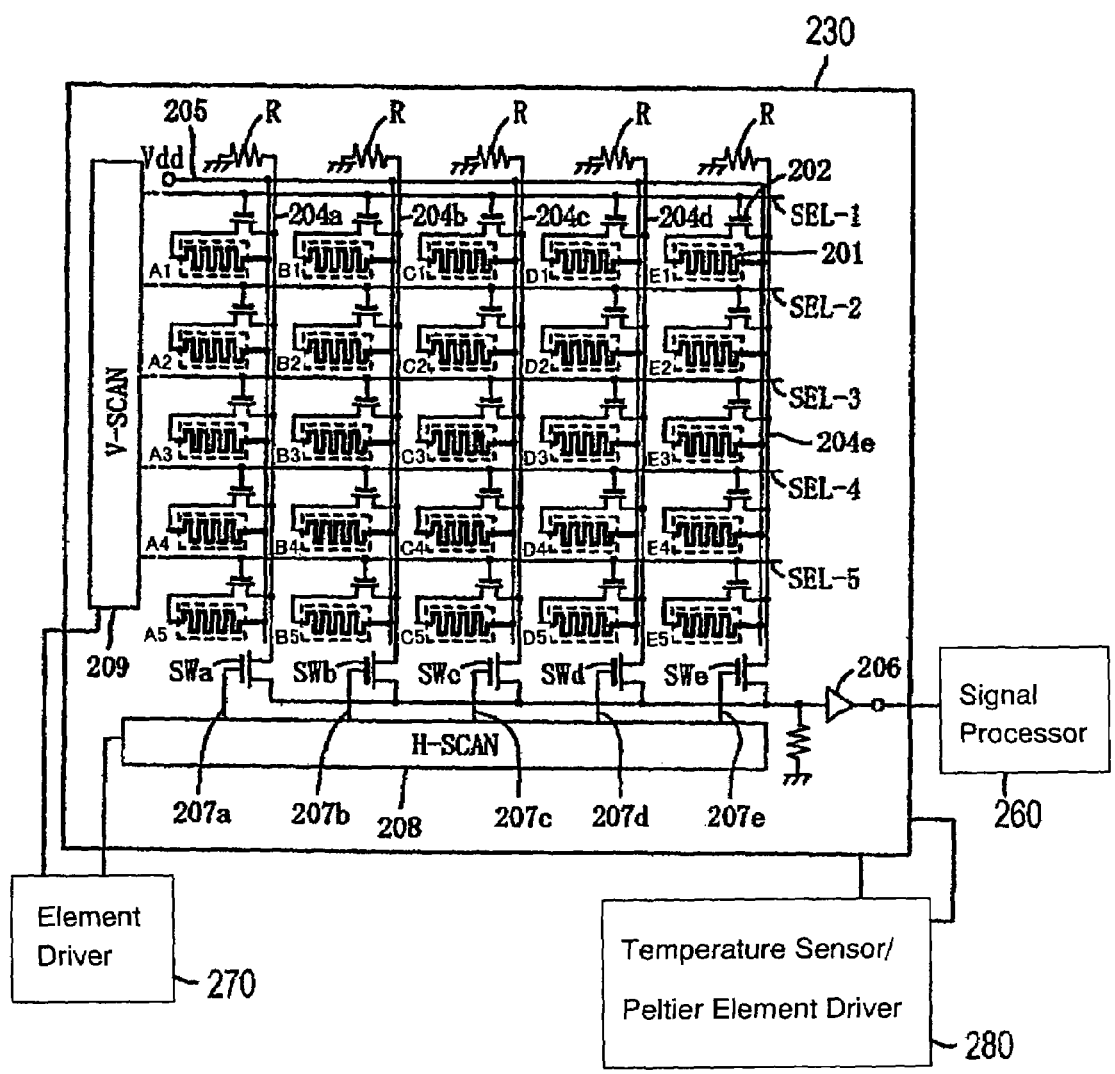
FIG. 32 is an equivalent circuit diagram of the fourth preferred embodiment of the present invention.

In this preferred embodiment, each of the infrared sensing elements that are arranged on the substrate 230 is encapsulated within a cap member as shown in FIG. 32. On the substrate 230, provided is an array of cells A1 through E5, each of which includes a resistor (bolometer) 201 and a switching transistor 202 and which are arranged in columns and rows. Each cell may have a size of about 40 μm to about 50 μm, which may be at least equal to 20 μm that is approximately twice as long as the wavelength of the infrared ray to be sensed.

FIG. 32 also shows the signal processor 260 for processing the output signals of the infrared sensing elements, the element driver 270 for driving the infrared sensing elements with pulses applied and the temperature sensor/Peltier element driver 280. The Peltier element is an element that uses the absorption of heat by carriers moving through Schottky contacts. When the temperature is measured, the testing shielding plate 290 shown in FIG. 31 cuts off the infrared ray that is going to enter the optical system.

The gate electrode of the switching transistor 202 of each cell is connected to a select line SEL-1 through SEL-5 extending from a vertical scanning circuit (V-SCAN) 209. One terminal of the resistor 201 of each cell is connected to a power supply line 205. The source of each switching transistor 202 is connected to a data line 204a through 204e, which extends from one terminal thereof by way of a grounded reference resistor R. The data lines 204a through 204e are connected to an output amplifier 206 by way of switching transistors SWa through SWe, respectively. To the gate electrodes of the respective switching transistors SWa through SWe, connected are signal lines 207a through 207e extending from a horizontal scanning circuit (H-SCAN) 208.

Although not shown in FIG. 32, the Peltier element 250, connected to the temperature sensor/Peltier element driver 80, is provided on the back surface of the substrate, thereby controlling the temperature of the substrate 230.

The external vertical scanning circuit (V-SCAN) 209 and horizontal scanning circuit (H-SCAN) 208 are connected to the external element driver 270 and drive the infrared sensing elements. The output signals of the infrared sensing elements are supplied to the signal processor 260 by way of the output amplifier 206.

Each infrared sensing element includes the meandering resistor (bolometer) 201 on the substrate 230 and the switching transistor 202 that turns ON and OFF the supply of the current to the resistor 201. The material of the resistor 201 may be any arbitrary one of Ti, TiO and polysilicon. The switching transistor 202 includes a source region, a drain region and a gate electrode and electrically connects the resistor 201, encapsulated in a vacuum, to an external circuit.

Degree of Vacuum of Infrared Sensing Element in Micro Vacuum Package

Figure 33:
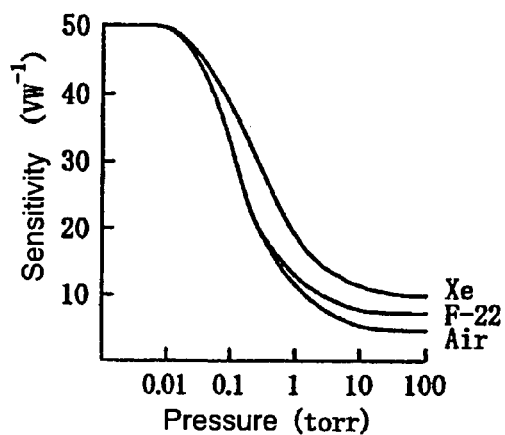
FIG. 33 is a graph showing how the sensitivity of an infrared sensing element changes with the degree of vacuum of an atmosphere.

To operate each infrared sensing element properly, the degree of vacuum of the space, in which the infrared sensing element is encapsulated, is important. FIG. 33 is a graph showing how the sensitivity of the infrared sensing element changes with the degree of vacuum of the atmosphere.

As shown in FIG. 33, the sensitivity of an infrared sensing element that is encapsulated in an atmosphere, of which the degree of vacuum is even lower than a degree of vacuum of about $1.0 \times 10^{-2}$ Torr (1.3 Pa), is about ten times as high as that of an infrared sensor in the air. That is to say, if the pressure of the atmosphere in which the infrared sensor is provided is reduced from about 102 Torr (1.3 Pa), an infrared sensor, of which the sensitivity is ten times as high as that of an infrared sensor driven in the air, is realized. Consequently, if the infrared sensing element can be encapsulated at a degree of vacuum that is higher than $10^{-2}$ Torr (1.3 Pa) and if this degree of vacuum can be maintained even after the encapsulation, a high-sensitivity device is realized.

Method of Determining Degree of Vacuum

If a resistor has its temperature raised by making it generate heat and then left for a predetermined amount of time, the temperature of the resistor drops again toward its original temperature. And by sensing this variation in temperature, the pressure can be measured.

Figure 34:
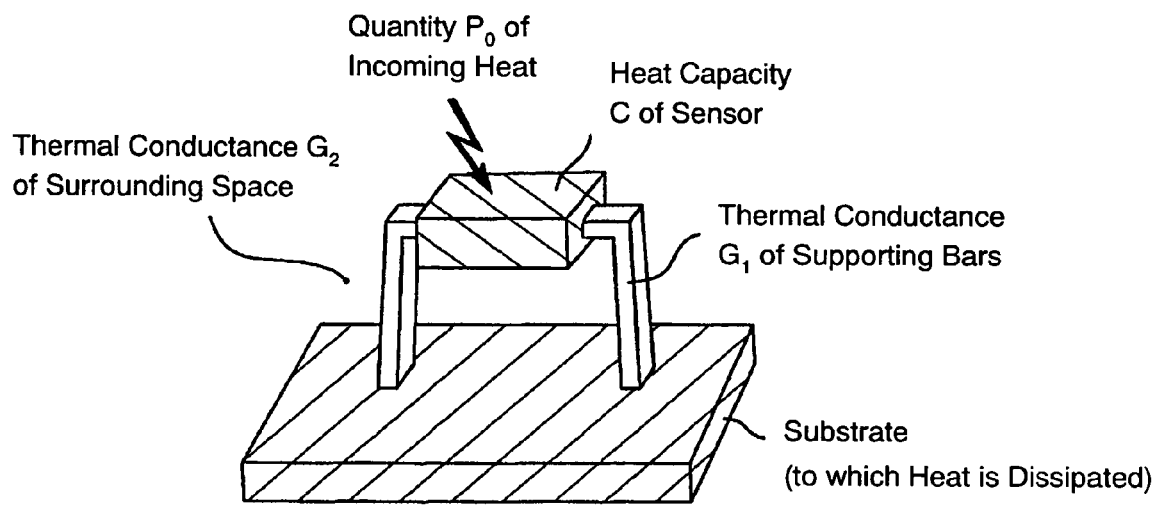
FIG. 34 is a perspective view illustrating how heat enters and leaves a resistor.

FIG. 34 illustrates how heat is generated from, and absorbed into, a resistor.

Suppose the quantity of heat generated by a microheater is identified by $P_0$, the heat capacity of the resistor by C, the temperature variation by $\Delta T$, the thermal conductance of the microheater supporting portion by $G_1$, the thermal conductance of the atmospheric gas surrounding the resistor by $G_2$ and the frequency by $\omega$. In that case, the following equation is satisfied:

$$Cd(\Delta T)/dt + (G_1(\Delta T) + G_2(\Delta T)) = P_0 \exp(j\omega t)$$

By modifying this equation, the temperature variation $\Delta T$ is given by:

$$\Delta T = P_0 \exp(j\omega t)/((G_1 + G_2) + j\omega c)$$

If the resistor is made to generate heat by itself, the temperature T of the infrared sensing element rises proportionally to the quantity $P_0$ of that heat generated. And as this temperature T rises, the electrical resistance R of the resistor changes.

Figure 35:
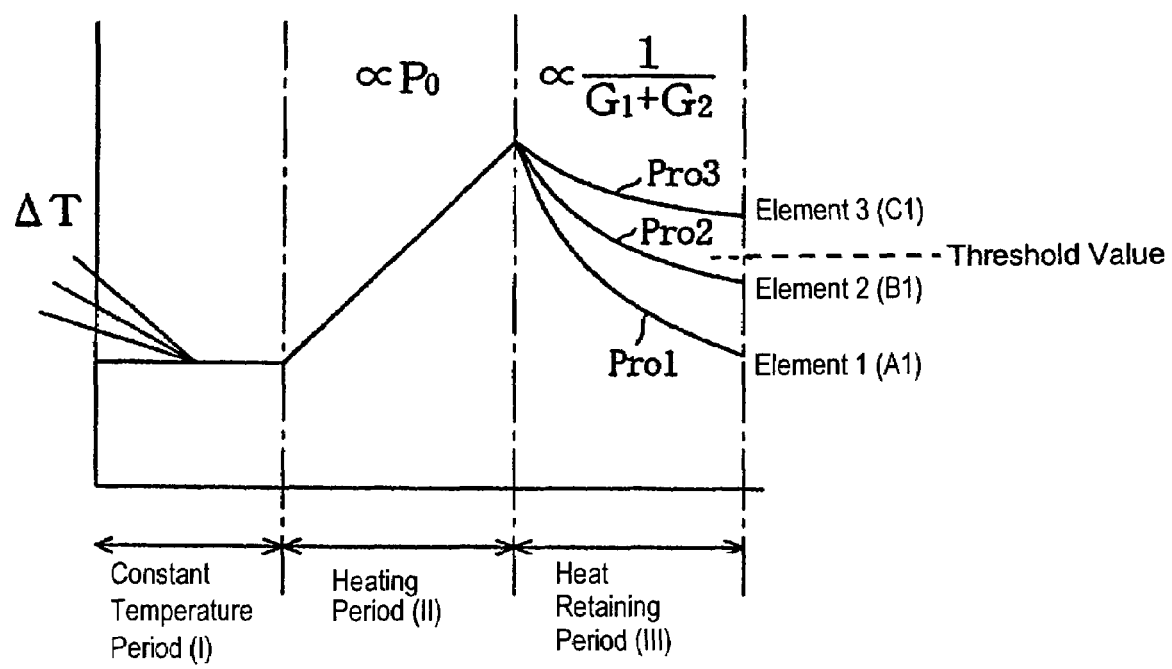
FIG. 35 is a graph showing how a resistor changes its temperature after having been made to generate heat by itself and left for a certain period of time, where Pro1, Pro2 and Pro3 denote the temperature profiles of Elements Nos. 1, 2 and 3 that are placed in micro packages with mutually different degrees of vacuum.

FIG. 35 shows how a resistor changes its temperature after having been made to generate heat by itself and then left for a certain period of time, where Pro1, Pro2 and Pro3 denote the temperature profiles of Elements Nos. 1, 2 and 3 that are placed in micro packages with mutually different degrees of vacuum.

The constant temperature period (I) is a period before the microheater starts to be heated and the heating period (II) is a period in which the resistor is being supplied with current and heated. During this heating period (II), the temperature T of the resistor rises by about 100° C. to about 01° C., for example. When the supply of the current to the resistor is stopped after the heating period (II) has passed, the resistor stops generating heat by itself and its temperature starts to drop. The rate of this temperature drop changes with the heat capacity C of the resistor and the thermal conductance $(G_1+G_2)$. During the predetermined heat retaining period (III), the temperature T of the resistor decreases to a temperature associated with the degree of vacuum.

In the example shown in FIG. 35, when the heat retaining period (III) is over, the temperature of Element No. 3 is higher than a threshold value (i.e., a temperature setting), while those of the other Elements Nos. 1 and 2 are lower than the threshold value. The difference between the temperature at the beginning of the heat retaining period and that at the end of the heat retaining period is ΔT.

The degree of vacuum can be estimated based on the temperature variation ΔT of the resistor. More specifically, ΔT of respective resistors are calculated and their average is worked out except their maximum and minimum values. Then, the degree of vacuum can be determined by a median filter method that uses the average as a threshold value (i.e., temperature setting). According to this method, in an electronic device in which the degrees of vacuum are going to decrease in more and more vacuum packages with time, the relative degree of vacuum in those vacuum packages can be figured out appropriately. Instead of adopting this method, a temperature associated with the degree of vacuum in question may be set as the threshold value (or temperature setting).

Hereinafter, a method of measuring the temperature T of the resistor will be described in further detail with reference to FIGS. 32 and 36.

Figure 36:
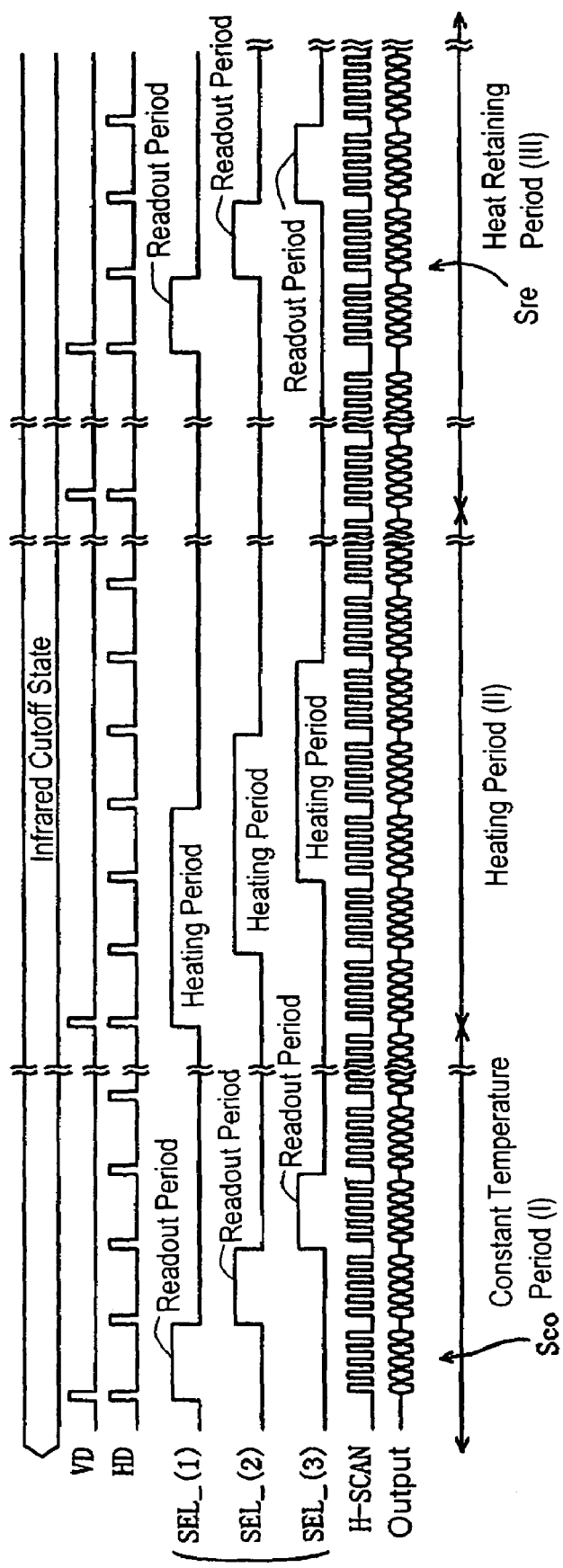
FIG. 36 is a timing diagram showing how to measure the temperature of a resistor according to a preferred embodiment, in which the abscissa represents the time and the ordinate represents the drive voltage.

FIG. 36 is a timing diagram showing how to measure the temperature of the resistor according to this preferred embodiment, in which the abscissa represents the time and the ordinate represents the drive voltage. In the following example, it will be described how to sense the temperatures of the resistors in the infrared sensing elements A1, B1 and C1 shown in FIG. 32 for the sake of simplicity. It should be noted that a "horizontal period" refers to an interval between two clock pulses of HD shown in FIG. 36 and a "frame" refers to an interval between two clock pulses of VD.

In the electronic device of this preferred embodiment, when the degree of vacuum is measured, the infrared ray that is going to enter the infrared sensing elements is cut off. More preferably, before the constant temperature period (I) shown in FIG. 36, no line selection state is maintained for several to several tens of frames, thereby keeping the temperatures of the respective infrared sensing elements A1, B1 and so on at constant levels.

Next, in the constant temperature period (I), while the temperatures of the respective infrared sensing elements are kept constant, the vertical scanning circuit (V-SCAN) 209 is driven with a voltage of 5 V applied to Vdd. The voltage is sequentially applied to SEL#1, SEL#2, and so on in this order. And when the voltage is applied to SEL#1, the output signals Sco (i.e., first group of signal outputs) of the respective infrared sensing elements A1, B1, C1 and so on are read one after another. Then, the values of these output signals Sco are written on a preframe memory in the signal processor 260 when they are selected by the horizontal scanning circuit (H-SCAN) 208.

In the heating period (II), the vertical scanning circuit (V-SCAN) 209 is driven with a voltage of 25 V applied to Vdd. In this case, the value of the voltage applied to Vdd is preferably greater than that of the voltage applied during the constant temperature state (I) by at least 20 V. When the vertical scanning circuit (V-SCAN) 209 is driven, SEL#1, SEL#2, and so on are selected sequentially. And when SEL#1 is selected, the voltage is applied to the respective infrared sensing elements A1, B1, C1 and so on. At this point in time, since the infrared sensing elements A1, B1, C1 and so on have substantially equal resistance values, the resistors in the respective infrared sensing elements A1, B1, C1 and so on generate heat by themselves and their temperatures will reach almost the same temperature. In the example shown in FIG. 36, the heating period includes three horizontal periods. However, the heating period may be further extended for several tens of frames.

In the heat retaining period (III), the vertical scanning circuit (V-SCAN) 209 is driven with a voltage of 5 V applied to Vdd again. The voltage is sequentially applied to SEL#1, SEL#2, and so on in this order. And when SEL#1 is selected, the output signals Sre of the respective infrared sensing elements A1, B1, C1 and so on are read one after another. Then, the values of these output signals Sre (i.e., second group of signal outputs) are read one after another when they are selected by the horizontal scanning circuit (H-SCAN) 208. By making the signal processor 260 compare the values of the output signals Sre after the heating period with those of the output signals Sco before the heating period, which are stored in the preframe memory, the variations in the temperatures of the respective infrared sensing elements can be detected.

If the output signals are read one after another when a predetermined amount of time passes after the resistors have been heated, the temperatures of infrared sensing elements with decreased degrees of vacuum will be lower than those of infrared sensing elements with higher degrees of vacuum as described above. Thus, by measuring the temperature variations before and after the heating, the degrees of vacuum of cap members that encapsulate the respective infrared sensing elements can be estimated.

Hereinafter, it will be described how the value of the temperature variation before and after the heating changes with the actually output voltage signal in the infrared sensing element A1, for example.

As can be seen from FIG. 32, the output voltage V(A1) of the infrared sensing element A1 is obtained by multiplying the divided resistance value between the resistance value R(A1) of the infrared sensing element A1 and the resistance value R(ref) of the reference resistor R shown in FIG. 32 by the voltage Vdd applied to the power supply line 205. That is to say, the output voltage V(A1) of the infrared sensing element A1 is given by:

$$V(A1) = \{R(\text{ref})/(R(A1)+R(\text{ref}))\} \cdot Vdd$$

On the other hand, the temperature T(t) of the infrared sensing element A1 satisfies $$T(t) \propto \{R(A1)/(R(A1)+R(\text{ref}))\} \cdot Vdd \propto Vdd - V(A1)$$

In this case, the temperature variation ΔT between the temperature T(t0) of the infrared sensing element A1 during the constant temperature period (I) and the temperature T(t1) thereof during the heat retaining period (III) is given by:

$$\Delta T = T(t1) - T(t0)$$

If the output voltage V(A1) of the infrared sensing element A1 is given, then a unique temperature variation value ΔT is determined just by the output voltage V(A1) because the resistance value R(A1) and applied voltage value Vdd are already known.

If the temperature of the Peltier element is set lower than normal (e.g., decreased to 10° C. or less) by using the temperature sensor/Peltier element driver 280 shown in FIG. 32, then the heat radiated from the wall of the cap member toward the bolometer decreases and the bolometer is cooled as a result.

Also, in the heating period (II) of the example shown in FIG. 36, the start of heating is shifted one line after another (i.e., heating starts on SEL#1 first, on SEL#2 next, and then on SEL#3) so as to equalize the length of the interval between the start of heating and the readout timing on a line-by-line basis. Alternatively, the heating may be started at the same time on all of those lines.

In the heating period (II) shown in FIG. 36, the bolometer is made to generate heat by itself by applying a voltage thereto. Alternatively, in the heating period (II), the substrate may be heated by raising only the temperature of the Peltier element without applying any voltage to the bolometer and the temperature of the bolometer may be increased by the radiation of heat from either the substrate or the wall of the cap member. And then in the readout period, the temperature of the Peltier element may be decreased to its original temperature (e.g., 10° C.) and a read operation may be performed on a line-by-line basis. According to this method, it can be determined that the greater the variation in the temperature of the bolometer before and after the substrate is heated by the Peltier element, the poorer the degree of vacuum would be and that the smaller the variation in the temperature sensed, the better the degree of vacuum would be.

Optionally, the heating may also be done by using the bolometer and the Peltier element in combination during the heating period (II) shown in FIG. 36.

Signal Processing Method

Figure 37:
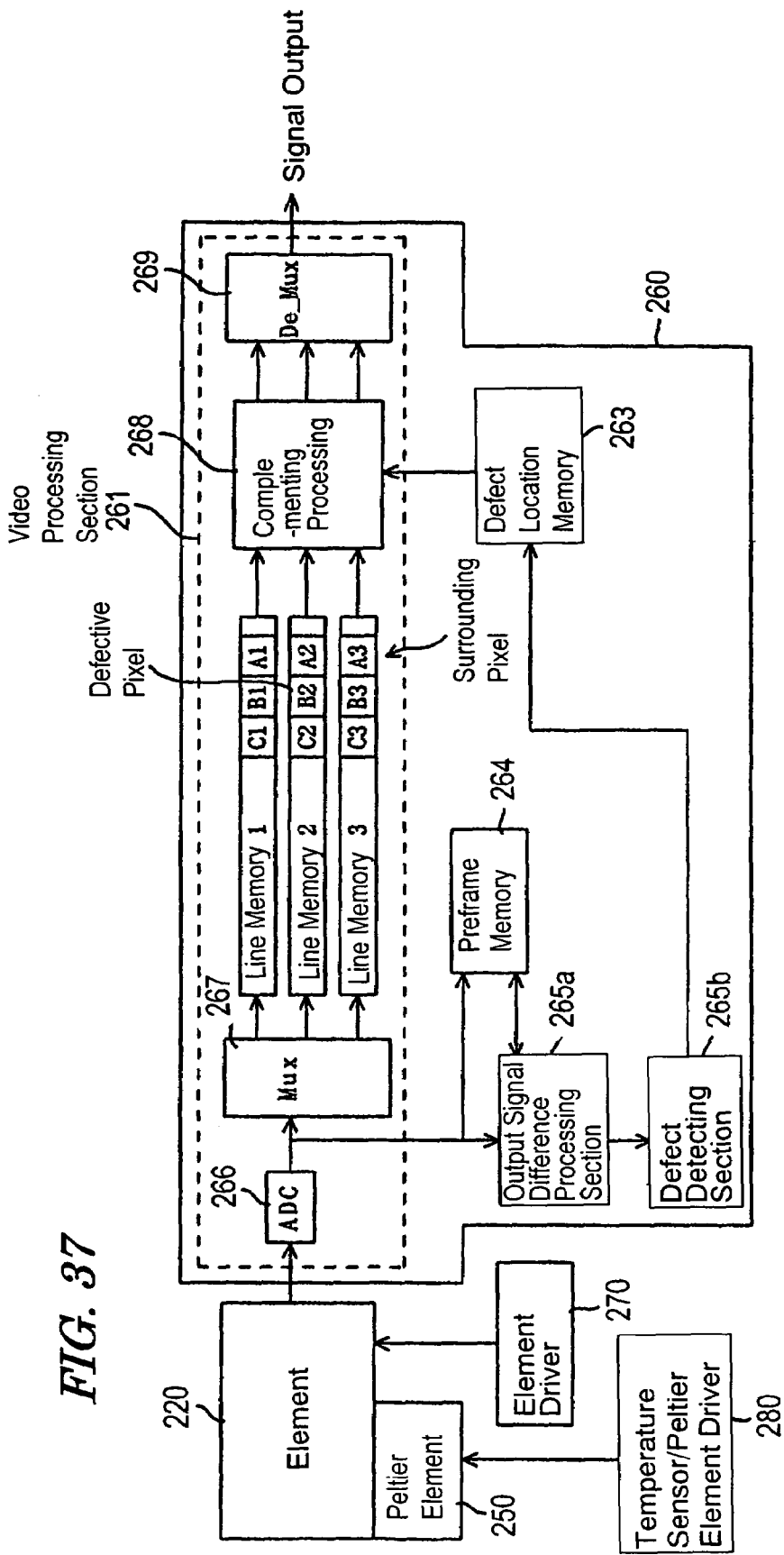
FIG. 37 shows a circuit for processing the output signal of an infrared sensing element and doing an interpolation process on a defect when the temperature is measured to determine the degree of vacuum.

Hereinafter, it will be described with reference to FIG. 37 how the signal processor 260 processes the output signals Sco and Sre obtained by the measuring method shown in FIG. 36. FIG. 37 shows a circuit for processing the output signals of the infrared sensing element and doing a complementing process on a defect when the temperature is measured to determine the degree of vacuum.

As shown in FIG. 37, while the temperature is being measured, the signal Sco output from the infrared sensing element during the constant temperature period (I) shown in FIG. 36 gets A/D converted into a digital signal Dco by the ADC 266 of the signal processor 260 and then stored in the preframe memory 264.

Next, the signal Sre output from the infrared sensing element 220 that has gone through the heating period (II) and then has been left for a predetermined amount of time also gets A/D converted into a digital signal Dre by the ADC 266 of the signal processor 260. Thereafter, an output signal difference processing section 265*a* generates a signal representing the variation between the digital signal Dco stored in the preframe memory 264 before the heating period and the digital signal Dre after the heating period.

Furthermore, a defect detecting section 265*b* compares the output signal representing this variation to a threshold value (i.e., a voltage setting) that has been defined based on the threshold value (temperature setting) shown in FIG. 35, thereby determining the degree of vacuum of the infrared sensing element.

If its degree of vacuum has been judged as decreased as a result of this degree of vacuum determination, the location of the infrared sensing element in question is stored on a defect location memory 263.

Defective Pixel Complementing Method

Hereinafter, it will be described with reference to FIG. 37 how to perform a complementing process on an infrared sensing element with a defect in a situation where the electronic device of this preferred embodiment is used in a camera.

When such a camera including the infrared sensing element is actually used, the infrared ray emitted from an object is made to enter the infrared sensing element 220 with the testing shielding plate removed and the output signal of the infrared sensing element 220 is visualized. If this process step is repeated, the degree of vacuum gradually decreases in the region in which each infrared sensing element 220 is encapsulated, and the degrees of vacuum decrease differently from one cap member, encapsulating its associated infrared sensing element 220, to another. Consequently, the sensitivity has decreased in some infrared sensing elements 220 due to the significant decrease in degree of vacuum and those infrared sensing elements can be located by the temperature measuring method described above.

When the camera is actually used, the infrared ray that has been incident on the optical system 210 goes through the infrared sensing element to turn into an output signal S, which is then input to a video processing section 261 in the signal processor 260 and converted by the ADC 266 into a digital signal of eight bits or more. Thereafter, the digital signal is distributed by a multiplexer (Mux) 267 to line memories Nos. 1 to 3 associated with three lines or more and temporarily stored there as signals representing pixels on the respective lines (i.e., SEL#1, SEL#2 and so on shown in FIG. 32). Subsequently, the signals representing the pixels on the respective lines are input to a complementing processor 268, which subjects the signal representing a defective pixel and stored in the defective location memory 263 to an interpolation complementing process by using eight pixel signals surrounding that defective pixel signal. More specifically, the complementing process may be carried out by replacing the signal representing a pixel that has been regarded as defective (e.g., B2 shown in FIG. 36) according to the information provided by the defect location memory 263 with a pixel signal obtained by adding the signals representing the eight surrounding pixels (e.g., A1, B1, C1, A2, C2, A3, B3 and C3 shown in FIG. 36) together and then multiplying the sum by ⅛. The data obtained by performing this complementing process is input to a demultiplexer (De_Mux) 269, which selects a line required for reading and output the line as an output signal.

Arrangement of Micro Vacuum Packages

Hereinafter, an arrangement of micro vacuum packages according to this preferred embodiment will be described with reference to FIG. 38, which schematically shows the arrangement of micro vacuum packages in the cell array shown in FIG. 32.

Figure 38:
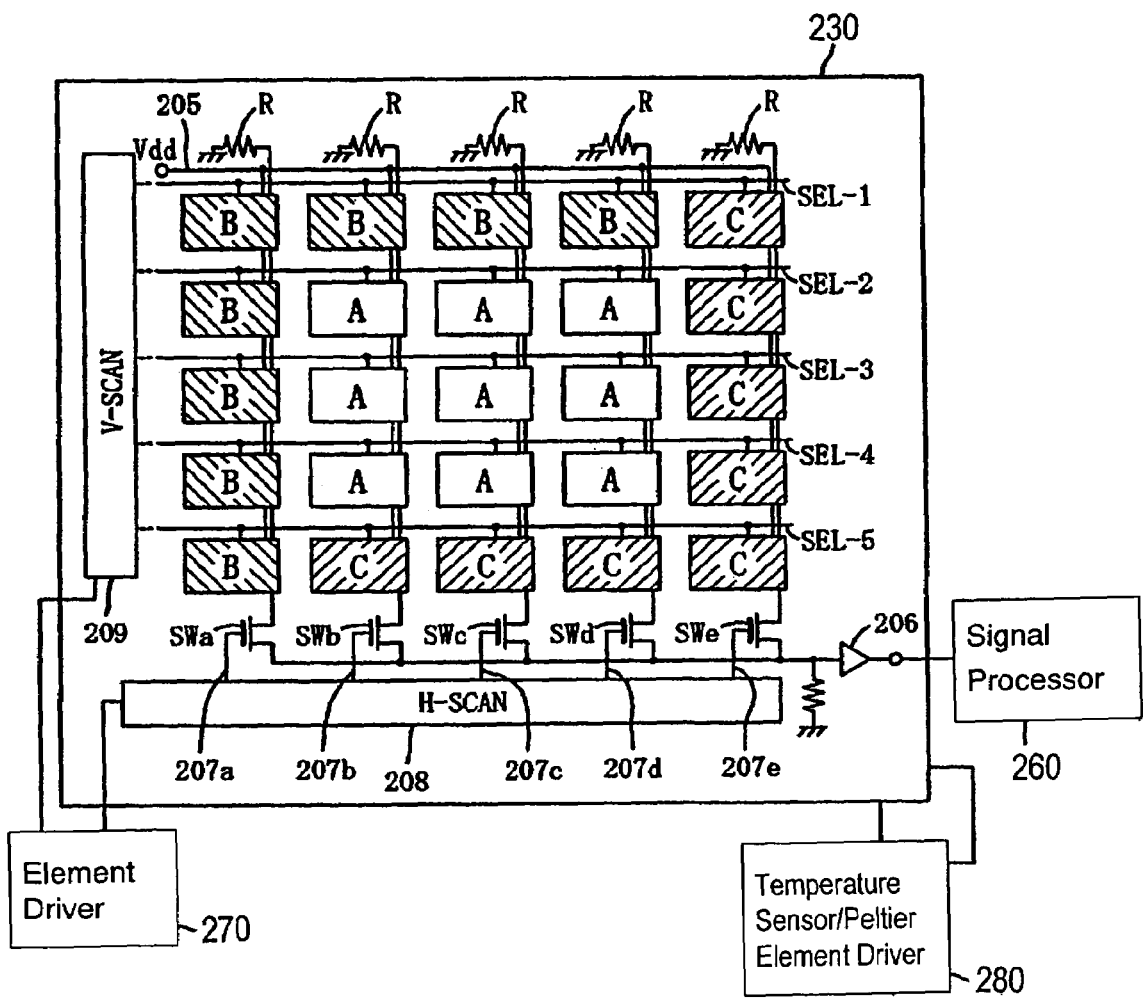
FIG. 38 schematically shows the arrangement of micro vacuum packages in the cell array shown in FIG. 32.
Figure 39:
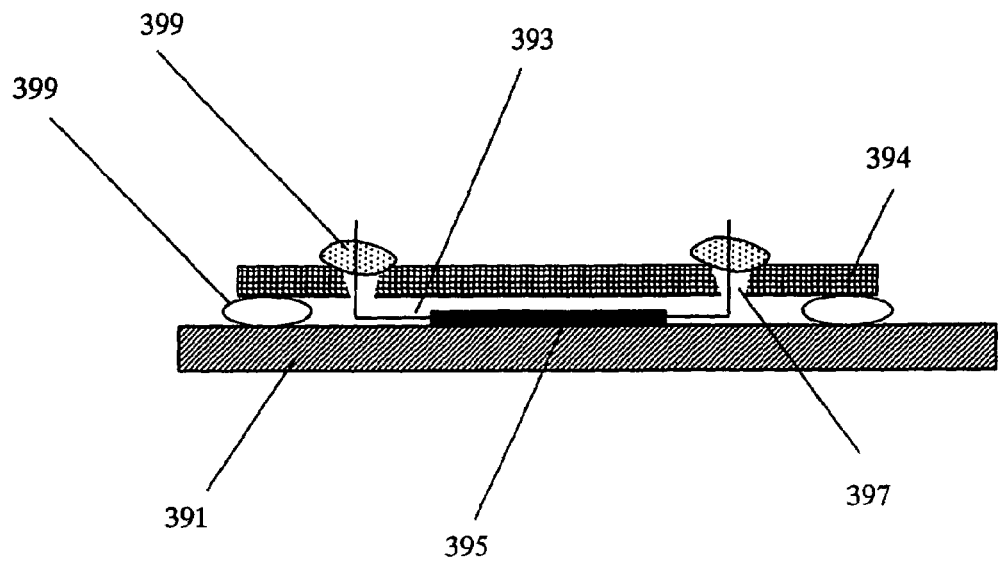
FIG. 39 schematically illustrates a cross-sectional structure of a conventional electronic device with a vacuum package.
Figure 40:
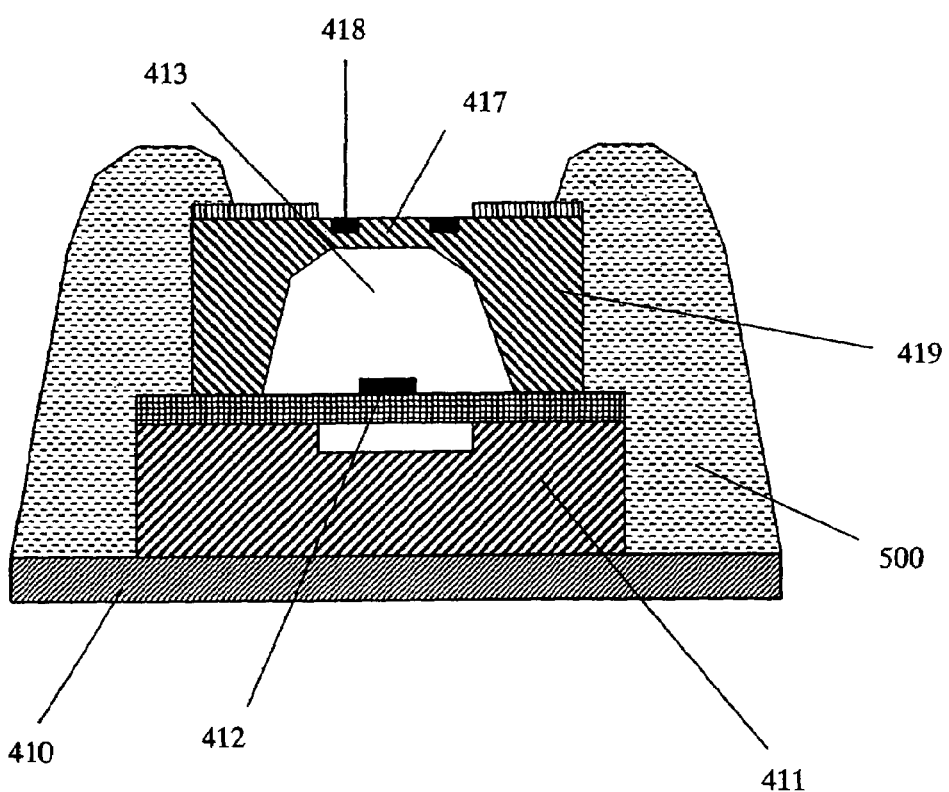
FIG. 40 is a cross-sectional view illustrating a conventional electronic device with the function of measuring the degree of vacuum.

As shown in FIG. 38, the array of cells of this preferred embodiment includes micro vacuum packages A, B and C. The micro vacuum packages A are made of Si that transmits an infrared ray. The inside of these micro vacuum packages does not cut off the infrared ray and its atmosphere has a reduced pressure. On the surface of the micro vacuum packages B, Al that cuts off an infrared ray may have been deposited by a sputtering process. The inside of these micro vacuum packages does cut off the infrared ray and its atmosphere also has a reduced pressure. The micro vacuum packages C are made of Si that transmits an infrared ray and have openings locally. Thus, the inside of the micro vacuum packages does not cut off the infrared ray and its atmosphere has the atmospheric pressure.

Hereinafter, the micro vacuum packages of each of these types and the function of the infrared sensing elements encapsulated in the micro vacuum packages will be described.

The infrared sensing element encapsulated in each micro vacuum package A (which will be referred to herein as the "infrared sensing element A") is under a reduced-pressure atmosphere and is ready to be exposed to an incoming infrared ray. The infrared sensing element A senses the infrared ray that has been emitted from the object and outputs a signal representing the intensity of the infrared ray that has come from the object. In this case, the output signal has an offset value that is always included even if no infrared ray is incident. Also, the degree of vacuum in the micro vacuum packages A is kept at least equal to a reference value when the packages are sealed. However, the degree of vacuum would decrease gradually either with time or with repeated use of the device.

The infrared sensing element encapsulated in each micro vacuum package B (which will be referred to herein as the "infrared sensing element B") is also under a pressure that has been reduced to approximately the same degree as in the infrared sensing element A and does not receive any incoming infrared ray. Accordingly, when the camera is actually used, dark-mode (no infrared ray) outputs can be obtained in the areas where the infrared sensing elements B are located. And by using these measured values, the offset value can be removed from the output signals of the infrared sensors A described above.

The infrared sensing element encapsulated in each micro vacuum package C (which will be referred to herein as the "infrared sensing element C") is under the atmospheric pressure. Thus, in performing a test to determine the degree of vacuum, the temperature of the infrared sensing element C under the atmospheric pressure (i.e., where the degree of vacuum has decreased most) can be known. And by comparing the temperature of this infrared sensing element C to the average of the temperatures of the infrared sensing elements A, it can be determined how much the degree of vacuum has decreased in the overall array of cells.

In this preferred embodiment, the micro vacuum packages B and C are arranged on peripheral ones of the infrared sensing elements that form the array of cells. However, according to the present invention, the arrangement of the micro vacuum packages B and C is not limited to the illustrated one.

More specifically, the effects described above are achieved if one micro vacuum package C is provided per line. The micro vacuum packages B are preferably provided for about 20 to about 30 pixels in an array of cells having 510 pixel signals in the horizontal direction.

Also, the array of cells of the present invention does not always have to have both the micro vacuum packages B and the micro vacuum packages C. Alternatively, the array may include just one of these two types or even neither of these two types.

Optionally, in this preferred embodiment, no micro vacuum packages C may be provided for the infrared sensing elements C and the difference between the heat generated by the bolometer by itself and the radiated heat may also be calculated with the infrared sensing elements C exposed to the air during testing. It should be noted that the micro vacuum packages C with openings are provided for the infrared sensing elements C according to this preferred embodiment to make more accurate measurements by setting heat convection and other conditions during testing even closer to those of the infrared sensing elements A and B.

The calculation of the temperature variation value and the determination of the degree of vacuum may sometimes be done during the manufacturing process, just before shipment, or even by the user himself or herself after the product has been shipped as will be described below.

First, during the manufacturing process, micro vacuum packages A, B and C with a degree of vacuum of $1.3 \times 10^{-3}$ Pa, for example, are fabricated. The micro vacuum packages may be formed by attaching a cap member or by performing the process steps as already described for the first preferred embodiment (including the process step of cutting etch holes, making cavities by etching, and closing the etch holes by a sputtering process in this order).

The micro vacuum packages C have slit-like openings, and therefore, the internal pressure of the micro vacuum packages C is maintained at the known degree of vacuum in the vacuum chamber. For that reason, if the temperature variation value is figured out at this point in time, the temperature variation value of the infrared sensing elements C in the micro vacuum packages C may be used as a reference value corresponding to the known and best degree of vacuum. A table showing this correspondence may be referred to in setting a threshold value, for example.

Next, the degree of vacuum may be checked just before the product is shipped in order to spot defective micro vacuum packages, of which the degree of vacuum has decreased due to imperfect bonding of the cap during the manufacturing process, for example. And after the device has been shipped, the degree of vacuum may be checked to spot defective micro vacuum packages, of which the degree of vacuum has decreased either with time or with repeated use of the device. In checking these degrees of vacuum, a threshold value may be calculated in advance by reference to the table of correspondence compiled during the manufacturing process. Or when the degree of vacuum is determined, the average of the temperature variation values of the infrared sensing elements C in the micro vacuum packages C may be defined as a reference threshold value at the atmospheric pressure.

In the preferred embodiment described above, one infrared sensing element is arranged within one micro vacuum package. Alternatively, a plurality of infrared sensing elements may be packed inside a single micro vacuum package.

Also, in the preferred embodiment described above, a bolbmeter is used as an element that requires a reduced-pressure atmosphere. However, not just the bolometer but also a thermoelectric converter such as a pn junction diode, an electron emitter, or an element that senses or radiates a tera wave with a wavelength of 40 µm to 50 µm may be used. Furthermore, the electronic device of the present invention is applicable to not only a camera but also various infrared sensors and other types of devices.

As the method of determining the degree of vacuum, the device is supposed to go through a heating period, be left for a predetermined amount of time, and then have its temperature measured in the foregoing description. Alternatively, according to the present invention, the degree of vacuum may also be determined by calculating the amount of time it takes for the device to reach a constant temperature after it has gone through the heating period and by comparing that amount of time to a threshold value (i.e., time setting).

Furthermore, instead of detecting the degree of vacuum based on the variations in current and temperature, the degree of vacuum may also be detected in the steady state as in the preferred embodiment described above.

In the first and second preferred embodiments described above, a plurality of infrared sensing elements and a plurality of visible light detecting elements are arranged regularly on the same substrate. Alternatively, just one infrared sensing element may be arranged on the substrate. An electronic device with such a configuration may be used effectively as a monitor camera, for example. When used as a monitor camera, such an electronic device gets an imaging operation done by the visible light detecting element as soon as the infrared sensing element senses the presence of a human being, and the administrator of the monitor camera may check the video shot in this manner.

An electronic device including an infrared sensing element and a visible light detecting element on the same substrate is also disclosed in Japanese Patent Application Laid-Open Publication No. 2003-17672, for example. And the present invention is also applicable for use in the electronic device disclosed in this patent document.

Next, a configuration for automatically activating the gettering thin film in the electronic device of this preferred embodiment will be described with reference to FIG. 41.

Figure 41:
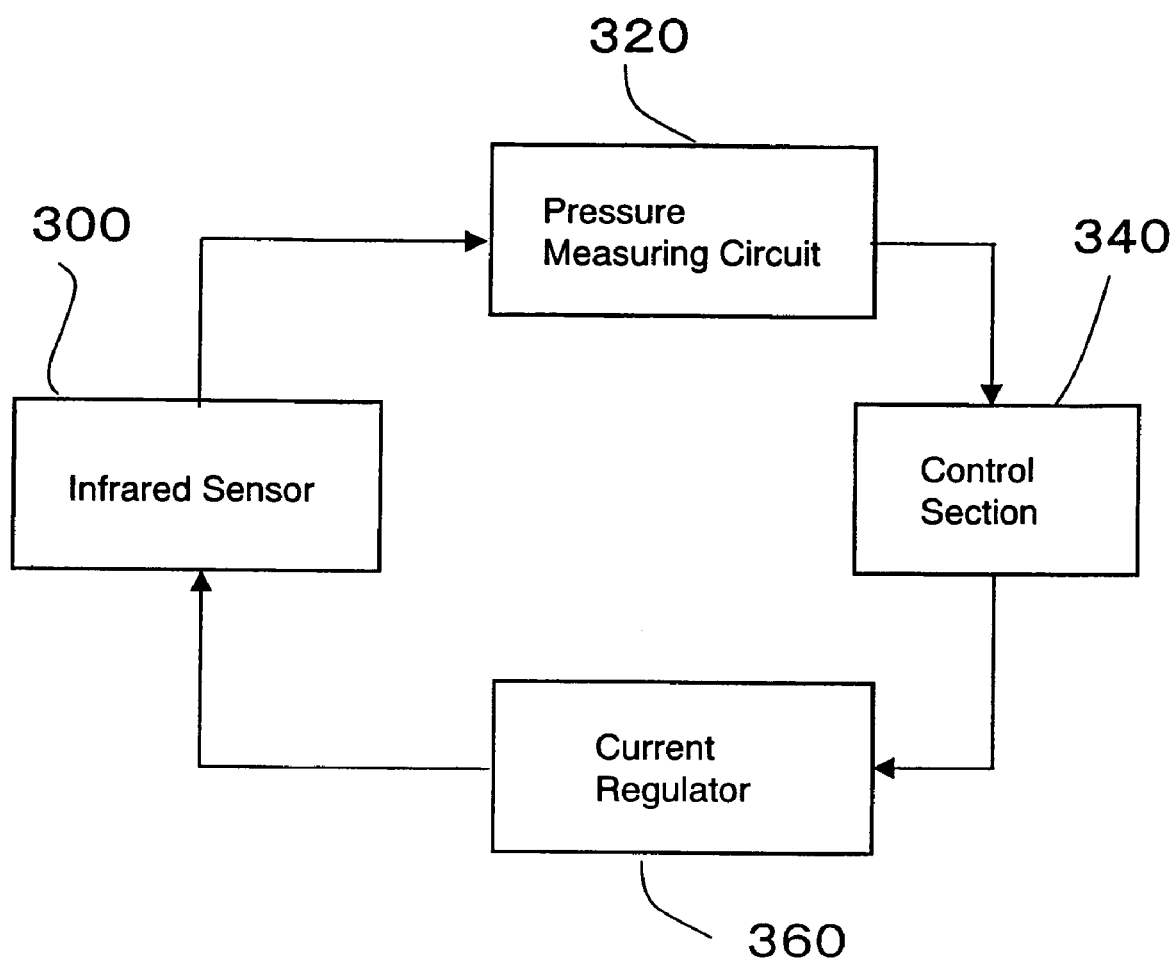
FIG. 41 is a block diagram schematically showing the configuration of a circuit for activating a gettering thin film in an electronic device according to a preferred embodiment of the present invention.

The device shown in FIG. 41 includes an infrared sensor 300, including a pressure measuring element and a gettering thin film in each of its cavities, a pressure measuring circuit 320 for measuring the pressure in each cavity of the infrared sensor 300, a control section 340 that receives the output of the pressure measuring circuit 320 and determines in which cavity a pressure abnormality has occurred, and a current regulator 360 for supplying current to the gettering thin film of the infrared sensor 300 to activate the gettering thin film.

Based on the value of the pressure measured, the control section 340 determines whether or not to activate the gettering thin film of the infrared sensor 300 and controls the current regulator 360. On sensing that the pressure has increased so much in a cavity of the infrared sensor 300 as to exceed a threshold value, the control section 340 may control the current regulator 360 such that the current regulator 360 activates each and every gettering thin film by supplying current thereto. Alternatively, in order to selectively activate only the gettering thin film that is located in that particular cavity in which the pressure has increased beyond the threshold value, the activating current may be supplied to only the selected gettering thin film. These operations may be defined arbitrarily by modifying the program that is stored in the memory of the control section 340.

In the configuration shown in FIG. 41, the control section 340 activates the gettering thin film based on the pressure measured by the pressure measuring circuit 320. However, the gettering thin film may be activated at regular intervals without performing such an operation of measuring the pressure. In that case, the control section 340 may keep time using a timer, for example. And on sensing that a predetermined amount of time has passed, the control section 340 may control the current regulator 360 automatically so as to activate the gettering thin film.

It should be noted that if the gettering thin film is activated without measuring the pressure, the operation program of the control section 340 may be defined so as to activate the gettering thin film not at the regular intervals but every time a particular event happens (e.g., when an instruction to turn the power ON or get a sensing operation started by the infrared sensor is received).

According to the present invention, a pressure measuring element and a gettering thin film are arranged in the cavity of a micro vacuum package, for example, and therefore, the degree of vacuum in each micro vacuum package can be measured with high precision. In addition, by activating the gettering thin film in the cavity appropriately, the degree of vacuum in the cavity can be maintained at a high level at a reduced cost.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An electronic device comprising a substrate and a plurality of infrared sensing elements, which are arranged on the substrate,
    wherein each of the infrared sensing elements includes:
    a cavity wall portion, which is provided on the substrate to form a closed cavity with a reduced pressure;
    a gettering thin film, which is arranged in the closed cavity and has the function of adsorbing a surrounding substance; and
    an activating portion, at least a part of which is arranged in the closed cavity and which has the function of activating the gettering thin film by generating heat and the function of sensing a temperature inside the closed cavity, the activating portion being a PN junction diode, and
    wherein the electronic device further includes a control section for detecting degrees of vacuum in respective closed cavities based on the temperatures sensed and for activating the gettering thin film selectively in some or all of the closed cavities based on the degrees of vacuum detected.

2. The electronic device of claim 1, wherein the gettering thin film is arranged under the activating portion.

3. The electronic device of claim 1, wherein the activating portion includes:
    a heat generating portion that generates heat responsive to current; and
    a conductive line for supplying the current to the heat generating portion, and
    wherein a portion that is in contact with either the heat generating portion or the conductive line is made of a material, of which the melting point is higher than an activating temperature.

4. The electronic device of claim 3, further comprising a heat insulating portion that has the function of increasing heat insulation between the cavity wall portion and the heat generating portion.

5. The electronic device of claim 3, wherein the heat generating portion generates the heat as Joule heat by utilizing its electrical resistance.

6. The electronic device of claim 3, wherein the heat generating portion is a Peltier element.

7. The electronic device of claim 1, wherein the gettering thin film is a film of a patlemed deposit.

8. The electronic device of claim 7, wherein the gettering thin film has a thickness of 100 μm or less.

9. The electronic device of claim 8, wherein the gettering thin film has such planar dimensions as falling within a 1 mm square rectangular area.

10. The electronic device of claim 1, wherein the activating portion generates and/or absorbs heat and senses a temperature while the heat is being generated and/or absorbed, thereby detecting the degree of vacuum in the closed cavity.

11. The electronic device of claim 1, wherein the electronic device includes visible light detecting elements, which are arranged on the substrate, and
wherein the closed cavity is shaped so as to surround at least a portion of the infrared sensing element and not surround a portion of the visible light detecting element.

12. The electronic device of claim 1, wherein the activating portion detects the intensity of an incoming infrared ray by sensing the temperature in the closed cavity.

* * * * *